(12) United States Patent
Marcinkiewicz

(10) Patent No.: US 6,326,750 B1
(45) Date of Patent: Dec. 4, 2001

(54) ACTIVE REDUCTION OF TORQUE IRREGULARITIES IN ROTATING MACHINES

(75) Inventor: Joseph G. Marcinkiewicz, St. Charles, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/459,543

(22) Filed: Dec. 14, 1999

Related U.S. Application Data
(60) Provisional application No. 60/139,703, filed on Jun. 17, 1999.

(51) Int. Cl.⁷ .................................................. H02P 7/00
(52) U.S. Cl. ........................ 318/432; 318/437; 318/434; 318/802
(58) Field of Search .................... 318/432, 437, 318/609, 610, 434, 254, 809, 807, 802, 803, 822, 439, 138, 700, 720–724; 323/220–354

(56) References Cited

U.S. PATENT DOCUMENTS

| | | | |
|---|---|---|---|
| 4,286,202 | * | 8/1981 | Clancy et al. ......................... 318/696 |
| 4,638,224 | * | 1/1987 | Gritter .................................. 318/254 |
| 4,812,691 | * | 3/1989 | Bertram et al. ......................... 310/41 |
| 5,223,775 | * | 6/1993 | Mongeau ............................... 318/432 |
| 5,444,341 | * | 8/1995 | Kneifel, II et al. ................... 318/432 |
| 5,616,999 | * | 4/1997 | Matsumura et al. .................. 318/632 |
| 5,744,921 | * | 4/1998 | Makaran ............................... 318/254 |
| 6,037,741 | * | 3/2000 | Yamada et al. ........................ 318/721 |
| 6,046,554 | * | 4/2000 | Becerra ................................. 318/254 |

* cited by examiner

Primary Examiner—Robert E. Nappi
Assistant Examiner—Edgardo San Martin
(74) Attorney, Agent, or Firm—Howrey Simon Arnold & White, LLP

(57) ABSTRACT

A method and apparatus for actively controlling the energization of the stator windings of a rotating electromagnetic machine to actively overcome any tendency of the rotor of the machine to prefer certain angular positions with respect to the stator over other angular positions.

24 Claims, 28 Drawing Sheets

$$\frac{\text{Bemf\_function (vx, Bemf\_fit\_parameters)}_0}{100}$$

$$\frac{\text{Bemf\_data}^{<1>}}{100}$$

$$\text{Bemf\_function (vx, Bemf\_fit\_parameters)}_0 +- \text{Bemf\_data}^{<1>}$$

$$\overline{\text{Cogging\_function}(Vx\_cog, \text{Cogging\_fit\_parameters})_0}$$
$$\underline{\phantom{====}}\ 10$$

$$\underline{\text{Cogging\_data}^{<1>}}$$
$$\cdots\cdots\ 10$$

$\text{Cogging\_function}(Vx\_cog, \text{Cogging\_fit\_parameters})_0$
$+\text{-Cogging\_data}^{<1>}$
$\cdots\cdots$

ACTIVE REDUCTION OF TORQUE IRREGULARITIES IN ROTATING MACHINES

The present application claims priority to Provisional Application Ser. No. 60/139,703 filed Jun. 17, 1999, for an Active Reduction of Torque Irregularities in Rotating Machines.

BACKGROUND OF THE INVENTION

Many electromagnetic machines in general, and permanent magnet electric motors in particular, exhibit torque irregularities as the rotor rotates with respect to the stator. Such irregularities produce non-uniform torque output and, thus, non-uniform rotation of the rotor. These torque irregularities may be caused by the physical construction of a given machine. They can result from, for example, a bearing that sticks in a given rotor position or the fact that, because of the electromagnetic characteristics of the machine, the rotor tends to prefer certain angular positions with respect to the stator. Torque irregularities resulting from the electromagnetic characteristics of an electromagnetic machine are commonly known as "cogging" irregularities and the resultant non-uniform rotation of the rotor or non-uniform torque output is known as "cogging."

In permanent magnet machines, cogging most often results from the physical construction of the machine. Specifically, the utilization of rotors having discrete north and south outer poles results in a circumferential distribution of magnetic flux about the rotor circumference that is not smooth, but choppy. Additionally, the stators commonly used with such machines are formed in such a way that the magnetic fluxes generated by the stator windings provide a flux distribution about the stator circumference that is not smooth. The combination of such rotors and stators, and the accompanying non-smooth flux distributions, produces undesired cogging irregularities. Rotor output non-uniformities may also be produced by back emf harmonics produced in certain machines.

For many motor applications the slight non-uniformity in the rotation of the rotor caused by torque irregularities is of little or no consequence. For example, in large motors driving large loads, slight variations in the output torque will not significantly affect the rotor speed and any slight variations in rotor speed will not significantly affect the system being driven by the machine. In other applications, where the rotation of the rotor or the torque output of the motor must be precisely controlled or uniform, such non-uniformity is not acceptable. For example, in servomotors used in electric power steering systems and in disk drives, the rotational output of the rotor or the torque output of the motor must be smooth and without significant variation. In many such applications the maximum acceptable peak-to-peak torque ripple or rotational speed ripple as a percentage of full load mean is on the order of only 1% to 2%. Because such machines typically have small, relatively low mass rotors, torque irregularities of a small magnitude can adversely impact the output of the machine.

Prior art approaches to reducing the undesirable consequences of torque irregularities in electromagnetic machines have focused on relatively complex rotor or stator constructions designed to eliminate the physical characteristics of the machines that would otherwise give rise to the irregularities. While the prior art machine construction approaches can result in reduction of torque irregularities, the approaches require the design and construction of complex rotor and stator components, such complex components are typically difficult to design, difficult to manufacturer, and much more costly to produce than are conventionally constructed components. Moreover, many of the physical changes required by such prior art solutions result in a significant reduction in the efficiency or other performance parameters of the resulting machines over that expected of comparable conventional machines. Thus, many of the prior art attempts to reduce torque irregularities do so at the cost of machine performance.

It is an object of the present invention to provide an improved method and apparatus for reducing the negative consequences of torque irregularities that do not suffer from the described and other limitations associated with the prior art.

BRIEF SUMMARY OF THE INVENTION

The present invention generally relates to a method and apparatus for controlling the energization of the stator windings of a rotating electromagnetic machine to actively overcome any tendency of the rotor to prefer certain angular positions with respect to the stator over other angular positions. In accordance with one exemplary embodiment the present invention relates to a method comprising the acts of: generating an electrical representation of the angular position of the rotor with respect to the stator; controlling the energization of the stator windings in response to the electrical representation of the rotor with respect to the stator to actively counteract the tendency of the rotor to prefer certain angular positions with respect to the stator over other angular positions.

In accordance with yet another embodiment, a controller is provided for energizing the stator windings of a rotating electromagnetic machine to provide smooth output torque, the machine including a rotor that prefers certain angular positions with respect to the stator over other positions, a torque rejection circuit that receives as an input a representation of the angular position of the rotor with respect to the stator and generates at an output an energization command corresponding to any tendency of the rotor to prefer the received angular position and an energization circuit responsive to the output of the torque rejection circuit that energizes to the stator windings of the rotating electromagnetic machine so as to provide smooth output torque.

DETAILED DESCRIPTION OF THE INVENTION

Figure 1:
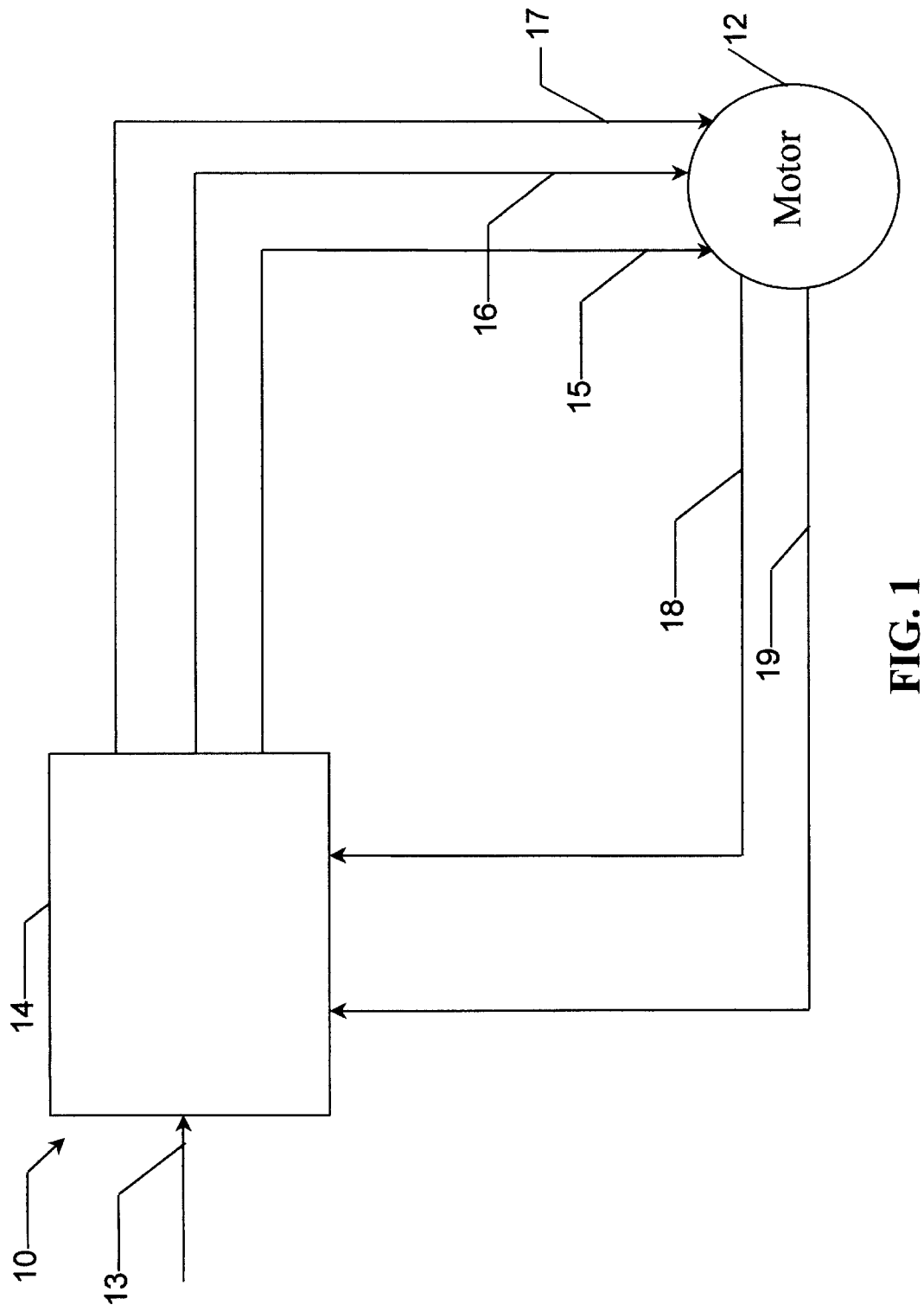
FIG. 1 illustrates a system 10 constructed according to certain teachings of the present disclosure.

Turing to the drawings and, in particular, to FIG. 1, a system 10 constructed according to certain teachings of this disclosure is illustrated. The illustrated system 10 actively controls the electric power supplied to an electromagnetic machine such that the negative consequences of torque irregularities that would otherwise be produced by the machine are reduced or eliminated.

System 10 includes an electromagnetic machine 12 and a drive 14 that provides electric power to the electromagnetic machine. Electromagnetic machine 12 may be any rotating machine that exhibits torque irregularities. For example, in the FIG. 1 machine 12 is a permanent magnet motor of conventional construction that includes a rotating component (a "rotor") and a stationary component (a "stator"). Wound about the stator are a number of energizable stator windings which may be energized through the application of electric power to terminals 15, 16 and 17.

While machine 12 is described as a permanent magnet motor, those of ordinary skill in the art having the benefit of this disclosure will recognize that other forms of electromagnetic machines may be used without departing from the teachings contained herein.

Drive 14 is coupled to provide electric power to terminals 15, 16 and 17 of motor 12. Drive 14 is also coupled to receive feedback from motor 12 in terms of rotor position information 18 and energization feedback 19. Other feedback information may be provided to the drive 14. While drive 14 is illustrated in exemplary form as providing any three power terminals to motor 12, it should be understood that more or fewer power terminals may be provided to accommodate motors or machines with greater than three phases, less than three phases or if various types of inverters (e.g., with neutral connections) are used.

Energization feedback 19 should provide an indication of the operational characteristics of the motor 12 and may, for example, include feedback concerning the currents flowing in the stator windings and/or the voltages at the terminals 15, 16 and 17. The position and energization parameters may be detected through conventional detectors such as standard rotor position detectors and/or standard current/voltage sensors. Alternate embodiments are envisioned in which the rotor position and feedback parameters are not detected directly but are calculated or estimated through known techniques. For example, embodiments are envisioned where only the terminal voltages are known or sensed along with the currents flowing through the stator windings of motor 12 and the sensed current and voltage values are used to derive rotor position information.

Drive 14 also receives an input command signals 13 that corresponds to a desirable output parameter of motor 12 such as rotor speed, output torque etc.

As describe in more detail below, drive 14 controls the application of electric power to motor 12 in such a manner that the difference between the input command signal and the corresponding output of motor 12 is minimized. Drive 14 also actively controls application of power to motor 12 as a function of rotor position in such a manner that torque irregularities (including cogging torque) are reduced or eliminated.

In general, drive 14 receives rotor position information and, based on that information develops a control signal that actively adjusts the energization of motor 12 such that any torque irregularities that would exist at that rotor position are reduced. This control may be accomplished by first characterizing/modeling motor 12 to obtain information about the torque irregularities that would exist in the absence of such active control of the energization and then using that characterization information to develop a controller as described above.

The use of drive 14 to actively reduce torque irregularities as opposed to attempting to reduce such irregularities through complex rotor or stator constructions, results in a better performing system in that, for example, conventional, low cost motors and motor construction techniques may be used without the undesirable torque irregularities commonly associated with such motors.

As briefly described above, before developing a control system in accordance with certain elements of the teachings described herein, it is beneficial to characterize the machine to be controlled to obtain information about its potential torque irregularities. This may be accomplished by characterizing the machine to obtain information concerning: (1) the torque producing characteristics of the machine, which is a function of the back electromagnetic force ("Bemf") of the machine; and (ii) the torque irregularities produced by the motor absent active control as discussed herein.

An understanding of the torque characteristics for a given machine may be obtained by:

(1) calculation and/or estimation; (2) empirical testing of the given machine; (3) testing of an appropriate sample of one or more machines of a given construction and a processing (e.g., averaging) of the obtained results; or (4) a combination of any of the foregoing. In general, it is believed that actual testing of a machine or a number of machines of a given type is believed to produce the most desirable results. As such, that method of determining the Bemf and torque irregularities will be discussed in greater detail. Those of ordinary skill in the art will understand that other methods of obtaining torque data for a given machine may be used without departing from the teachings contained in this disclosure.

For ease of discussion, this disclosure refers in many instances to "motors." Such references are exemplary only and those of ordinary skill in the art will understand that such references are intended to include all electromagnetic machines that exhibit torque irregularities as described herein. Moreover, in many instances this disclosure refers to "cogging torque" or "cogging." Those of ordinary skill in the art should understand that such references are intended to include all torque irregularities associated with rotating machines.

Figure 2:
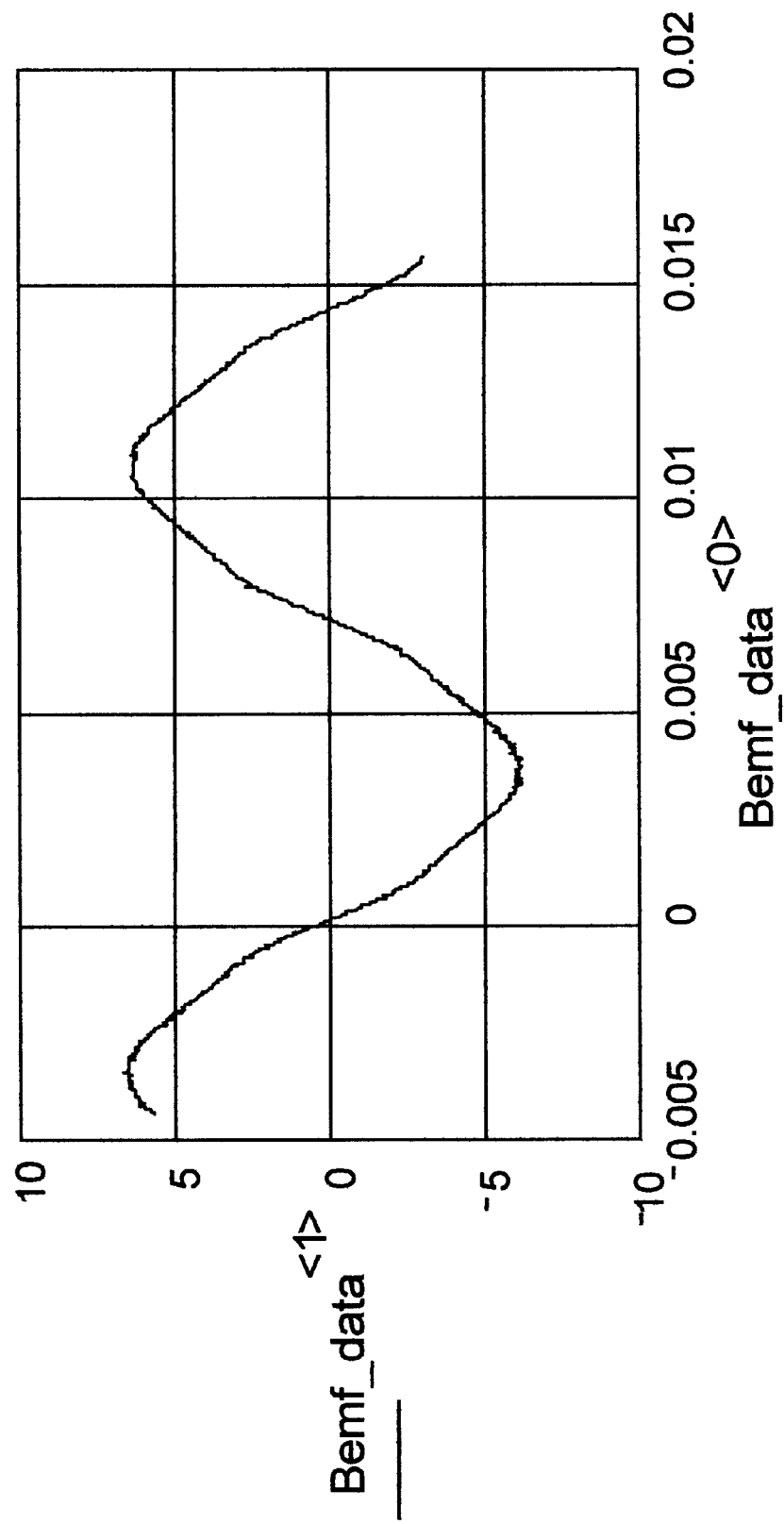
FIG. 2 provides a representation of measured Bemf data (line to neutral) one phase of an exemplary three-phase twelve slot, eight-pole permanent magnet motor (12s8p PM machine).

One acceptable approach for determining the Bemf of a given motor is to simply measure the Bemf using conventional techniques and analytical devices. Such techniques and devices are known in the art and will not be discussed in detail herein. FIG. 2 provides a representation of measured Bemf data (line to neutral) for one phase of a three-phase twelve slot, eight-pole permanent magnet motor (12s8p PM machine). In the illustrated example, the data represents data taken at approximately 1000 RPM. The selection of a three phase 12s8p PM motor is for illustrative purposes as the methods and apparatus discussed herein are applicable to machines of varied construction including machines ranging from motors having only two phases to machines having significantly more than three phases.

The Bemf waveform of FIG. 2 represents one complete electrical cycle of the motor under analysis.

Figure 3:
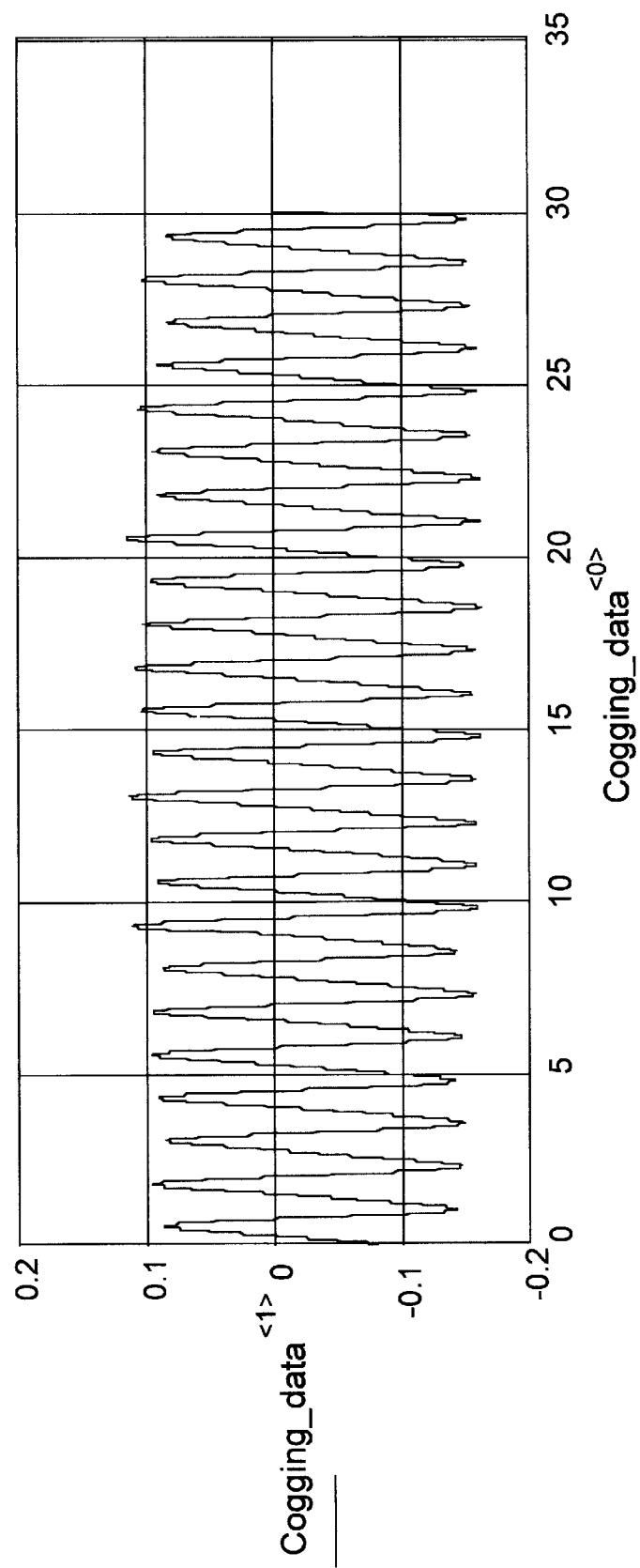
FIG. 3 provides a representation of measured cogging torque for the 12s8p PM machine used to generate the data reflected in FIG. 2.

Known approaches similar to those described above for detecting the Bemf of a motor may be used to obtained information about the cogging torque characteristics of a motor. FIG. 3 provides a representation of measured cogging torque over 4 electrical cycles (one mechanical cycle) for the 12s8p PM machine used to generate the data reflected in FIG. 2.

It should be noted that the detected Bemf waveform of a rotating machine will be a repeating waveform that will repeat at a rate corresponding to the electrical cycle of the machine. As such, the Bemf waveform will typically be expressed in terms of electrical degrees. The torque-irregularity waveform—or cogging torque waveform—however—will typically be a repeating waveform that repeats at a rate corresponding to the rotational speed of the rotor. This is because the physical phenomena—that produces such irregularities is associated primarily with the physical—not the electrical—characteristics of a machine.

Once the Bemf and cogging torque information for a given motor is calculated or determined through measurement, it is desirable to represent both the Bemf and the cogging torque in terms of a common parameter or parameters to allow for each of control. One exemplary approach is to develop representations of the Bemf and the cogging torque as functions of the angular position of the rotor with respect to the stator.

Representing the Bemf of a motor as a function of one or more fit parameters (e.g., angular rotor position) may be accomplished by: (1) defining a harmonic series that can be fitted to the Bemf information; (2) defining the derivative of the harmonic series as a function of the parameters to be fitted; (3) defining a fit vector that includes the Bemf harmonic series and its partial derivatives with respect to each parameter to be fitted; and (4) utilizing the fit vector to select an appropriate representation of the Bemf as a function of the parameters to be fitted.

Utilizing the data reflected in FIG. 2, and assuming that the only fit parameter is the angular rotor position, the following provides an example of an approach that may be used to develop a generation of the Bemf data of FIG. 2 as a function of the angular position of the rotor:

First, a series (hereinafter the "Bemf function") is defined that will be fitted to the measure line to neutral Bemf data. Because of the nature of the Bemf data, a harmonic series may be used:

$$\text{Bemf\_1}(t, k) := k_0 + k_1 \cdot \cos(k_{13}t) + k_2 \cdot \sin(k_{13}t) + \\ k_3 \cdot \cos(3 \cdot k_{13}t) + k_4 \cdot \sin(3 \cdot k_{13}t) + \\ k_5 \cdot \cos(5 \cdot k_{13}t) + k_6 \cdot \sin(5 \cdot k_{13}t) + \\ k_7 \cdot \cos(7 \cdot k_{13}t) + k_8 \cdot \sin(7 \cdot k_{13}t)$$

$$\text{Bemf\_2}(t, k) := k_9 \cdot \cos(9 \cdot k_{13}t) + k_{10} \cdot \sin(9 \cdot k_{13}t) + \\ k_{11} \cdot \cos(11 \cdot k_{13}t) + k_{12} \cdot \sin(11 \cdot k_{13} \cdot t)$$

$$\text{Bemf}(t, k) := \text{Bemf\_1}(t, k) + \text{Bemf\_2}(t, k)$$

Second, the derivative of the Bemf function is defined with respect to the fitting parameters. The fitting parameters being each harmonic coefficient and the electrical angular frequency. In the described example the Bemf data was measured at a rotational speed of about 1000 RPM, although the precise rotor shaft speed at which the Bemf data was collected is not known precisely. Accordingly, to accommodate this fact, a generalized fit with the electrical angular frequency as a parameter is used:

$$d\text{Bemf\_dk\_13\_1}(t,k) := -k_1 \cdot \sin(k_{13} \cdot t) \cdot t + k_2 \cdot \cos(k_{13} \cdot t) \cdot t - 3 k_3 \cdot$$

$$\sin(3 \cdot k_{13} \cdot t) \cdot t + 3 \cdot k_4 \cdot \cos(3 \cdot k_{13} \cdot t) \cdot t - 5 \cdot k_5 \cdot$$

$$\sin(5 \cdot k_{13} \cdot t) \cdot t + 5 \cdot k_6 \cdot \cos(5 \cdot k_{13} \cdot t) \cdot t$$

$$d\text{Bemf\_dk\_13\_2}(t,k) := -7 \cdot k_7 \cdot \sin(7 \cdot k_{13} \cdot t) \cdot t + 7 \cdot k_8 \cdot \cos(7 \cdot k_{13} \cdot t) \cdot t - 9 \cdot k_9 \cdot$$

$$\sin(9 \cdot k_{13} \cdot t) \cdot t + 9 \cdot k_{10} \cdot \cos(9 \cdot k_{13} \cdot t) \cdot t - 11 \cdot k_{11} \cdot$$

$$\sin(11 \cdot k_{13} \cdot t) \cdot t + 11 \cdot k_{12} \cdot \cos(11 \cdot k_{13} \cdot t) \cdot t$$

dBemf_dk_13(t,k):=dBemf_dk_13_1(t,k)+dBemf_dk_13_2(t, k)

Third, having defined the Bemf function and its relevant partial derivatives, a fit vector of functions (Bemf_function (t, k)) is established that includes the Bemf function and its partial derivatives with respect to each parameter to be fitted (in this case each harmonic coefficient and the electrical angular frequency). To allow for ease of calculation, initial guesses (vg) for each of the parameters to be determined are provided:

$$\text{Bemf\_function}(t, k) := \begin{bmatrix} Bemf(t, k) \\ 1 \\ \cos(k_{13} \cdot t) \\ \sin(k_{13} \cdot t) \\ \cos(3 \cdot k_{13} \cdot t) \\ \sin(3 \cdot k_{13} \cdot t) \\ \cos(5 \cdot k_{13} \cdot t) \\ \sin(5 \cdot k_{13} \cdot t) \\ \cos(7 \cdot k_{13} \cdot t) \\ \sin(7 \cdot k_{13} \cdot t) \\ \cos(9 \cdot k_{13} \cdot t) \\ \sin(9 \cdot k_{13} \cdot t) \\ \cos(11 \cdot k_{13} \cdot t) \\ \sin(11 \cdot k_{13} \cdot t) \\ \text{dBemf\_dk\_13}(t, k) \end{bmatrix} \quad vg := \begin{bmatrix} 0 \\ 1 \\ 1 \\ 1 \\ 1 \\ 1 \\ 1 \\ 1 \\ 1 \\ 1 \\ 1 \\ 1 \\ 1 \\ 1 \\ 441 \end{bmatrix}$$

Next, the input data vectors for the fitting function are defined:

vx:=Bemf_data$^{<0>}$,vy:=Bemf_data$^{<0>}$ and an appropriate approach is used to solve for the fit parameters. In the present example a generalized least squares fit of the Bemf function to the data is selected although other solutions may be used.

Bemf_fit_parameters:=genfit(vx,vy,vg,Bemf_function)

Figure 4:
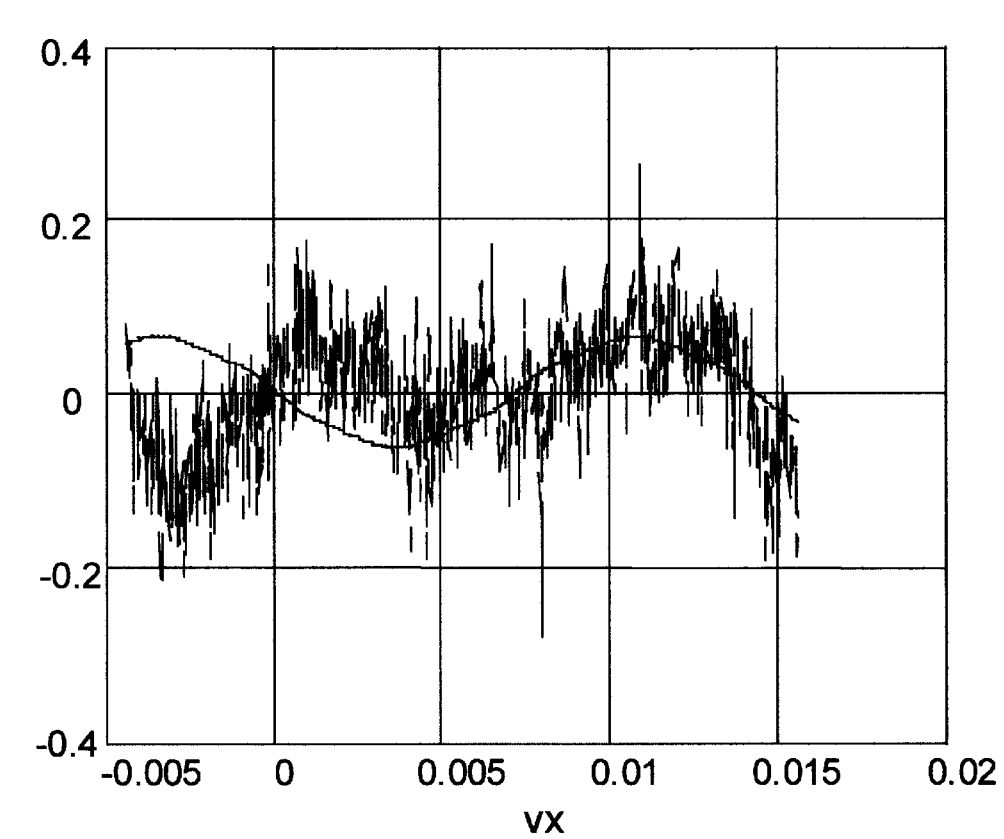
FIG. 4 illustrates Bemf data from FIG. 2 and an exemplary fit divided by 100 along with a fit error.

To more precisely determine the various fit parameters, it is often helpful to consider the Bemf data and its fit divided by 100 along with the fit error. A plot of such information is provided as an example in FIG. 4.

From the Bemf fit, a representation of the Bemf as a function of angular position of the rotor and the fit parameters can be defined:

Bemf_1($\theta$_e,k):=$k_1 \cdot \cos(\theta$_e$)+k_2 \cdot \sin(\theta$_e$)+k_3 \cdot$ $\cos(3 \cdot \theta$_e$)+k_4 \cdot \sin(3 \cdot \theta$_e$)+k_5 \cdot \cos(5 \cdot \theta$_e$)+k_6 \cdot$ $\sin(5 \cdot \theta$_e$)+k_7 \cdot \cos(7 \cdot \theta$_e$)+k_8 \cdot \sin(7 \cdot \theta$_e$)$ Bemf_2($\theta$_e,k):=$k_9 \cdot \cos(9 \cdot \theta$_e$)+k_{10} \cdot \sin(9 \cdot \theta$_e$)+k_{11} \cdot \cos(11 \cdot \theta$_e$)+ k_{12} \cdot \sin(5 \cdot \theta$_e$)$ Bemf($\theta$_e,k):=Bemf_1($\theta$_e,k)+Bemf_2($\theta$_e,k)

Having developed a representation of the Bemf as a function of the angular position of the rotor, it is next desirable to develop a corresponding representation of the cogging torque data. In general, the same approach may be used.

First, a series representation of the cogging torque should be developed. Since the cogging data will typically correspond to one complete mechanical revolution of the rotor shaft, and since the torque irregularity producing mechanism typically ensures that the primary cogging components contain many cycles for one mechanical revolution, an FFT series can be used to determine what components are needed for a good fit. Calculating the FFT of the cogging data may be accomplished by considering the following:

Cogging_FFT:=CFFT(Cogging_data$^{<1>}$)

fft_index:=0 . . . rows(Cogging_FFT)

Figure 5:
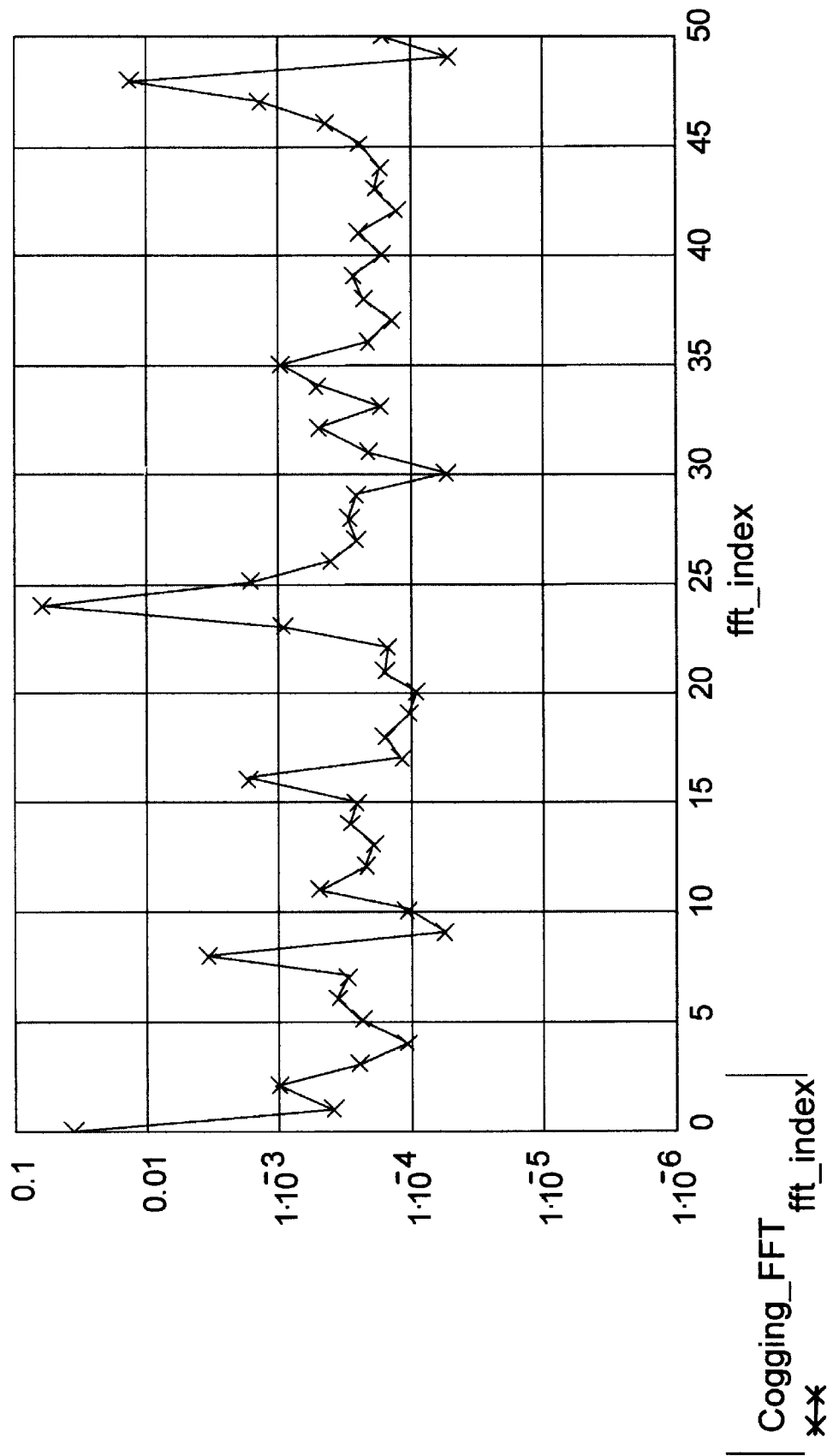
FIG. 5 provides an exemplary plot of the magnitude of the FFT of the cogging torque data represented by FIG. 3.

An exemplary plot of the magnitude of the FFT of the cogging torque data represented by FIG. 3 is provided in FIG. 5. From the plot at FIG. 5, the important frequencies of the cogging torque can be determined. Any component with a magnitude of more than 0.001 will be used in the fit. The components of interest are therefore, 8×$\omega$mech, 16×$\omega$mech, 24×$\omega$mech, 25×$\omega$mech, 47×$\omega$mech, 48×$\omega$mech. DC may be considered in the fit, but can be ignored when defining the cogging function without significant negative impact on the system. The same is true of the Bemf fit. Thus, an appropriate series for representing the cogging torque may be defined as follows where:

Cogging_1(t,k):=$k_0+k_1 \cdot \cos(8 \cdot k_{13} \cdot t)+k_2 \cdot \sin(8 \cdot k_{13} \cdot t)+ k_3 \cdot \cos(16 \cdot k_{13} \cdot t)+k_4 \cdot \sin(16 \cdot k_{13} \cdot t)+k_5 \cdot \cos(24 \cdot k_{13} \cdot t)+k_6 \cdot \sin(24 \cdot k_{13} \cdot t)$ Cogging_2(t,k):=$k_7 \cdot \cos(25 \cdot k_{13} \cdot t)+k_8 \cdot \sin(25 \cdot k_{13} \cdot t)+k_9 \cdot \cos(47 \cdot k_{13} \cdot t)+ k_{10} \cdot \sin(47 \cdot k_{13} \cdot t)+k_{11} \cdot \cos(48 \cdot k_{13} \cdot t)+k_{12} \cdot \sin(48 \cdot k_{13} \cdot t)$ Cogging(t,k):=Cogging_1(t,k)+Cogging_2(t,k)

Second, the partial derivative of the cogging function with respect to the fitting parameters is defined. In the illustrated example, the harmonic coefficients and the mechanical angular frequency at which the data was collected are both of interest. The partial derivatives of the function describing cogging with respect to each fitting parameter are calculated and contained in the rows of Cogging_function(t,k) below.

dCogging_dk_1(t,k):=$-8 \cdot k_1 \cdot \sin(8 \cdot k_{13} \cdot t) \cdot t+8 \cdot k_2 \cdot \cos(8 \cdot k_{13} \cdot t) \cdot t-16 \cdot k_3 \cdot$ $\sin(16 \cdot k_{13} \cdot t) \cdot t+16 \cdot k_4 \cdot \cos(16 \cdot k_{13} \cdot t) \cdot t-24 \cdot k_5 \cdot$ $\sin(24 \cdot k_{13} \cdot t) \cdot t+24 \cdot k_6 \cdot \cos(24 \cdot k_{13} \cdot t) \cdot t$ dCogging_dk_2(t,k):=$-25 \cdot k_7 \cdot \sin(25 \cdot k_{13} \cdot t) \cdot t+25 \cdot k_8 \cdot \cos(25 \cdot k_{13} \cdot t) \cdot t- 47 \cdot k_9 \cdot$ $\sin(47 \cdot k_{13} \cdot t) \cdot t+47 \cdot k_{10} \cdot \cos(47 \cdot k_{13} \cdot t) \cdot t-48 \cdot k_{11} \cdot$ $\sin(48 \cdot k_{13} \cdot t) \cdot t+48 \cdot k_{12} \cdot \cos(48 \cdot k_{13} \cdot t) \cdot t$ dCogging_dk13(t,k):=dCogging_dk13_1(t,k)+dCogging_dk13_2(t,k)

Third, as with the approach used to represent the Bemf as a function of the rotor angle position, a fit matrix and initial parameter guesses are defined:

$$Cogging\_function(t, k) := \begin{bmatrix} Cogging(t, k) \\ 1 \\ \cos(8 \cdot k_{13} \cdot t) \\ \sin(8 \cdot k_{13} \cdot t) \\ \cos(16 \cdot k_{13} \cdot t) \\ \sin(16 \cdot k_{13} \cdot t) \\ \cos(24 \cdot k_{13} \cdot t) \\ \sin(24 \cdot k_{13} \cdot t) \\ \cos(25 \cdot k_{13} \cdot t) \\ \sin(25 \cdot k_{13} \cdot t) \\ \cos(47 \cdot k_{13} \cdot t) \\ \sin(47 \cdot k_{13} \cdot t) \\ \cos(48 \cdot k_{13} \cdot t) \\ \sin(48 \cdot k_{13} \cdot t) \\ dCogging\_dk13(t, k) \end{bmatrix}$$

$$Vg\_cog := \begin{bmatrix} -0.1 \\ 0 \\ 0 \\ 0 \\ 0 \\ -0.1 \\ 0 \\ 0 \\ 0 \\ 0 \\ 0 \\ 0 \\ 0 \\ 2 \cdot \frac{\pi}{30} \end{bmatrix}$$

Next the cogging data vectors to be used in the fit are defined and the fit parameters are calculated:

Vx_cog:=Cogging_data$^{<0>}$

Vy_cog:=Cogging_data$^{<1>}$

Cogging_fit parameters:=genfit(Vx_cog,Vy_cog,Vg_cog,Cogging_function)

Figure 6:
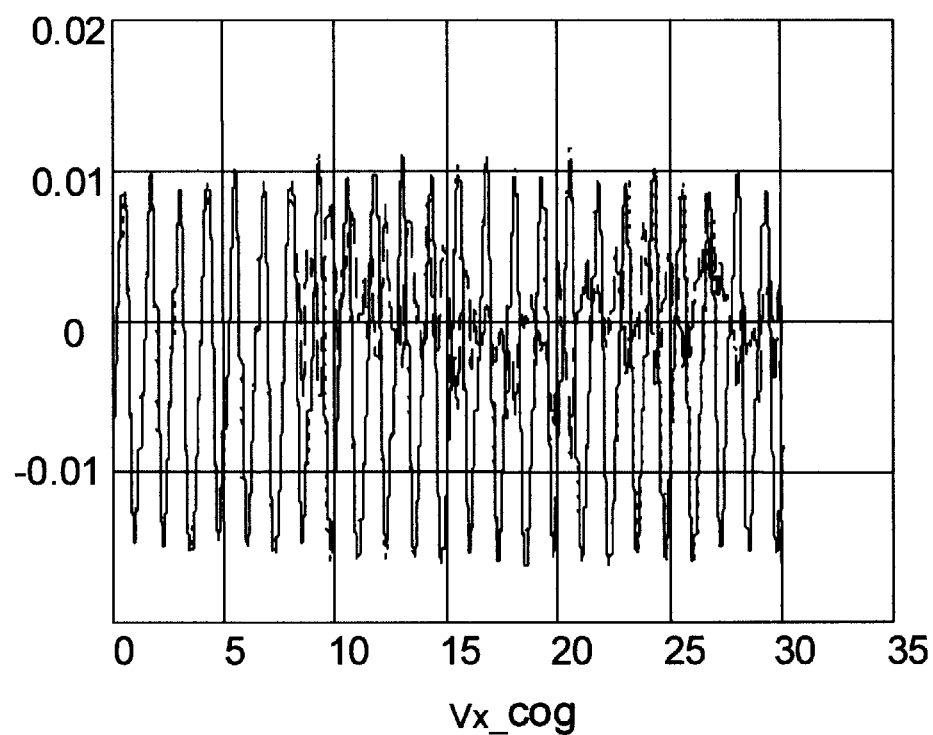
FIG. 6 provides a representative illustration of the cogging data of FIG. 3/10, an exemplary fit/10 and a fit error.

Because of the repetitive nature of the cogging function, it is helpful when solving for the fit parameters to consider the cogging data/10, its fit/10 and the fit error. Such information is illustrated for the example under consideration in FIG. 6.

From the above, a representation of the cogging torque as a function of the angular position of the rotor may be derived as follows:

Cogging_1($\theta$,k):=$k_{1 \cdot cos}$(8$\theta$)+$k_2 \cdot \sin$(8$\theta$)+$k_3 \cdot \cos$(16$\theta$)+$k_4 \cdot \sin$(16$\theta$)+ $k_5 \cdot \cos$(24$\theta$)+$k_6 \cdot \sin$(24$\theta$)

Cogging_2($\theta$,k):=$k_{7 \cdot cos}$(25$\theta$)+$k_8 \cdot \sin$(25$\theta$)+$k_9 \cdot \cos$(47$\theta$)+ $k_{10} \cdot \sin$(47$\theta$)+$k_{11} \cdot \cos$(48$\theta$)+$k_{12} \cdot \sin$(48$\theta$)

Cogging($\theta$,k):=Cogging_1($\theta$,k)+Cogging_2($\theta$,k)

Because of its relevance to the following discussion, the partial derivative of the cogging function with respect to the rotor angle may be determined and is set forth as follows:

dCogging_d$\theta$_1($\theta$,k):=-8$k_{1 \cdot sin}$(8$\theta$)+8·$k_2 \cdot \cos$(8$\theta$)+16·$k_3 \cdot \sin$(16$\theta$)+ 16·$k_4 \cdot \cos$(16$\theta$)+24·$k_5 \cdot \cos$(24$\theta$)+24·$k_6 \cdot \sin$(24$\theta$)

dCogging_d$\theta$_2($\theta$,k):=-25$k_{7 \cdot sin}$(25$\theta$)+25·$k_8 \cdot \cos$(25$\theta$)+ 47·$k_9 \cdot \sin$(47$\theta$)+47·$k_{10} \cdot \cos$(47$\theta$)+48·$k_{11} \cdot \cos$(48$\theta$)+48·$k_{12} \cdot \sin$(48$\theta$)

dCogging_d$\theta$($\theta$,k):=dCogging_d$\theta$_1($\theta$,k)+dCogging_d$\theta$_2($\theta$,k)

The above representations of the Bemf and the cogging torque are in terms of the angular position of the rotor in terms of electrical degrees and mechanical degrees respectively. For ease of calculation, it has been determined that it is often desirable to have the representations be in terms of mechanical degrees.

In the illustrated example, the electrical frequency of the Bemf measured data can be calculated from the k_13 Bemf fit parameter which, for purposes of discussion in connection with the specific example being provided is 441.472. Using this information a comparison may be made between electrical degrees and mechanical degrees as follows:

Bemf_fit_parameters$_{13}$=441.472

$$Freq\_electrical := \frac{Bemf\_fit\_parameters_{13}}{2 \cdot \pi}$$

Freq_electrical=70.262

The normalizing factor for the Bemf function can then be calculated as follows:

$$K\_scale := \frac{1}{2 \cdot \pi \cdot Freq\_electrica}$$

Considering the Bemf representation developed above for electrical degrees, the Bemf of the exemplary motor may be reflected in terms of mechanical angle where $\theta$ electrical= $\theta$mech*poles/2=$\theta$ mech*4 as follows:

Bemf_1($\theta$,k):=$k_{1 \cdot cos}$(4·$\theta$)+$k_2 \cdot \sin$(4·$\theta$)+$k_3 \cdot \cos$(3·4·$\theta$)+$k_4 \cdot \sin$(3·4·$\theta$)+ $k_5 \cdot \cos$(5·4·$\theta$)+$k_6 \cdot \sin$(5·4·$\theta$)+$k_7 \cdot \cos$(7·4·$\theta$)+$k_8 \cdot \sin$(7·4·$\theta$)

Bemf_2($\theta$,k):=$k_9 \cdot \cos$(9·4·$\theta$)+$k_{10} \cdot \sin$(9·4·$\theta$)+$k_{11} \cdot \cos$(11·4·$\theta$)+ $k_{12} \cdot \sin$(11·4·$\theta$)

Bemf($\theta$,k):=(Bemf_1($\theta$,k)+Bemf_2($\theta$,k))·K_scale

The derivative of the Bemf function with respect to angle (mechanical) may be determined using the above conversion factors and the previously calculated derivative information for the Bemf function and may be set forth as follows:

dBemf_d$\theta$_1($\theta$,k):=-4·$k_1 \cdot \sin$(4·$\theta$)+4·$k_2 \cdot \cos$(4·$\theta$)-12·$k_3 \cdot \sin$(12·$\theta$)+ 12·$k_4 \cdot \cos$(12·$\theta$)-20·$k_5 \cdot \sin$(20·$\theta$)+20·$k_6 \cdot \cos$(20·$\theta$)

dBemf_d$\theta$_2($\theta$,k):=-28·$k_7 \cdot \sin$(28·$\theta$)+28·$k_8 \cdot \cos$(28·$\theta$)+- 36·$k_9 \cdot \sin$(36·$\theta$)+36·$k_{10} \cdot \cos$(36·$\theta$)-44·$k_{11} \cdot \sin$(44·$\theta$)+ 44·$k_{12} \cdot \cos$(44·$\theta$)

dBemf_d$\theta$($\theta$,k):=(dBemf_d$\theta$_1($\theta$,k)+dBemf_d$\theta$_2($\theta$,k))·K_scale Once the Bemf and cogging torque information is processed and representations of the torque characteristics as a function of the angular mechanical position of the rotor are developed, a next step to developing an active control system in accordance with the present invention is to develop a control scheme that will: (1) allow for appropriate control of the motor, and (2) reduce or eliminate the cogging torque. This may be accomplished in a variety of ways and it should be understood that a significant number of active control schemes may be developed using the teachings provided herein that meet the described criteria. This is because the teachings contained herein may be used to develop control systems that meet differing criteria.

As one example, it is common in many applications to utilize what is known as a balanced three phase feed. In such systems, when a three-phase motor is used, the sum of the three phase currents will equal zero. Thus, using the teachings provided herein, it is possible to develop a balanced three phase feed system that implements a balanced feed as well as providing the desired torque output and reduced cogging torque discussed above.

As another example, certain motor systems require the use of rotor position detectors that, because of cost, space or other constraints, are subject to significant error at all or some specific speed ranges. For such systems, it may be desirable to develop a motor controller which has a minimum sensitivity to rotor position error. Such a motor control may operate differently from one designed to implement a balanced three-phase feed in which rotor position detector sensitivity is not an issue.

Still further, in certain systems it is desirable to develop motor controls that use the lowest possible RMS current values to obtain the desired motor output. A motor control implementing active cogging reduction and attempting to minimize the RMS currents used to drive the motors may vary from motor controls designed to other design criteria.

The ability of the methods and apparatus described herein to both reduce undesirable torque irregularities, such as cogging, and to simultaneously implement various design criteria (e.g., balanced feed, minimum RMS currents, max torque output, minimum sensitivity to shaft sensor error, etc.) is believed to be of significant benefit.

Because of the large variance in design criteria that may be placed on a motor control system the present disclosure cannot discuss or illustrate all potential implementations of the control system and methods disclosed herein. Accordingly, those of ordinary skill in the art having the benefit of this disclosure will understand that the following discussions set forth example motor control systems implementing exemplary design criteria and that other motor control systems and methods may be used without departing from the teachings contained herein.

In accordance with a first example, a motor control system will be developed that meets the following design criteria:

1. No cogging torque (i.e., net torque=0 when only active cogging rejection current is flowing in the motor).
2. Balanced three phase feed.
3. Minimum RMS current.

Because one control criteria is that the control system be able to produce desired output torque, a first step in developing a motor control that meets the described design criteria is to develop the torque equation for the machine. In the present example, it is the current flowing into the motor that will be controlled and, as such, the torque equation will be expressed in terms of control currents Ia, Ib and Ic for the three phases of the exemplary motor. Knowing that the total torque output of the machine will be a function of the Bemf of the machine, the current flowing in the machine, and the cogging torque produced by the machine, the torque output of the machine may be expressed as:

$$Te\_3\_ph(\theta, Ia, Ib, Ic, k\_bemf, k\_cog) :=$$
$$4 \cdot \left(Bemf(\theta, k\_bemf) \cdot Ia + Bemf\left(\theta - \frac{2 \cdot \pi}{4 \cdot 3}, k\_bemf\right) \cdot Ib + Bemf\left(\theta - \frac{4 \cdot \pi}{4 \cdot 3}, k\_bemf\right) \cdot Ic\right) + Cogging(\theta, k\_cog)$$

Where Ia, Ib and Ic represent the three phase currents of the machine, k_bemf represents the harmonic coefficients in the Bemf representation in terms of the angular position of the rotor in terms of mechanical degrees, theta represents the angular position of the rotor in terms of mechanical degrees, and K-cog represents the harmonic coefficients in the representation of the cogging torque as a function of the angular position of the rotor (mechanical) as determined above.

In addition to producing desired output torque, another design criteria in this example is that the feed be balanced. As such, at all times the currents must sum to zero:

Ia+Ib+Ic=0

The above design criteria may be expressed in matrix form with the desired output torque set equal to zero as follows:

$$\begin{bmatrix} 4 \cdot Bemf(\theta, k\_bemf) & 4 \cdot Bemf\left(\theta - \frac{2 \cdot \pi}{4 \cdot 3}, k\_bemf\right) & 4 \cdot Bemf\left(\theta - \frac{4 \cdot \pi}{4 \cdot 3}, k\_bemf\right) \\ 1 & 1 & 1 \end{bmatrix} \cdot \begin{bmatrix} Ia \\ Ib \\ Ic \end{bmatrix} = \begin{bmatrix} Te + -Cogging(\theta, k\_cog) \\ 0 \end{bmatrix}$$

The above representation is in standard A*x=b matrix forms. As such, using known mathematical techniques, the control scheme may be developed for the minimum rms current solution using the generalized inverse of A:

$$A(\theta, k\_bemf) := \begin{bmatrix} 4 \cdot Bemf(\theta, k\_bemf) & 4 \cdot Bemf\left(\theta - \frac{2 \cdot \pi}{4 \cdot 3}, k\_bemf\right) & 4 \cdot Bemf\left(\theta - \frac{4 \cdot \pi}{4 \cdot 3}, k\_bemf\right) \\ 1 & 1 & 1 \end{bmatrix}$$

The generalized inverse of A for this case is:

$$A\_inverse(\theta, k\_bemo) := A(\theta, k\_bemf)^T \cdot (A(\theta, k\_bemf) \cdot A(\theta, k\_bemf)^T)^{-1}$$

Defining the B matrix as follows:

$$B(Te, \theta, k\_cog) := \begin{bmatrix} Te + -Cogging(\theta, k\_cog) \\ 0 \end{bmatrix}$$

the phase currents may be calculated as follows:

$$I\_min\_rms(Te, \theta, k\_bemf, k\_cog) := A\_inverse(\theta, k\_bemf) \cdot B(Te, \theta, k\_cog)$$

Defining a mechanical angle vector to display the calculated currents.

$$m := 0 \ldots 359$$

$$\theta\_mech_m := m \cdot \frac{2 \cdot \pi}{360}$$

and solving for the minimum rms current solution.

$$\begin{bmatrix} I\_a\_min\_rms_m \\ I\_b\_min\_rms_m \\ I\_c\_min\_rms_m \end{bmatrix} := \begin{bmatrix} I\_min\_rms(0, \theta\_mech_m, Bemf\_fit\_parameters, Cogging\_fit\_parameters)_0 \\ I\_min\_rms(0, \theta\_mech_m, Bemf\_fit\_parameters, Cogging\_fit\_parameters)_1 \\ I\_min\_rms(0, \theta\_mech_m, Bemf\_fit\_parameters, Cogging\_fit\_parameters)_2 \end{bmatrix}$$

one can obtain the appropriate control currents Ia, Ib and Ic as a function of the angular position of the rotor (mechanical) to implement the desired design criteria. A plot of the appropriate control currents for the exemplary motor described above for this example are reflected as a function of the angular position of the rotor (mechanical) in FIG. 7.

Figure 8:
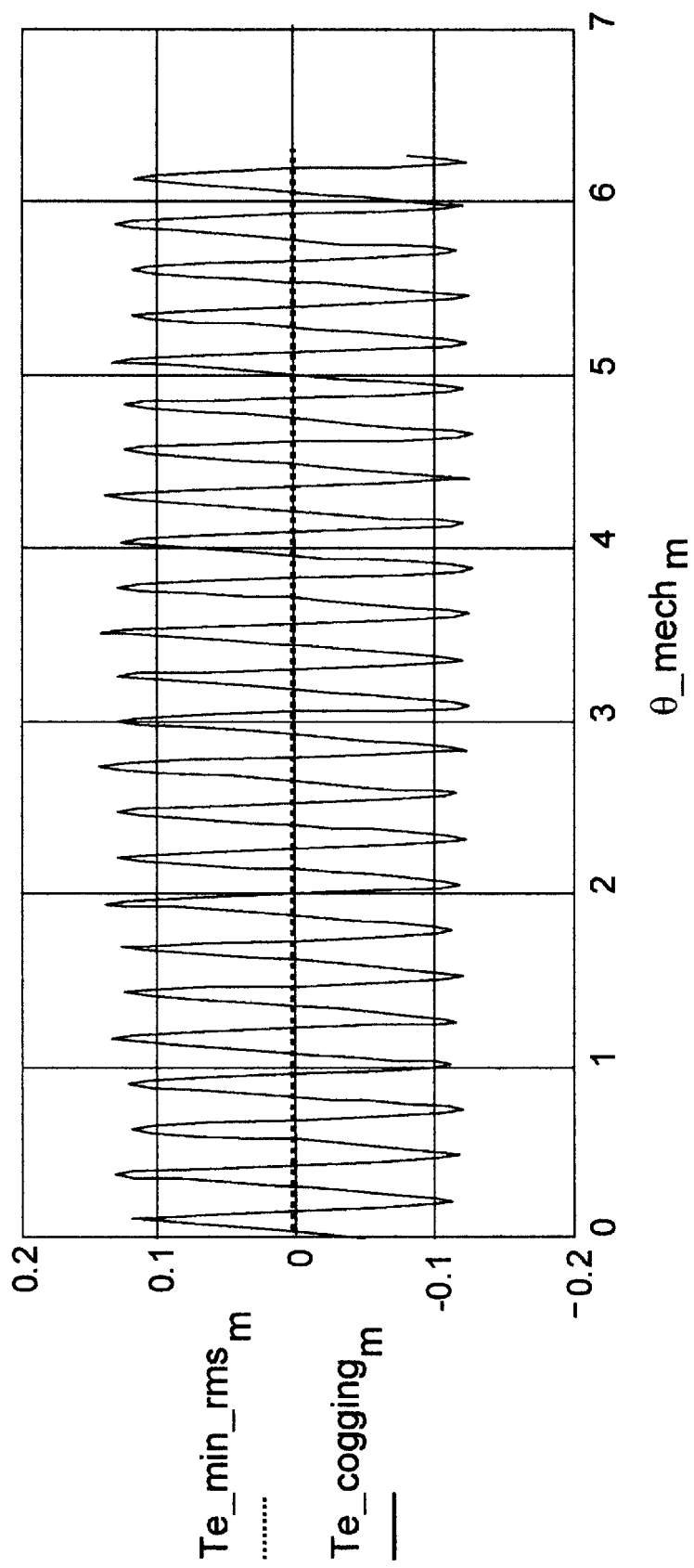
FIG. 8 provides an exemplary plot of shaft torque using active cogging rejection and the cogging torque for an exemplary system constructed in accordance with certain teachings found in this disclosure.

The fact that the currents Ia, Ib and Ic reflected above will eliminate cogging torque may be verified by calculating the shaft output torque as a function of the illustrated current waveforms. Using the following representations of the desired output torque and the resulting cogging torque for the present example:

$$Te\_min\_rms := Te\_3\_ph(\theta\_mech_m, I\_a\_min\_rms_m, I\_b\_min\_rms_m, I\_c\_min\_rms_m, Bemf\_fit\_parameters, Cogging\_fit\_parameters)$$

$$Te\_cogging_m := Cogging(\theta, mech_m, Cogging\_fit\_parameters)$$

the plot of the shaft torque using active cogging rejection and the cogging torque provided in FIG. 8 may be developed.

Figure 7:
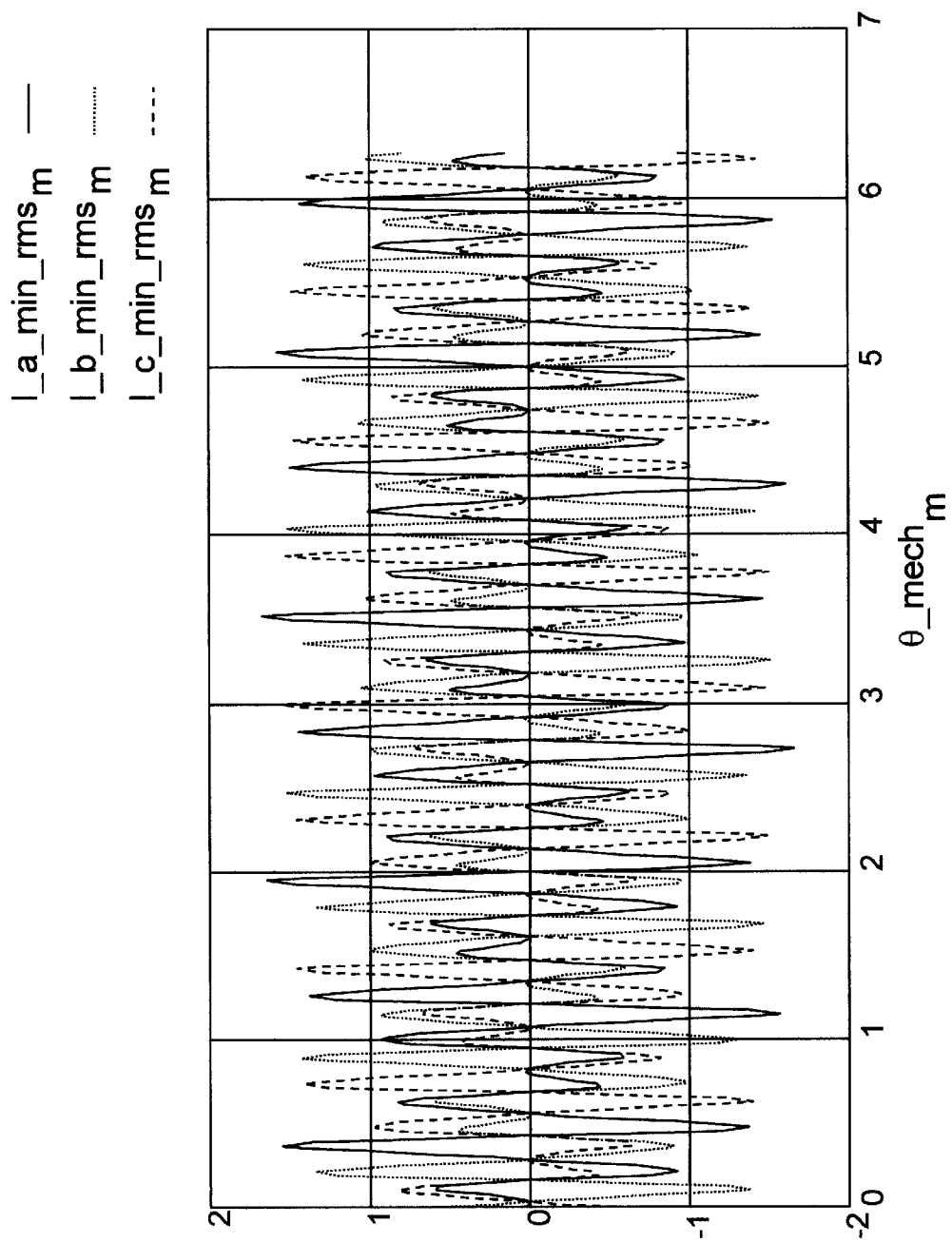
FIG. 7 provides an exemplary plot of appropriate control currents for the exemplary motor reflected by FIGS. 2 and 3 as a function of the angular position of the rotor (mechanical).

As may be noted from an inspection of FIG. 8, when a motor controller energizes the exemplary motor with the currents reflected in FIG. 7, the resultant output torque of the motor is zero (i.e., no cogging torque.).

Figure 9:
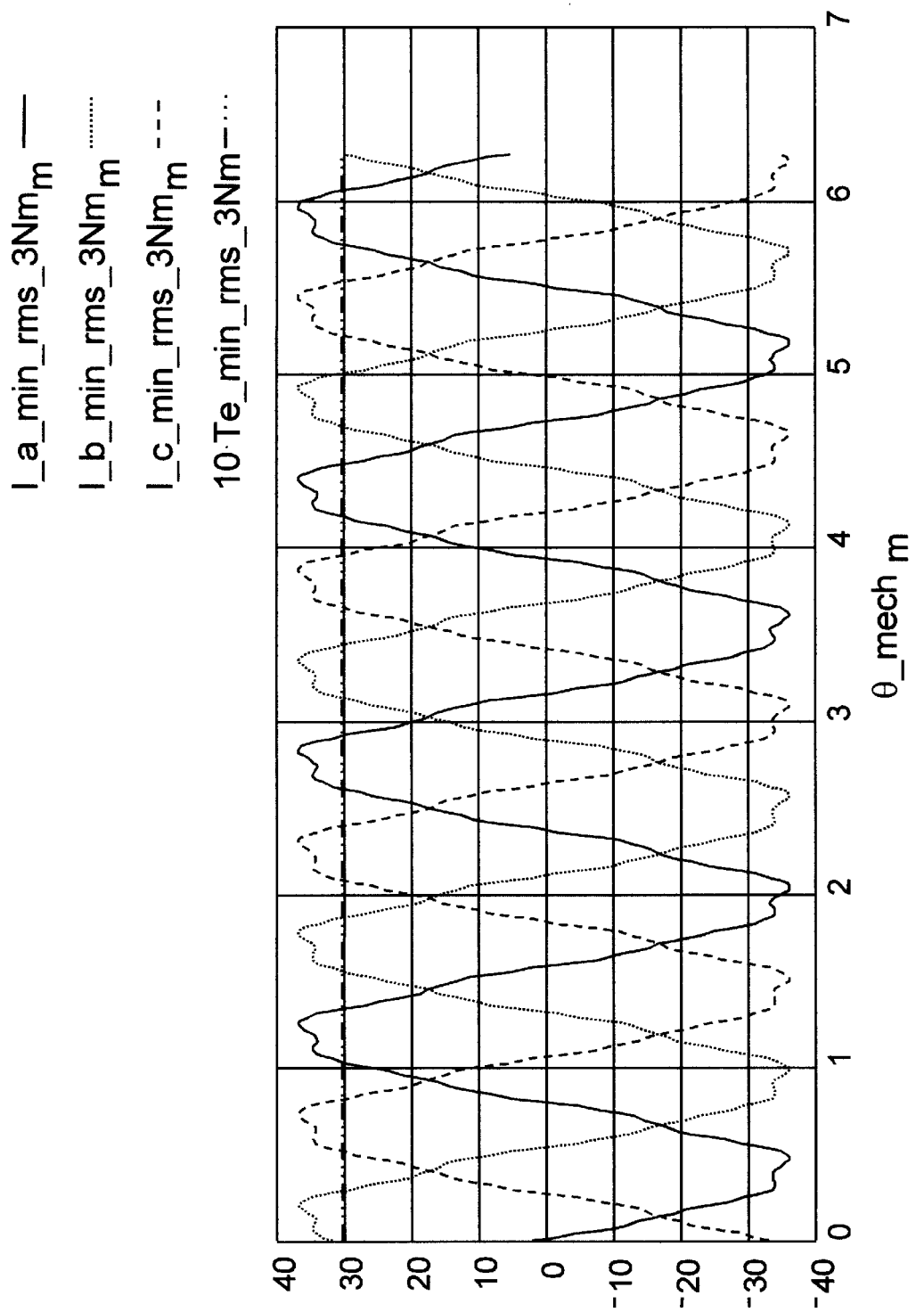
FIG. 9 provides an exemplary plot of appropriate control currents and output torque multiplied 10 for a 3N*m output for the machine represented by FIGS. 2 and 3.

The specific solution provided above is for the case where cogging torque is eliminated but the output of the motor is zero. Obviously, a control system must be able to reduce cogging torque and provide desired motor output torque. Accordingly, a further example is provided wherein a balanced three phase, minimum RMS current solution is developed when a motor output of three Newton-meters (3N*m) is desired. For this example the desired value of Te will be three N-M as opposed to zero in the earlier calculations. Thus, considering the following:

$$\begin{bmatrix} 4 \cdot Bemf(\theta, k\_bemf) & 4 \cdot Bemf\left(\theta - \frac{2 \cdot \pi}{4 \cdot 3}, k\_bemf\right) & 4 \cdot Bemf\left(\theta - \frac{4 \cdot \pi}{4 \cdot 3}, k\_bemf\right) \\ 1 & 1 & 1 \end{bmatrix} \begin{bmatrix} Ia \\ Ib \\ Ic \end{bmatrix} = \begin{bmatrix} Te + -Cogging(\theta, k\_cog) \\ 0 \end{bmatrix}$$

and $$\begin{bmatrix} I\_a\_min\_rms\_3Nm_m \\ I\_b\_min\_rms\_3Nm_m \\ I\_c\_min\_rms\_3Nm_m \end{bmatrix} := \begin{bmatrix} I\_min\_rms(3, \theta\_mech_m, Bemf\_fit\_parameters, Cogging\_fit\_parameters)_0 \\ I\_min\_rms(3, \theta\_mech_m, Bemf\_fit\_parameters, Cogging\_fit\_parameters)_1 \\ I\_min\_rms(3, \theta\_mech_m, Bemf\_fit\_parameters, Cogging\_fit\_parameters)_2 \end{bmatrix}$$

appropriate control currents may be developed. A plot of the appropriate control currents for a 3N*m output is provided in FIG. 9 for the exemplary motor. Also shown in FIG. 9 is the scaled output torque that was calculated using the following equation:

Te_min_rms_3N$_m$:=Te_3_ph($\theta$_mech$_m$,I_a_min_rms_3

Nm$_m$,I_b_min_rms_3Nm$_m$,I_c_min_rms_3

Nm$_m$,Bemf_fit_parameters,Cogging_fit_parameters)

As may be noted, the output torque is a stable and consistent 3N*m as the cogging torque has been completely eliminated.

The first example concerned the development of a motor control where the design criteria for the control required a balanced system and minimum RMS current. A second example is provided below wherein the desired control currents are selected to provide a smooth torque solution that produces minimum ripple for a per unit shaft sensor error.

The sensitivity terms can be derived from total torque equation where excitation torque and cogging are both considered.

$$\boxed{\text{Te\_tot}(\theta, Ia, Ib, Ic) = \text{Bemf\_a}(\theta) \cdot Ia + \text{Bemf\_b}(\theta) \cdot Ib + \text{Bemf\_c}(\theta) + \text{Cogging}(\theta)}$$

The total differential of torque can be calculated as $$\boxed{\text{dTe\_tot}(\theta, Ia, Ib, Ic) = d(\text{Bemf\_a}(\theta) \cdot Ia) + d(\text{Bemf\_b}(\theta) \cdot Ib) + d(\text{Bemf\_c}(\theta) \cdot Ic) + d\text{Cogging}(\theta)}$$

In expanded form the total differential of the torque equation can be written as:

$$\frac{d}{d\theta}\text{Te\_tot}(\theta, Ia, Ib, Ic) = \frac{d}{d\theta}\text{Bemf\_}(a\theta) \cdot Ia + \text{Bemf\_}(a\theta)\frac{d}{d\theta}Ia +$$
$$\frac{d}{d\theta}\text{Bemf\_}(b\theta) \cdot Ib + \text{Bemf\_}(b\theta)\frac{d}{d\theta}Ib +$$
$$\frac{d}{d\theta}\text{Bemf\_}(c\theta) \cdot Ic + \text{Bemf\_}(c\theta)\frac{d}{d\theta}Ic +$$
$$\frac{d}{d\theta}\text{Cogging}(\theta)$$

The torque ripple generated per unit sensor error can be minimized by setting either of the two components of the total differential of torque with respect to angle equal to zero, or in mathematical terms:

$$0 = \frac{d}{d\theta}\text{Bemf\_a}(\theta) \cdot Ia + \frac{d}{d\theta}\text{Bemf\_b}(\theta) \cdot Ib +$$
$$\frac{d}{d\theta}\text{Bemf\_c}(\theta) \cdot Ic + \frac{d}{d\theta}\text{Cogging}(\theta)$$

$$0 = \text{Bemf\_a}(\theta)\frac{d}{d\theta}Ia + \text{Bemf\_b}(\theta)\frac{d}{d\theta}Ib +$$
$$\text{Bemf\_c}(\theta)\frac{d}{d\theta}Ic + \frac{d}{d\theta}\text{Cogging}(\theta)$$

Utilizing the first sensitivity expression described above (the partial derivation of the torque with respect to angle), the problem can be defined in terms of a matrix equation as follows:

$$\begin{bmatrix} 4 \cdot \text{Bemf}(\theta, k\_bemf) & 4 \cdot \text{Bemf}\left(\theta - \frac{2 \cdot \pi}{4 \cdot 3}, k\_bemf\right) & 4 \cdot \text{Bemf}\left(\theta - \frac{4 \cdot \pi}{4 \cdot 3}, k\_bemf\right) \\ 1 & 1 & 1 \\ 4 \cdot d\text{Bemf\_d }\theta(\theta, k) & 4 \cdot d\text{Bemf\_d }\theta\left(\theta - \frac{2 \cdot \pi}{4 \cdot 3}, k\right) & 4 \cdot d\text{Bemf\_d }\theta\left(\theta - \frac{4 \cdot \pi}{4 \cdot 3}, k\right) \end{bmatrix} \begin{bmatrix} Ia \\ Ib \\ Ic \end{bmatrix} =$$

$$\begin{bmatrix} Te + -\text{Cogging}(\theta, k\_cog) \\ 0 \\ -d\text{Cogging\_d }\theta(\theta, k\_cog) \end{bmatrix}$$

Using the exemplary machine described above and assuming that it is connected in conventional 3 phase wye, the A matrix is full rank, so a conventional matrix inverse may be used to calculate the solution. Defining the A and B matrices as follows:

$$A\_zero\_sense(\theta, k\_bemf) :=$$

$$\begin{bmatrix} 4 \cdot Bemf(\theta, k\_bemf) & 4 \cdot Bemf\left(\theta - \frac{2 \cdot \pi}{4 \cdot 3}, k\_bemf\right) & 4 \cdot Bemf\left(\theta - \frac{4 \cdot \pi}{4 \cdot 3}, k\_bemf\right) \\ 1 & 1 & 1 \\ 4 \cdot dBemf\_d\,\theta(\theta, k\_bemf) & 4 \cdot dBemf\_d\,\theta\left(\theta - \frac{2 \cdot \pi}{4 \cdot 3}, k\_bemf\right) & 4 \cdot dBemf\_d\theta\left(\theta - \frac{4 \cdot \pi}{4 \cdot 3}, k\_bemf\right) \end{bmatrix}$$

$$B\_zero\_sense(Te, \theta, k\_cog) := \begin{bmatrix} Te + -Cogging(\theta, k\_cog) \\ 0 \\ -dCogging\_d\,\theta(\theta, k\_cog) \end{bmatrix} \qquad B\_zero\_sense(Te, \theta, k\_cog) := \begin{bmatrix} Te + -Cogging(\theta, k\_cog) \\ 0 \\ 0 \end{bmatrix}$$

a solution function, and solution matrix for a desired 3N*m output may be derived:

I_zero_sense(Te,θ,k_bemf,k_cog)=

(A_zero_sense(θ,k_bemf))$^{-1}$·B_zero_sense(Te,θ,k_cog)

$$\begin{bmatrix} I\_a\_zero\_sense\_3Nm_m \\ I\_b\_zero\_sense\_3Nm_m \\ I\_c\_zero\_sense\_3Nm_m \end{bmatrix} :=$$

$$\begin{bmatrix} I\_zero\_sense(3, \theta\_mech_m, Bemf\_fit\_parameters, Cogging\_fit\_parameters)_0 \\ I\_zero\_sense(3, \theta\_mech_m, Bemf\_fit\_parameters, Cogging\_fit\_parameters)_1 \\ I\_zero\_sense(3, \theta\_mech_m, Bemf\_fit\_parameters, Cogging\_fit\_parameters)_2 \end{bmatrix}$$

Figure 10:
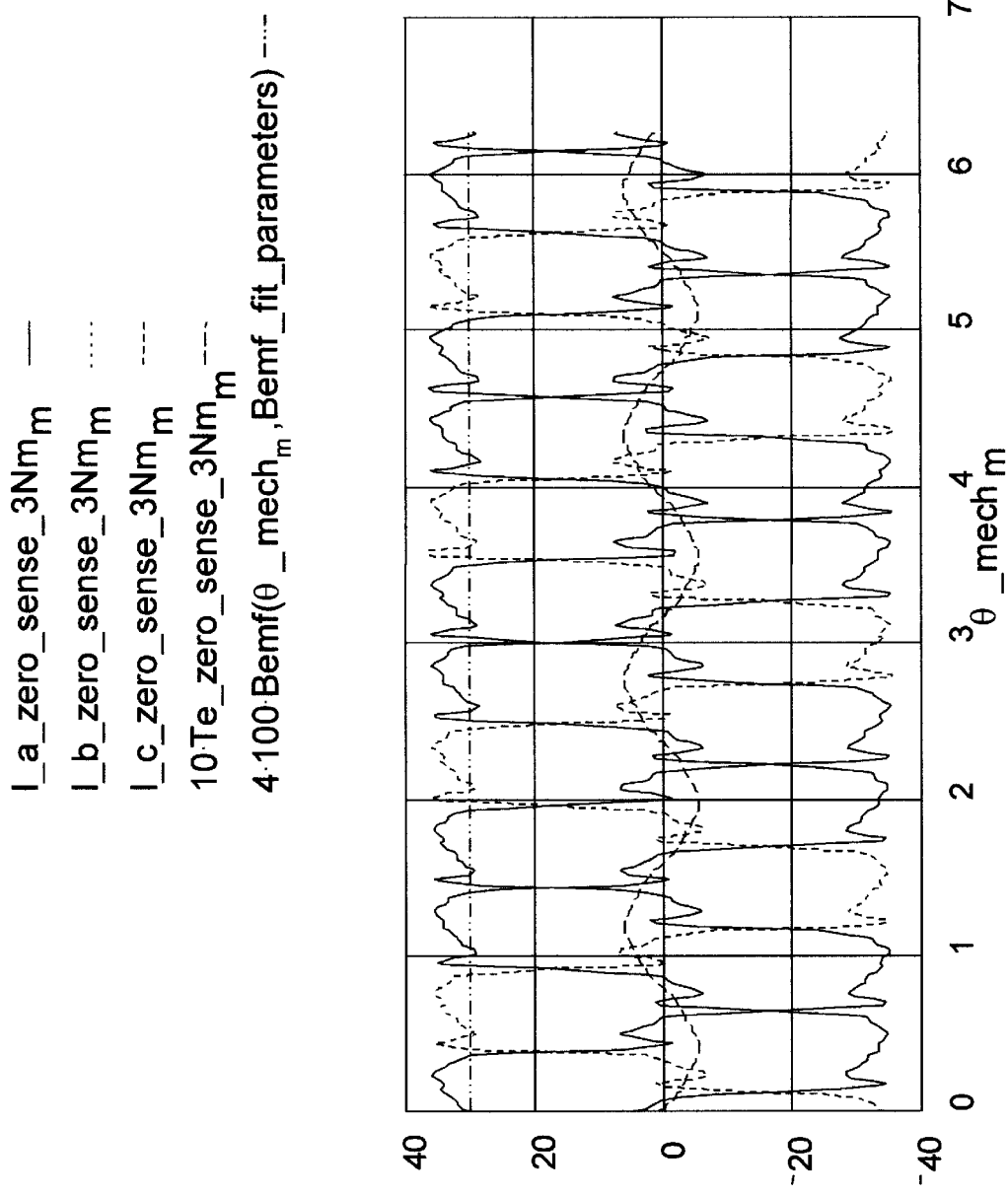
FIG. 10 provides exemplary minimum sensitivity cogging rejection feeds, desired control currents Ia, Ib and Ic, an exemplary Bemf waveform and an exemplary torque output multiplied by 10 for a system including the machine having the characteristics of FIGS. 2 and 3.

Solving for the minimum sensitivity cogging rejection feeds the desired control currents Ia, Ib and Ic illustrated in FIG. 10 may be calculated. Also illustrated in FIG. 10 are the Bemf waveform (to show the number of illustrated cycles) and the output torque multiplied by 10 calculated using the following equation:

Te_zero_sense_3Nm$_m$:=Te_3_ph(θ_mech$_m$,I_a_zero_sense_3

Nm$_m$,I_b_zero_sense_3Nm$_m$,I_c_zero_sense_3

Nm$_m$,Bemf_fit_parameters,Cogging_fit_parameters)

As an inspection of FIG. 10 reveals, the desired current waveforms for the minimum sensitivity solution are relatively complicated. To provide for potentially more tractable control currents it is possible to consider a solution that balances the minimum RMS current solution with the minimum sensitivity solution using slightly different matricies to establish the control parameters:

The development of ideal control currents for this half-minimum RMS/half minimum sensitivity solution is not reflected herein but will be within the ability of one of ordinary skill in the art having the benefit of this disclosure.

As may be noted, the ideal current control waveforms for the minimum sensitivity solution contains more high frequency components in the current than the ideal control currents for the minimum rms solutions. FFT's for the idealized control currents for both solutions can be calculated using the following equations:

FFT_Ia_zero_sense:=CFFT(I_a_zero_sense_3Nm)

FFT_I_a_min_rms:=CFFT(I_a_min_rms_3Nm)

fft_index_I:=0 . . . rows(FFT_I_a_zero_sense)

fft_index_I_a_fft_index_I:=fft_index_

Figure 11:
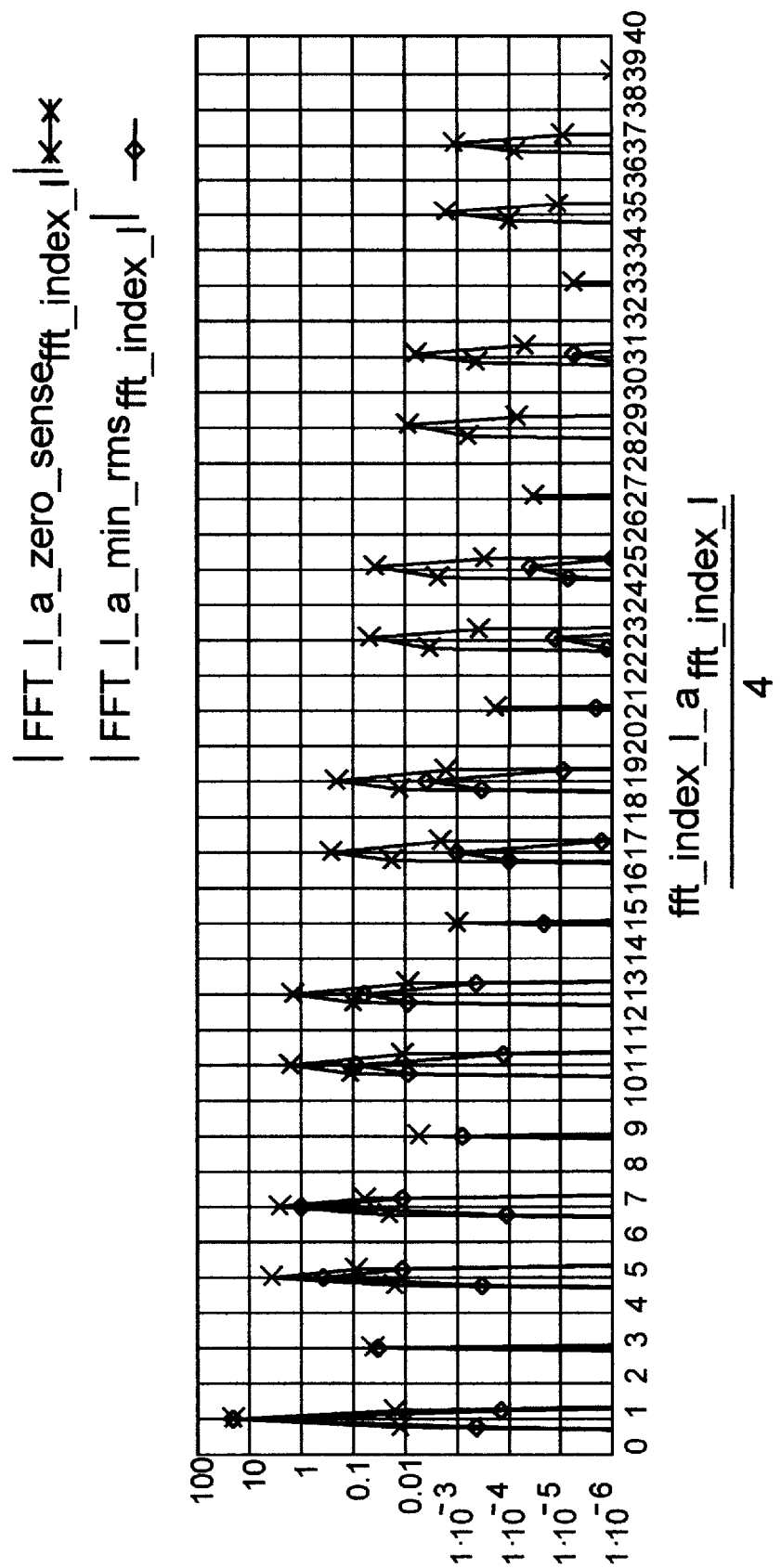
FIG. 11 illustrates FFT's for exemplary idealized control currents that may be used to control the exemplary motor characterized by the data of FIGS. 2 and 3.

Such FFTs have been calculated and are illustrated in FIG. 11 for comparison purposes.

The minimum sensitivity solution provided above was developed based on a particular definition of machine sensitivity. Those of ordinary skill in the art will appreciate that alternate sensitivity definitions could be developed and used and would, accordingly, produce differing idealized control $$A\_zero\_sense(\theta, k\_bemf) :=$$

$$\begin{bmatrix} 4 \cdot Bemf(\theta, k\_bemf) & 4 \cdot Bemf\left(\theta - \frac{2 \cdot \pi}{4 \cdot 3}, k\_bemf\right) & 4 \cdot Bemf\left(\theta - \frac{4 \cdot \pi}{4 \cdot 3}, k\_bemf\right) \\ 1 & 1 & 1 \\ 4 \cdot dBemf\_d\,\theta(\theta, k\_bemf) & 4 \cdot dBemf\_d\,\theta\left(\theta - \frac{2 \cdot \pi}{4 \cdot 3}, k\_bemf\right) & 4 \cdot dBemf\_d\theta\left(\theta - \frac{4 \cdot \pi}{4 \cdot 3}, k\_bemf\right) \end{bmatrix}$$

currents. For example, in contrast to the definition of sensitivity provided above, one could define sensitivity for the three-phase machine under discussion as follows:

$$\text{Sense\_I}(\theta, Ia, Ib, Ic) = \text{Bemf\_a}(\theta)\frac{d}{d\theta}Ia + \text{Bemf\_b}(\theta)\frac{d}{d\theta}Ib + \text{Bemf\_c}(\theta)\frac{d}{d\theta}Ic$$

$$\text{Sense\_I}(\theta, Ia, Ib, Ic) = (-d\text{Cogging\_d}\theta(\theta))$$

Calculating a solution for the ideal control currents using this second sensitivity option can be turned into an algebraic problem by assuming a harmonic series as the solution (the phase currents). The other determined set of equations can then be solved for the sine and cosine harmonic coefficients. The harmonic component parameters of the Bemf function are set equal to a variable with a shorter name for convenience's sake at this point.

$$\text{K\_BEMF} := \text{Bemf\_fit\_parameter}$$

Defining the cosine and sine torque generation terms. To simplify the mathematical derivation of the solution described by the second sensitivity definition above, the machine is assumed to be symmetric (each phase Bemf is the same) which is a reasonable assumption for a machine but not necessary for this version of solution in general. The "torque terms" may then be defined as the sum of the products of each phase Bemf and each corresponding harmonic term of that phase current as follows:

$$\text{An\_Te\_cos}(\theta, n) := 4 \cdot [\text{Bemf}(\theta, \text{K\_BEMF}) \cdot \cos(4 \cdot n \cdot (\theta)) +$$
$$\text{Bemf}\left(\theta - \frac{2 \cdot \pi}{3 \cdot 4}, \text{K\_BEMF}\right) \cdot \cos\left[4 \cdot n \cdot \left(\theta - \frac{2 \cdot \pi}{3 \cdot 4}\right)\right] +$$
$$\text{Bemf}\left(\theta - \frac{4 \cdot \pi}{3 \cdot 4}, \text{K\_BEMF}\right) \cdot \cos\left[4 \cdot n \cdot \left(\theta - \frac{4 \cdot \pi}{3 \cdot 4}\right)\right]]$$

$$\text{An\_Te\_sin}(\theta, n) := 4 \cdot [\text{Bemf}(\theta, \text{K\_BEMF}) \cdot \sin(4 \cdot n \cdot (\theta)) +$$
$$\text{Bemf}\left(\theta - \frac{2 \cdot \pi}{3 \cdot 4}, \text{K\_BEMF}\right) \cdot \sin\left[4 \cdot n \cdot \left(\theta - \frac{2 \cdot \pi}{3 \cdot 4}\right)\right] +$$
$$\text{Bemf}\left(\theta - \frac{4 \cdot \pi}{3 \cdot 4}, \text{K\_BEMF}\right) \cdot \sin\left[4 \cdot n \cdot \left(\theta - \frac{4 \cdot \pi}{3 \cdot 4}\right)\right]]$$

The dAn_Te_cos_dI_dθ and dAn_Te_sin_dI_dθ (partial derivatives of each torque term with respect to each phase current times the derivative of each phase current with respect to angle −(dpartial(Bemf*I)/dpartial_I)*dI/dθ− sense_I−sense_I is used to designate the solution that uses the derivative of the phase current with respect angle−the second sensitivity definition) terms may then be expressed as the sum of the products of each phase Bemf and the derivative with respect to angle of each corresponding harmonic term of that phase current:

$$\text{dAn\_Te\_cos\_dI\_d}\theta(\theta, n) := 4 \cdot n \cdot [\text{Bemf}(\theta, \text{K\_BEMF}) \cdot \sin(4 \cdot n \cdot (\theta)) +$$
$$\text{Bemf}\left(\theta - \frac{2 \cdot \pi}{3 \cdot 4}, \text{K\_BEMF}\right) \cdot \sin\left[4 \cdot n \cdot \left(\theta - \frac{2 \cdot \pi}{3 \cdot 4}\right)\right] +$$
$$\text{Bemf}\left(\theta - \frac{4 \cdot \pi}{3 \cdot 4}, \text{K\_BEMF}\right) \cdot \sin\left[4 \cdot n \cdot \left(\theta - \frac{4 \cdot \pi}{3 \cdot 4}\right)\right]] \cdot 40$$

$$\text{dAn\_Te\_sin\_dI\_d}\theta(\theta, n) := 4 \cdot n \cdot [\text{Bemf}(\theta, \text{K\_BEMF}) \cdot \cos(4 \cdot n \cdot (\theta)) +$$
$$\text{Bemf}\left(\theta - \frac{2 \cdot \pi}{3 \cdot 4}, \text{K\_BEMF}\right) \cdot \cos\left[4 \cdot n \cdot \left(\theta - \frac{2 \cdot \pi}{3 \cdot 4}\right)\right] +$$
$$\text{Bemf}\left(\theta - \frac{4 \cdot \pi}{3 \cdot 4}, \text{K\_BEMF}\right) \cdot \cos\left[4 \cdot n \cdot \left(\theta - \frac{4 \cdot \pi}{3 \cdot 4}\right)\right]] \cdot 40$$

The number of harmonic components of the proposed solution can then be defined for purposes of this example as follows:

harm_number_max:=14 n:=0 . . . harm_number_max and the electrical frequency harmonics to be used in the calculation may be set as set forth below:

harm:=(1 5 7 11 13 17 19 23 25 29 31 35 37 41 43)$^T$

Defining the "A matrix" to enable a solution for the harmonic sine and cosine coefficients of the phase currents to be found in a "least squares sense" one may defining the generalized inverse function for a determined sets of linear equations:

A_sense_I:=0

A_sense_I$_{m,n}$:=An_Te_cos(θ_mech$_m$,harm$_n$)

A_sense_I$_{m,n+harm\_number\_max+1}$:=An_Te_sin(θ_mech$_m$,harm$_n$)

A_sense_I$_{m+360,n}$:=dAn_Te_cos_dI_dθ(θ_mech$_m$,harm$_n$)

A_sense_I$_{m+360,n+harm\_number\_max+1}$:=dAn_Te_sin_dI_dθ(mech$_m$,harm$_n$)

pinv_1(A):=(A$^T$·A)$^{-1}$·A$^T$

The "B vec" can then be defined to enable a solution for the harmonic sine and cosine coefficients of the phase currents to be found in a least squares sense. For purposes of this example, a particular solution will be provided for a 3 N*m desired output with minimum sensitivity to shaft sensor error using the second definition provided herein:

B_vec$_m$:=3+−Cogging(θ_mech$_m$,Cogging_fit_parameters)

B_vec$_{m+360}$:=−dCogging_dθ(θ_mech$_m$,Cogging_fit_parameters)

Calculating the current harmonic coefficients for the harmonics listed that produce 3 N*m and minimum sensitivity using:

harm_coeffs:=pinv_1(A_sense_I)·B_vec it is possible to define a function to calculate the phase currents from their harmonic components.

$$I\_LS(\theta, \text{harm\_coeffs}) := \sum_n [\text{harm\_coeffs}_{\tilde{n}_i} \cdot \cos[4 \cdot harm_n \cdot (\theta)] +$$
$$\text{harm\_coeffs}_{\tilde{n}_i + \text{harm\_number\_max}+1} \cdot \sin[4 \cdot harm_n \cdot (\theta)]]$$

Calculating the phase currents for the smooth torque, minimum sensitivity solution (according to the second definition):

$$I\_a\_sense\_I_m := I\_LS(\theta\_mech_m, \text{harm\_coeffs})$$

$$I\_b\_sense\_I_m := I\_LS\left(\theta\_mech_m - \frac{2 \cdot \pi}{3 \cdot 4}, \text{harm\_coeffs}\right)$$

$$I\_c\_sense\_I_m := I\_LS\left(\theta\_mech_m - \frac{4 \cdot \pi}{3 \cdot 4}, \text{harm\_coeffs}\right)$$

The full ideal control currents for the solution using the second definition of sensitivity are not set forth herein as the calculation of such complete currents is well within the level of one of ordinary skill in the art having the benefit of this disclosure.

It is interesting to compare the ideal control currents and the resulting calculated torque for the three solutions discussed above for a 3 N.* output, i.e. (1) the 3NM solution for minimum RMS current; (2) the 3N*m solution for minimum sensitivity (first definition); and (3) the 3N*m solution for minimum sensitivity (second definition). This may be done defining rotor angle offsets at which torque is calculated and calculating electric torque for both minimum sensitivity solution referred to hereafter as "sense_I" (second definition) and sense_θ (first definition) as follows:

$$p := 0 \ldots 40$$

$$\delta_p := (p - 20) \frac{2 \cdot \pi}{360 \cdot 4}$$

Calculating electric torque for both 3 N*m minimum sensitivity solutions, sense_I and sense_θ.

Te_sense_I_3Nm$_{m,p}$:=Te_3_ph(θ_mech$_m$+δ$_p$,I_a_sense_I$_m$,
  I_b_sense_I$_m$,I_c_sense_I$_m$,Bemf_fit_parameters,Cogging_fit_parameters)

Te_sense_θ_3Nm$_{m,p}$:=Te_3_ph(θ_mech$_m$+δ$_p$,I_a_zero_sense_3Nm$_m$,I_b_zero_sense_3

Nm$_m$,I_c_zero_sense_3Nm$_m$,Bemf_fit_parameters,Cogging_fit_parameters)

Te_min_rms_3Nm$_{m,p}$:=Te_3_ph(θmech$_m$+δ$_p$,I_a_min_rms_3

Nm$_m$,I_b_min_rms_3Nm$_m$,I_c_min_rms_3

Nm$_m$,Bemf_fit_parameters,Cogging_fit_parameters)

$$Te\_rip\_pp(Te) := \frac{(\max(Te) - \min(Te))}{\text{mean}(Te)}$$

Te_rip_sense_I$_p$:=Te_rip_pp(Te_sense_I_3Nm$^{<p>}$)

Te_rip_rms$_p$:=Te_rip_pp(Te_min_rms_3Nm$^{<p>}$)

Te_rip_sense_θ$_p$:=Te_rip_pp(Te_sense_θ_3Nm$^{<p>}$)

Figure 12:
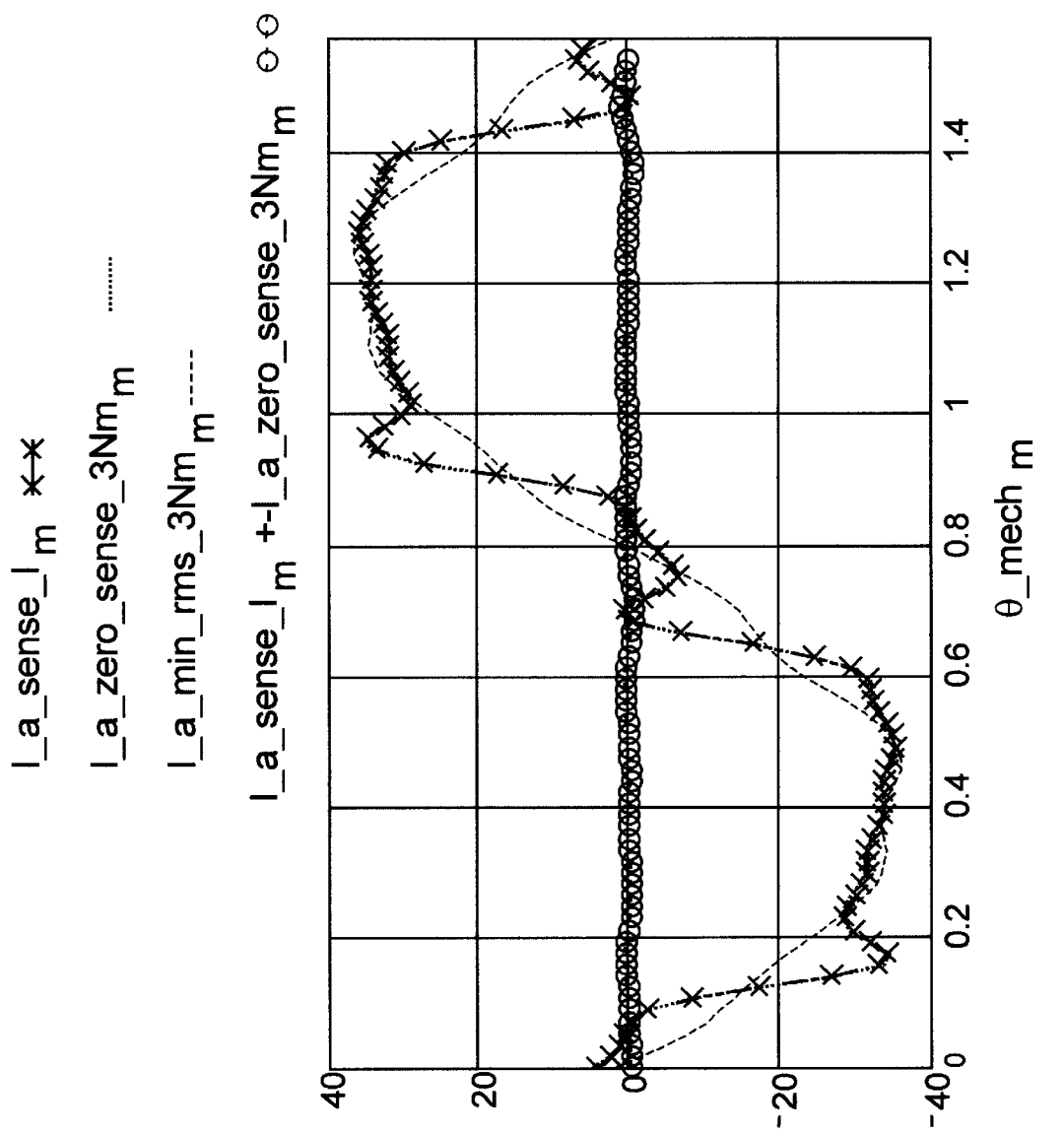
FIG. 12 provides a plot of exemplary idealized phase A control currents that may be used to control the exemplary motor characterized by the plots of FIGS. 2 and 3.
Figure 13:
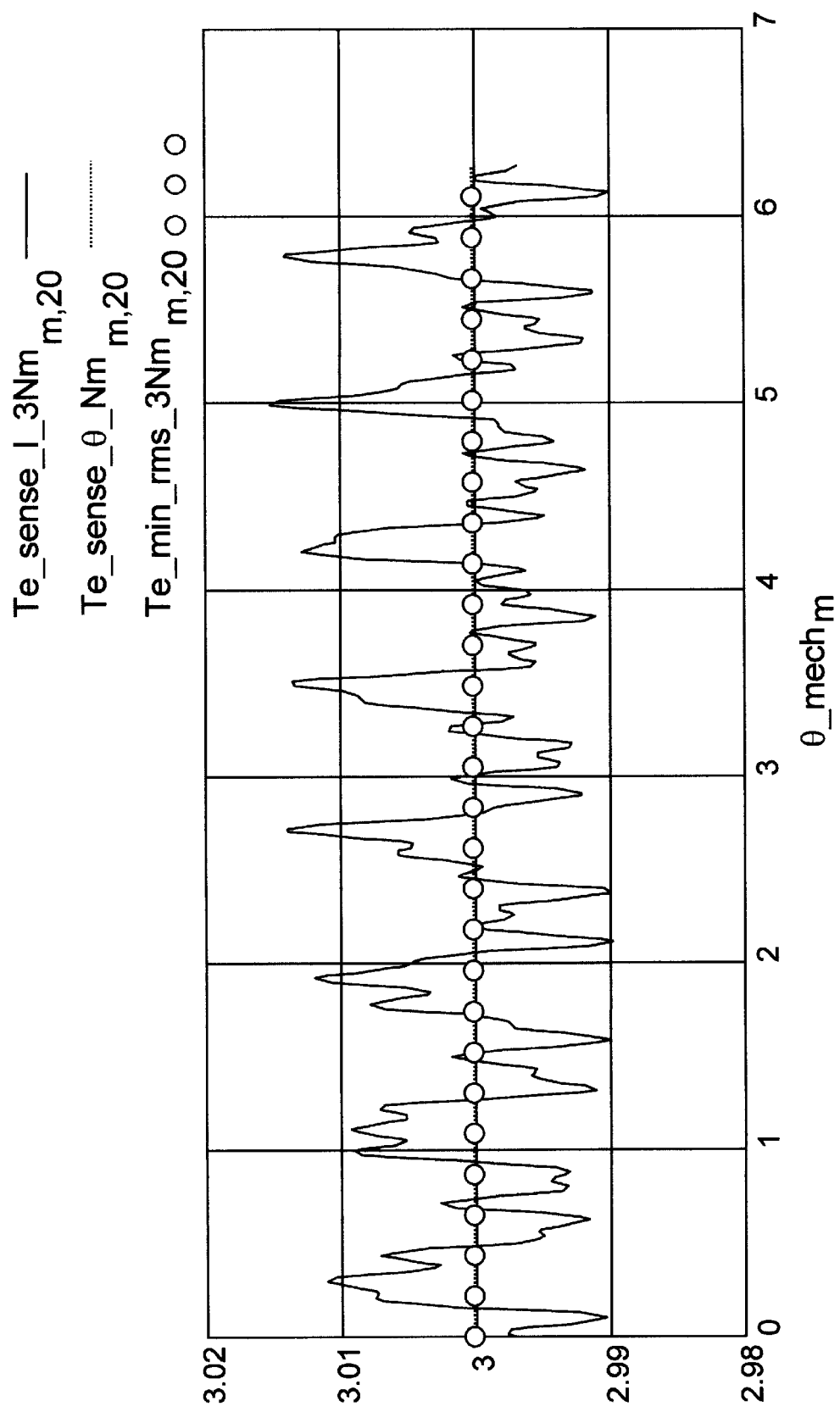
FIG. 13 provides a plot of the output torques produced for the control currents of FIG. 12.

For purposes of comparison, a plot of the idealized phase A control current for all three solutions (min rms., min sensitivity (second definition) "sense_I", min sensitivity (first definition) "sense_θ" over one electrical cycle is provided in FIG. 12 and a plot of the output torques produced for all three solutions is provided in FIG. 13.

Figure 14:
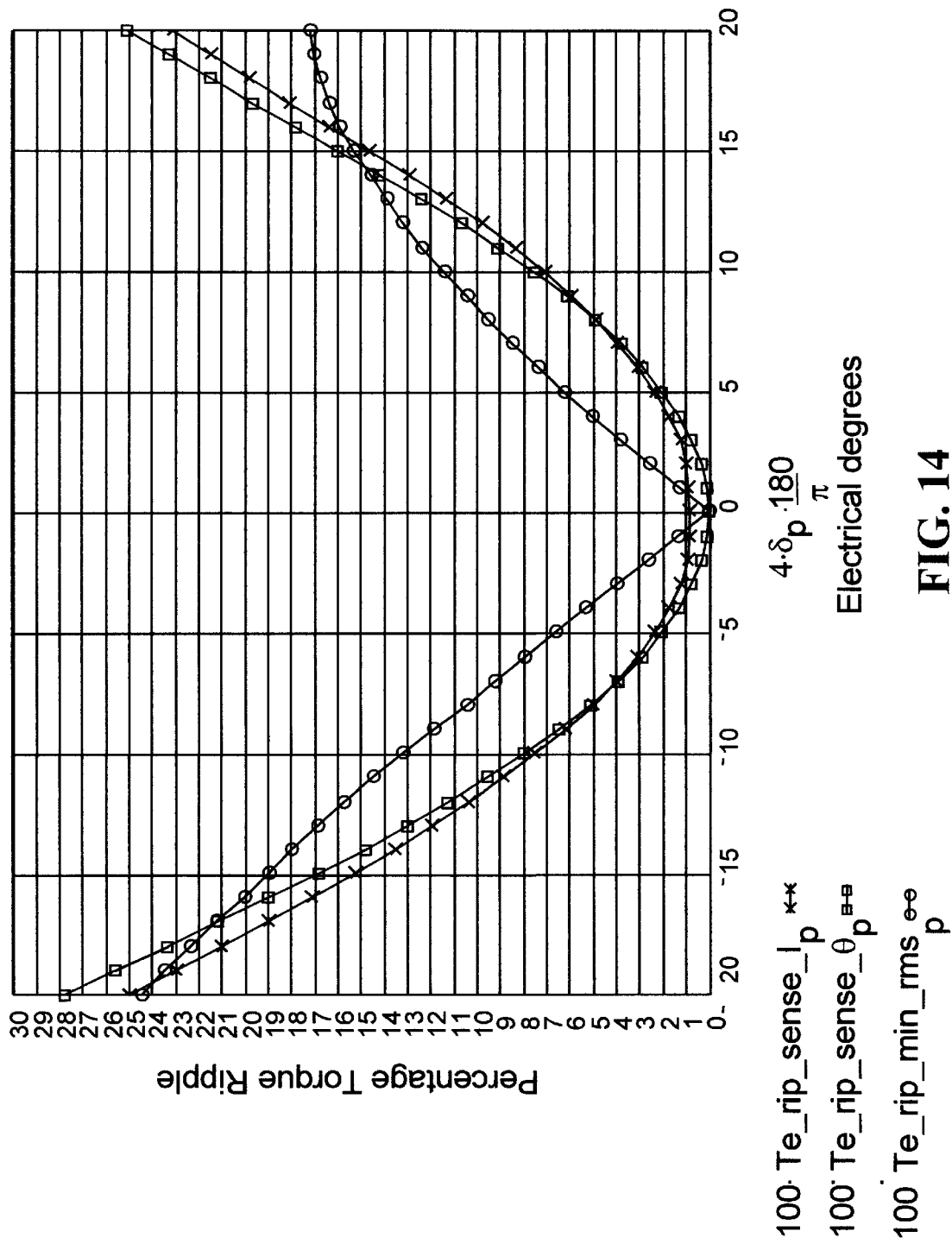
FIG. 14 provides a plot of the percentage ripple vs. sensor error in electrical degrees for two minimum sensitivity solutions and the minimum RMS current solution that may be used to control the exemplary motor represented by the plots of FIGS. 2 and 3.

Notably, since the sense_I solution is a "least squares" solution, the instantaneous torque still contains a small amount of ripple (less than 1%). A plot of the percentage ripple vs. sensor error in electrical degrees for the all three solutions is further provided in FIG. 14.

Once a machine is characterized to yield its Bemf and cogging signatures and a control scheme is developed using those parameters to implement various design criteria, it is desirable to implement the developed control scheme. As those of ordinary skill in the art will appreciate, various approaches and reference frames can be used to implement a given control scheme. The active torque irregularity reduction approaches of the present disclosure are not limited to any particular control scheme or reference frame. For purposes of discussion, however, a few specific reference frames will be discussed.

One of the most familiar and straightforward approaches to implement a desired solution is through a motor control operating utilizing a per-phase reference frame. In such a motor control, the individual phase currents of the motor are detected in real time and separately controlled. For three phase systems, this reference frame is commonly referred to as the ABC reference frame since the three phases are commonly referred to as the A, B and C phases.

In general a motor controller operating in the ABC frame will receive or generate signals corresponding to the currents flowing in each phase of the motor to be controlled. Those signals will be compared to current command signals for each of the phases to generate error signals and the error signals will be used to adjust the current supplied to the phase windings so as to implement the desired control scheme.

In the ABC frame the total current command for each phase may calculated as the sum of each of the two components:

1.) a "Cogging Rejection Component" and

2.) a "Torque Production Component."

Because the physical phenomena that gives rise to the cogging torque of a given machine is independent on the current flowing in the machine in the linear case the amplitude of the cogging rejection component, for a given rotor position in the linear case, will be fixed and will not change with the amplitude of the current flowing in the machine or the desired output torque of the machine. This is not true of the torque production current component, however, which will—assuming that the machine is operating in a linear region—vary linearly with output torque.

Because in the linear case the cogging rejection component of the current commands are, for a given rotor position, fixed, it is possible to develop a motor controller that is similar in many respects to conventional controllers but that has an active cogging rejection component injected into the desired motor controller. Examples of such controllers are illustrated in FIGS. 15A, 15B, and 16.

Figure 15A:
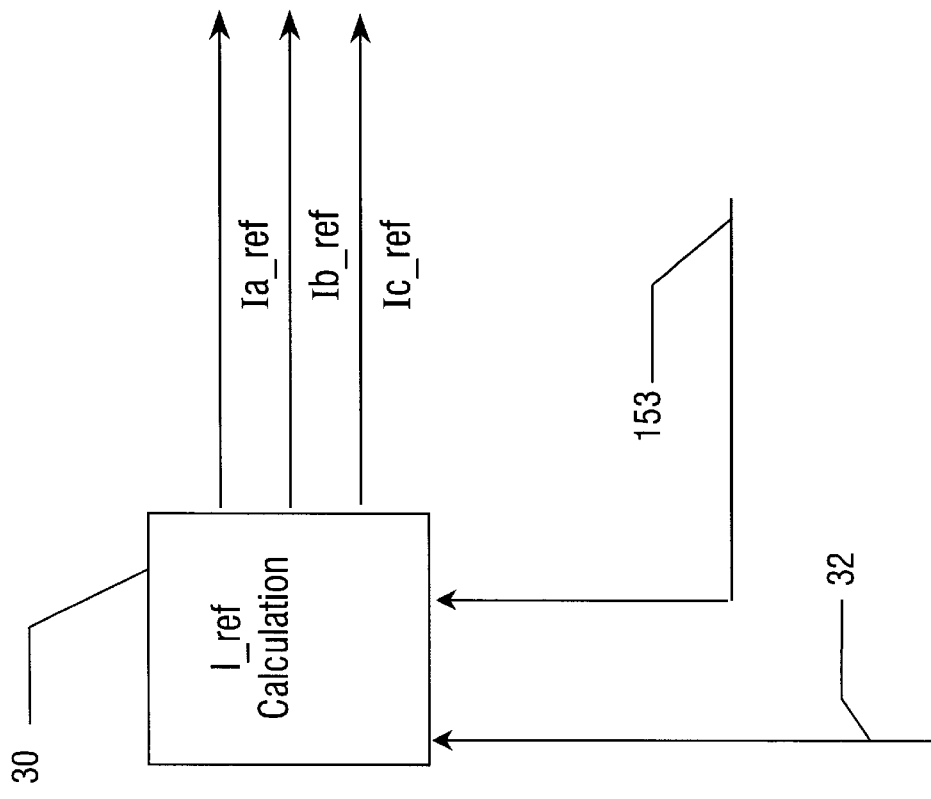
FIGS. 15A, 15B and 16 illustrate exemplary controllers that utilize active cogging rejection to reduce or eliminate undesirable torque irregularities.
Figure 15B:
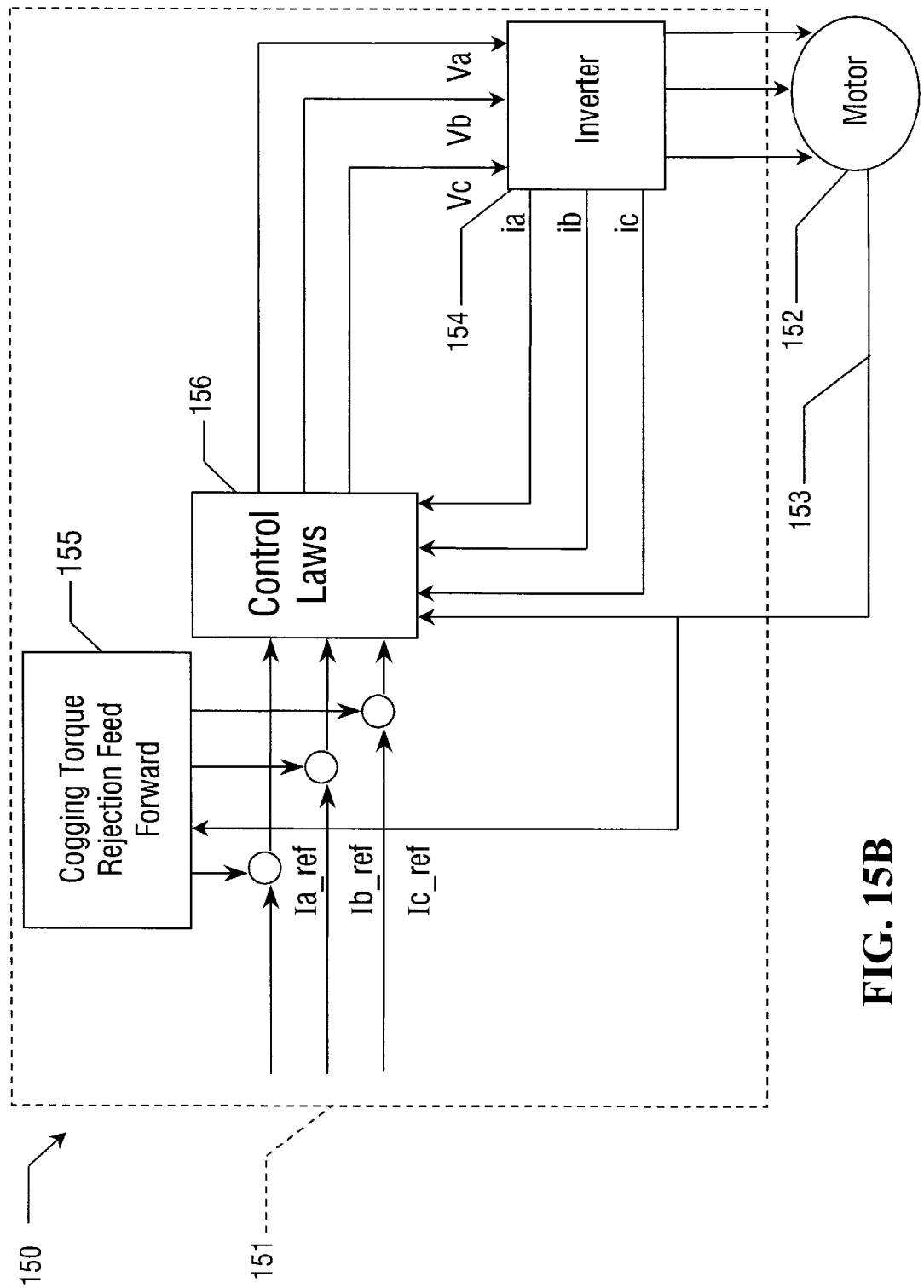
Figure 16:
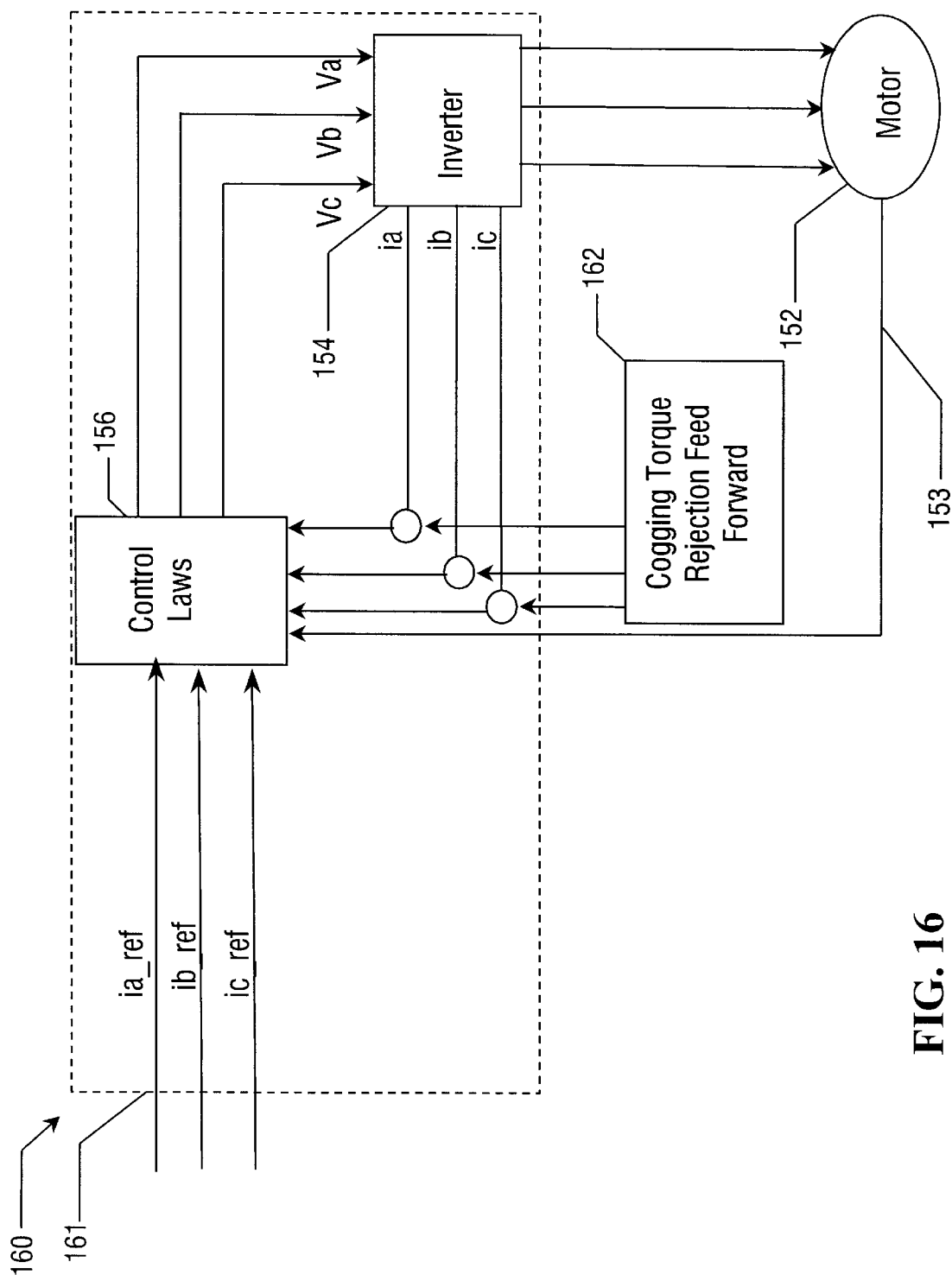

Referring first to FIG. 15A, exemplary circuitry 30 for generating torque producing component phase current references is illustrated. These phase current references ia_ref, ib_ref and ic_ref are passed to controller 151 of FIG. 15B. The torque producing component phase current references are, in general, a function of the desired output torque, rotor position and rotor speed.

In the exemplary circuitry of FIG. 15A, The torque producing component phase current reference generator 30 receives as inputs: (a) an electrical signal Te Command 32 representing the commanded torque output of the machine to be controlled by controller 151; and (b) a rotor position feedback signal 153 representing the angular position and speed of the rotor. The torque command signal Te Command 32 may be generated by known control circuit that generate desired torque commands in response to sensed motor parameters and a desired command parameter, such as a desired rotor speed. For example, the torque command signal may be generated by comparing the output speed of the motor with a desired output speed to produce a torque command that increase when the actual speed is below the desired speed and decrease when the actual speed is above the desired speed. Techniques and circuitry for generating torque command signals for electric machine control are well known in the art and will not be further discussed.

In general, in the linear region, the current reference generator 30 will receive as inputs the torque command signal 32 and the position feedback signal 153 and provide in response as outputs electoral commands corresponding to the currents that should be established in the phase windings of the motor to be controlled to produce the desired torque output. The relationship between the inputs to current reference generator 30 and the outputs of the current reference generator may vary from motor to motor and the appropriate input/output relationships for a given motor may be determined or calculated utilizing the methods described above, as well as other known motor control methods.

Figure 18:
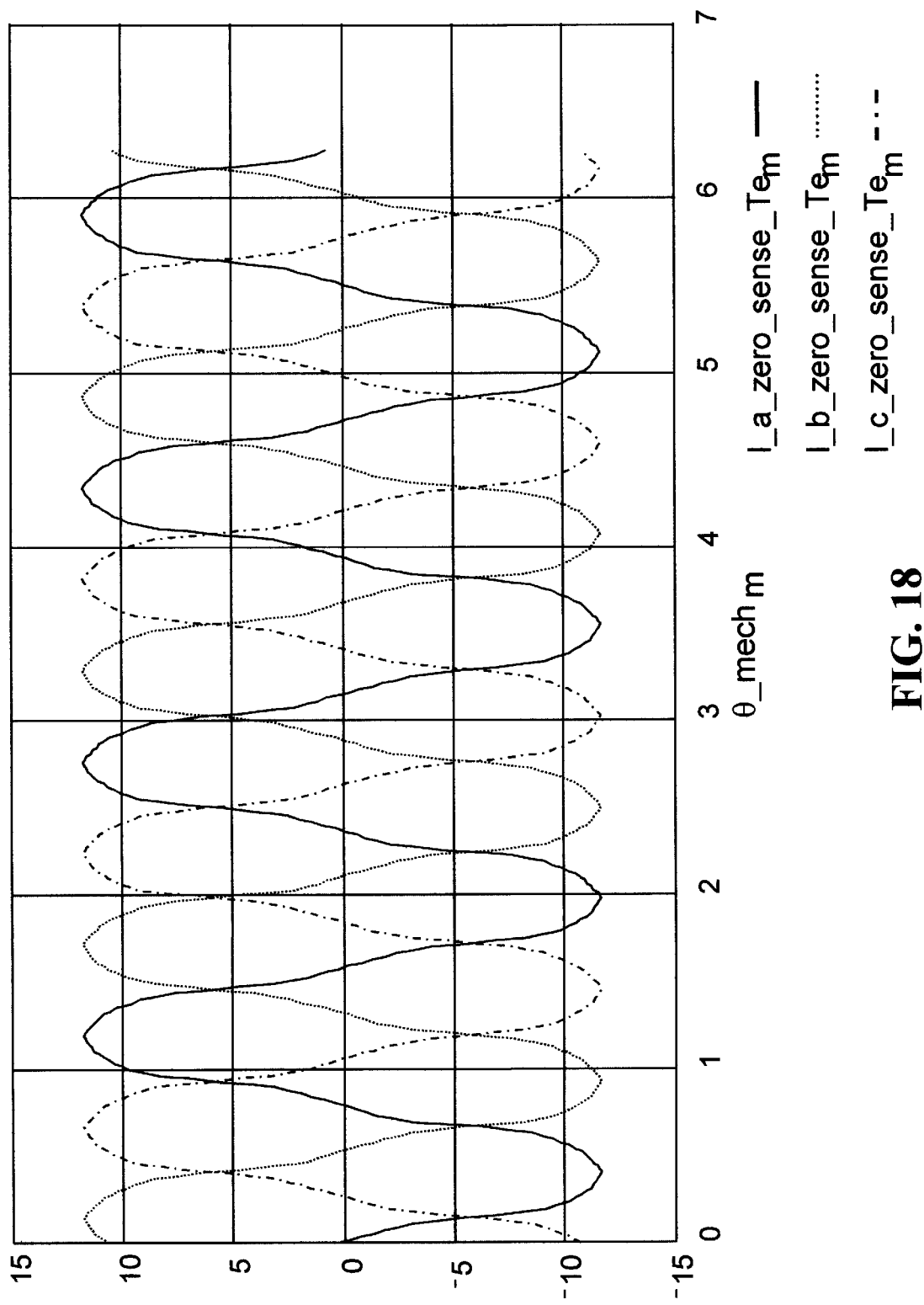
FIG. 18 provides exemplary illustrations of representative torque producing currents that may be produced by the controllers of FIGS. 15 and 16.

One exemplary plot of desired phase current references vs. rotor angle position for an exemplary 1N*m input command torque for a motor operating in the linear region is provided in FIG. 18. In the illustrated example, because the motor is operating in the linear region, the torque producing component phase current references have the same general "shape" with respect to rotor position at any commanded torque and will just vary linearly in amplitude with the commanded torque (directly proportional to commanded torque).

Current reference generator 30 may be implemented utilizing hardware (such as a lookup table that maps input parameters as addresses to appropriate output parameters), software that calculates the desire phase current commands from the input parameters, or a combination of the two (e.g., a sparse matrix mapping inputs to outputs with some interpolation software). The construction of such a circuit will be within the ability of one of ordinary skill in the art having the benefit of this disclosure and will not, therefore, be discussed in detail herein.

Referring to FIG. 15B a motor control system 150 is illustrated that includes a controller 151 for controlling the current in an electric motor 152 to produce a desired output torque or speed. Controller 151 receives as inputs: (a) current command signals Ia_ref, Ib_ref and Ic_ref corresponding to desired phase currents generated utilizing the circuitry of FIG. 15A as a function of, for example, the desired torque, rotor position and speed; (b) a rotor position feedback signal 153 representing the angular position and speed of the rotor; and (c) current feedback signals Ia, Ib and Ic representing the actual current flowing in the motor 152. The current feedback signals Ia, Ib and Ic signals may be generated using conventional current sending or estimation approaches and the rotor position and speed information may be generated through use of a rotor position detector of sufficient accuracy, a resolver, an encoder, or a sensorless approach for calculating or estimating rotor position. In the illustrated embodiment, the current feedback signals Ia, Ib and Ic are taken from the output of an inverter 154 that is used to provide electric power to motor 152.

Referring to FIG. 15B, the control circuit 151 includes a component 155 that receives as an input the rotor position and speed signals 153 and generates a torque irregularity rejection current feed reference that is added to the torque producing component command currents Ia_ref, Ib_ref and Ic_ref. In general, torque irregularity rejection component 155 is a component that generates current signals that correspond to the currents that must flow in motor 152 to cancel the cogging torque or other torque irregularities that would otherwise exist. The determination of the values of such currents, for any given rotor position and speed, may be accomplished using any of the methods described above.

The construction of torque irregularity rejection component 155 may take many forms. Where the control circuit of FIGS. 15A and FIG. 15B is implemented by programming a programmable processor or by properly configuring or constructing a dedicated digital signal processor ("DSP") component 155 may take the form of a software routine that generates the torque irregularity rejection signal in response to the rotor position and speed signals 153. This may be accomplished by a software routine that includes: (1) a look-up data correlating every rotor position and speed to a torque rejection signal; (2) a rough matrix of corresponding rotor positions, speeds, and torque irregularity rejection signals and a routine for interpolating such information for positions and speed not reflected in the matrix; (3) a routine for calculation—using, for example, the methods described above, the torque irregularity rejection component from stored data and the rotor position and speed information; or (4) and combination of the above (1)–(4). In addition to primarily software implementations of component 155, hardware and partial-hardware/partial-software implementations of component 155 are also envisioned. For example, component 155 may simply constitute a look-up table that receives as an address input a digital representation of the position and speed of the rotor and provides as outputs digital or analog representations of the torque rejection references. The construction of such a component 155 will be within the ability of one of ordinary skill in the art having the benefit of this disclosure.

As may be noted, the torque irregularity rejection component 155 provides as outputs torque irregularity rejection current references for each of the three phase windings A, B and C. These torque irregularity rejection references are summed with the torque producing current commands Ia_ref, Ib_ref and Ic_ref to produce composite current commands that are applied to a control law table or routine 156 that implements the desired control law for the system. In general, control law element 156 receives as inputs the composite current commands and rotor position and speed signals and provides command voltages Va, Vb and Vc that are provided as inputs to inverter 154. Those of ordinary skill in the art will understand that many control laws may be used to control a motor system such as proportional control P, integral control I or proportional plus integral control PID and others. The rotor position and speed information enables the use of "feed forward speed compensation", rotor position and speed dependant "gain scheduling", "feed forward speed compensation" control laws and others that take speed and any position dependant electrical properties into account. In addition, conventional approaches for selecting and implementing control laws in a motor control system may be used to implement control law element 156.

Inverter 154 receives the command voltages and, in response to those voltages, applies controlled electric power to the motor 152 so as to cause the currents in the phase windings of motor 152 to approach the composite command currents. Inverter 154 may be of conventional construction and may use a variety of known techniques to control the application of electric power to motor 152. For example, inverter 154 may use pulse width modulation, pulse frequency modulation, space vector modulation, or other approaches to control the application of power to motor 152. Alternate designs are envisioned where inverter 154 is placed or used in conjunction with known current controllers that appropriately control the current flowing in the phase windings of motor 152.

Because the current produced in the motor 152 by the controller 151 will include both a torque producing component that tends to produce a desired output torque (generated in response to Ia_ref, Ib_ref and Ic_ref) and an "anti-cogging component" (generated in response to the torque irregularity rejection references) the output of motor 152 will tend to be the desired output torque without the undesirable torque irregularities resulting from, for example, cogging.

Those of ordinary skill in the art will understand that the controller 151 described above is exemplary only and that equivalently performing controllers may be constructed using all hardware, primarily software, or a combination of hardware and software.

The ABC motor controller of FIGS. 15A and 15B, while straightforward in construction requires development of a motor controller 151 that had dedicated torque rejection components. FIG. 16 illustrates an approach in which many of the torque rejection benefits of the subject matter described herein may be achieved using conventional controllers with little or no modification.

FIG. 16 illustrates a motor control system 160 including a motor controller 161 and a motor 152. The motor controller 161 is similar in structure and operation to the controller 151 discussed in connection with FIG. 15B and like numbers have been used to represent like elements. Notably, motor controller 161 does not include within its structure a torque rejection component. In this sense, motor controller 161 is similar to many available motor controllers which do not include active torque rejection components but that include elements for controlling the current in a motor in response to input reference current commands. The input reference current commands may be provided by any suitable system such as, for example, the system of FIG. 15A. Thus controller 161 may be a conventional motor controller.

Coupled to motor controller 161 is a torque rejection circuit 162 that is separate from conventional controller 161. Torque rejection circuit 162 receives as an input the angular position and velocity of the rotor via feedback signal 153 and provides torque rejection signals that are summed with the actual feedback current signals Ia, Ib and Ic to produce modified feedback signals that are applied to the current feedback inputs of controller 161. In structure the "cogging" torque rejection component 162 may be similar to that of component 155 described in connection with FIG. 15B. However, where torque rejection circuitry 155 provided a positive indication of the currents that should flow to actively cancel the torque irregularities, torque rejection circuit 162 should provide the negative of that current (adjusted for the control laws) such that appropriate control will be implemented. The addition of this negative signal will adjust the sensed currents such that the inputs to the motor controller are not the actual sensed currents but a variant of the actual sensed currents. Thus the conventional motor controller 161 will attempt to control the modified current values as opposed to the actual current values in such a manner that the anti-cogging benefits of the disclosed subject matter are obtained through the use of a conventional controller. Controller 161 then operates in a conventional fashion to bring the composite feedback currents towards alignment with the current command signals Ia_ref, Ib_ref and Ic_ref. Through the use of circuit 162 and the system of FIG. 16 conventional controllers can be used to effect active torque irregularity rejection and systems employing conventional controllers can be retrofitted to provide active torque irregularity reduction.

It should be noted that the negative current references provided by circuit 162 of FIG. 16 should be selected to compensate for the control laws and gain implemented by the control law component of controller 161.

In each of the controllers of FIG. 15B and FIG. 16, the cogging rejection component of the phase current (or the negative thereof) is developed for each phase current reference. The other component of each phase current reference is the "torque production component" which may be provided by a system as illustrated in FIG. 15A. Exemplary illustrations of representative torque rejection (or anti-cogging currents) may be found in FIG. 17. Exemplary illustrations of representative torque producing currents may be found in FIG. 18.

Figure 19:
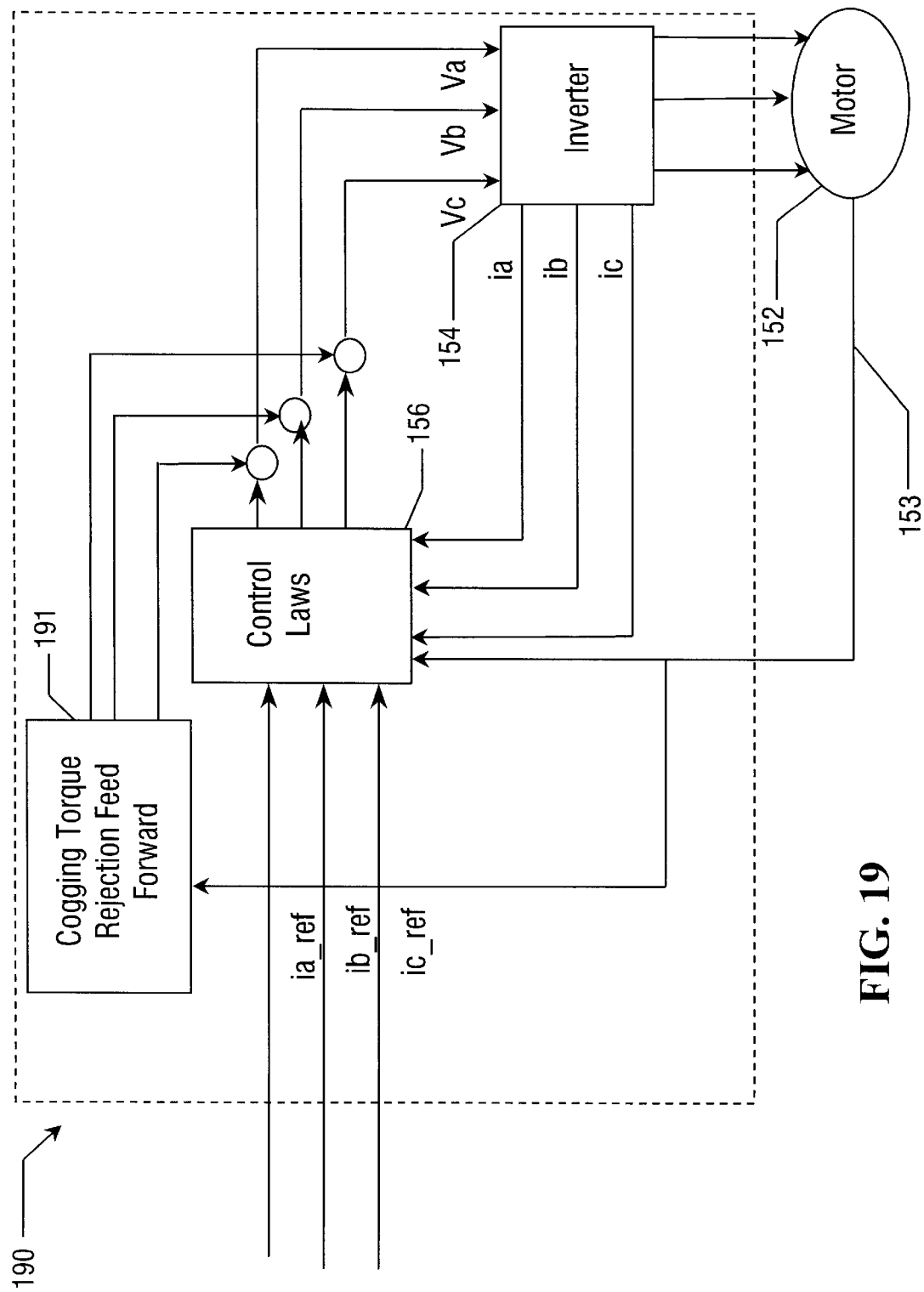
FIG. 19 illustrates an exemplary controller constructed in accordance with certain teachings of this disclosure in which the torque rejection feed added to the voltage outputs from a control law element.

In the ABC-based systems of FIGS. 15A, 15B, and 16, the control system was based on current commands and the torque irregularity rejection references were in terms of current. Those of ordinary skill in the art will appreciate that a voltage-based system could be adopted and that the torque rejection feeds could be provided in terms of voltage. In such systems, it may be desirable to have the torque irregularity rejection references added to the voltage outputs from the control law element. A general illustration of an exemplary system 190 is provided by FIG. 19. In that system torque irregularity rejection references are provided by element 191 in terms of voltage and that voltage references are summed to the output of the control law element 156. The remainder of the elements operate as described above in connection with FIG. 15.

The exemplary described controllers operated in the ABC reference frame. Alternate active torque rejection controllers are envisioned that operate in the α, β, 0 frame. The α, β, 0 frame is essentially a geometric decomposition of the ABC variables onto an "X and Y" plane with the sum of the ABC components being the 0 component in the new frame. The transformation set equal to "C" below is the transformation from the A, B, C to α, β, 0 frame.

In this reference frame the currents are defined in terms of an a current, a β current, and a third current that is always 0. Because one of the currents is always zero, controllers utilizing the α, β, and 0 reference frame in some circumstances require fewer complex calculations and less bandwidth than controllers using the ABC reference frame.

The transformation from the ABC frame to α, β, and 0 frame can be defined as follows:

$$c := \frac{2}{3} \begin{bmatrix} 1 & \frac{-1}{2} & \frac{-1}{2} \\ 0 & \frac{-\sqrt{3}}{2} & \frac{\sqrt{3}}{2} \\ \frac{1}{2} & \frac{1}{2} & \frac{1}{2} \end{bmatrix}$$

The inverse transformation from the α, β, 0 frame to the A, B, C frame can be defines as follows:

$$c^{-1} := \begin{bmatrix} 1 & 0 & 1 \\ \frac{-1}{2} & \frac{-1}{2}\sqrt{3} & 1 \\ \frac{-1}{2} & \frac{1}{2}\sqrt{3} & 1 \end{bmatrix}$$

The relationship between variables in the ABC frame and the α, β, and 0 frame can be written as:

$$f_{\alpha\beta0} := c \cdot f_{ABC}$$

$$f_{ABC} := c^{-1} \cdot f_{\alpha\beta0}$$

The α, β, and 0 frame current references, for the example where the sensitivity to position error is minimized, can be calculated as:

$$\begin{bmatrix} I\_\alpha\_zero\_sense\_tot\_sum_{m,p} \\ I\_\beta\_zero\_sense\_tot\_sum_{m,p} \\ I\_0\_zero\_sense\_tot\_sum_{m,p} \end{bmatrix} := \frac{2}{3} \cdot \begin{bmatrix} 1 & \frac{-1}{2} & \frac{-1}{2} \\ 0 & \frac{-\sqrt{3}}{2} & \frac{\sqrt{3}}{2} \\ \frac{1}{2} & \frac{1}{2} & \frac{1}{2} \end{bmatrix} \cdot$$

$$\begin{bmatrix} I\_a\_zero\_sense\_Te_m \\ I\_b\_zero\_sense\_Te_m \\ I\_c\_zero\_sense\_Te_m \end{bmatrix} \cdot$$

$$Te\_command_p + \frac{2}{3} \cdot$$

$$\begin{bmatrix} 1 & \frac{-1}{2} & \frac{-1}{2} \\ 0 & \frac{-\sqrt{3}}{2} & \frac{\sqrt{3}}{2} \\ \frac{1}{2} & \frac{1}{2} & \frac{1}{2} \end{bmatrix} \cdot$$

$$\begin{bmatrix} I\_a\_zero\_sense\_cog\_rej_m \\ I\_b\_zero\_sense\_cog\_rej_m \\ I\_c\_zero\_sense\_cog\_rej_m \end{bmatrix}$$

The torque equation can also be transformed into the α, β, and 0 frame by substituting for [Ia, Ib, Ic] in terms of Iα, Iβ and I0 in the ABC frame torque equation as follows:

$$Te\_ABC(\theta, Ia, Ib, Ic, k\_bemf, k\_cog) := 4 \cdot [Bemf(\theta, k\_bemf)$$

$$Bemf\left(\theta - \frac{2 \cdot \pi}{3 \cdot 4}, k\_bemf\right)$$

$$Bemf\left(\theta - \frac{4 \cdot \pi}{3 \cdot 4}, k\_bemf\right)] \cdot$$

$$\begin{bmatrix} Ia \\ Ib \\ Ic \end{bmatrix} + Cogging(\theta, k\_cog)$$

$$\begin{bmatrix} Ia \\ Ib \\ Ic \end{bmatrix} := \begin{bmatrix} 1 & 0 & 1 \\ \frac{-1}{2} & \frac{-1}{2}\sqrt{3} & 1 \\ \frac{-1}{2} & \frac{1}{2}\sqrt{3} & 1 \end{bmatrix} \cdot \begin{bmatrix} I\alpha \\ I\beta \\ I0 \end{bmatrix}$$

-continued $$Te\_\alpha\beta0(\theta, I\alpha, I\beta, I0, k\_bemf, k\_cog) := [Bemf(\theta, k\_bemf)$$

$$Bemf\left(\theta - \frac{2 \cdot \pi}{3 \cdot 4}, k\_bemf\right)$$

$$Bemf\left(\theta - \frac{4 \cdot \pi}{3 \cdot 4}, k\_bemf\right)] \cdot$$

$$\begin{bmatrix} \begin{bmatrix} 1 & 0 & 1 \\ \frac{-1}{2} & \frac{-1}{2}\sqrt{3} & 1 \\ \frac{-1}{2} & \frac{1}{2}\sqrt{3} & 1 \end{bmatrix} \cdot \begin{bmatrix} I\alpha \\ I\beta \\ I0 \end{bmatrix} \end{bmatrix} +$$

$$Cogging(\theta, k\_cog)$$

Using the torque and cogging signatures for a given machine, the techniques discussed above, and the conversions provided above, α, β, and 0 current references for a given machine can be determined that will provide the desired output torque and reduce the undesired torque irregularities. Exemplary current solutions for the machine having the cogging and torque signatures illustrated in FIGS. 2 and 3 for a desired −4 N*m output torque are provided in FIG. 20. As reflected in FIG. 20 the 0 reference currents are always zero. As such, if a controller is developed that provides appropriate reference currents as a function of the angular position and speed of the rotor through the use of a look-up table, there is possibility that an α, β, and 0-based controller would require a smaller look-up memory than a controller using the ABC frame since only two look-ups as opposed to three need be completed. Also, for a controller that calculates the control currents in real time, an α, β, and 0 reference-based controller may require fewer calculations than an ABC reference-based controller.

Figure 20:
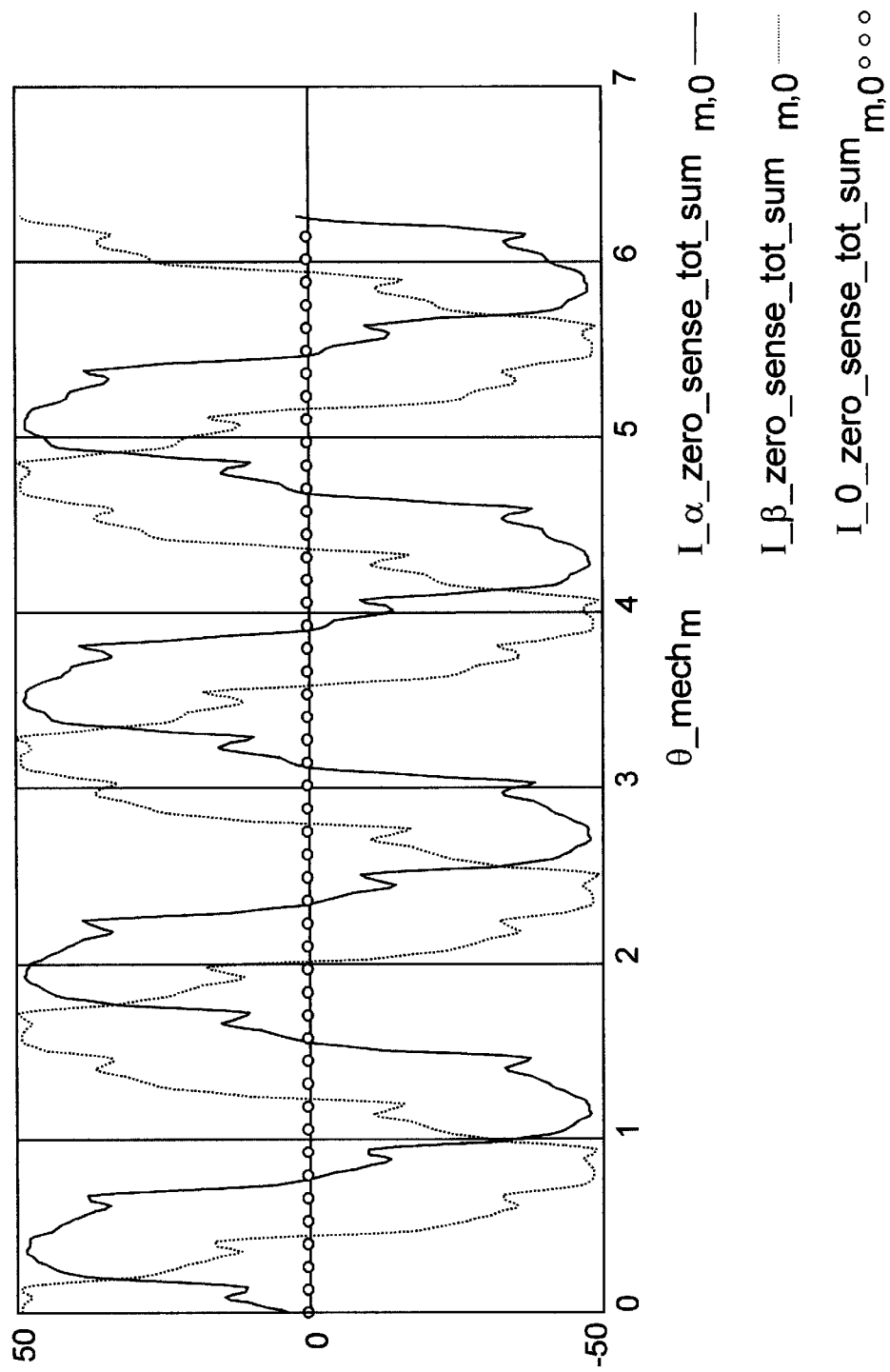
FIG. 20 provides exemplary current solutions that may be used with the machine having the cogging and torque signatures illustrated in FIGS. 2 and 3 to produce a desired −4 N*m output.
Figure 21:
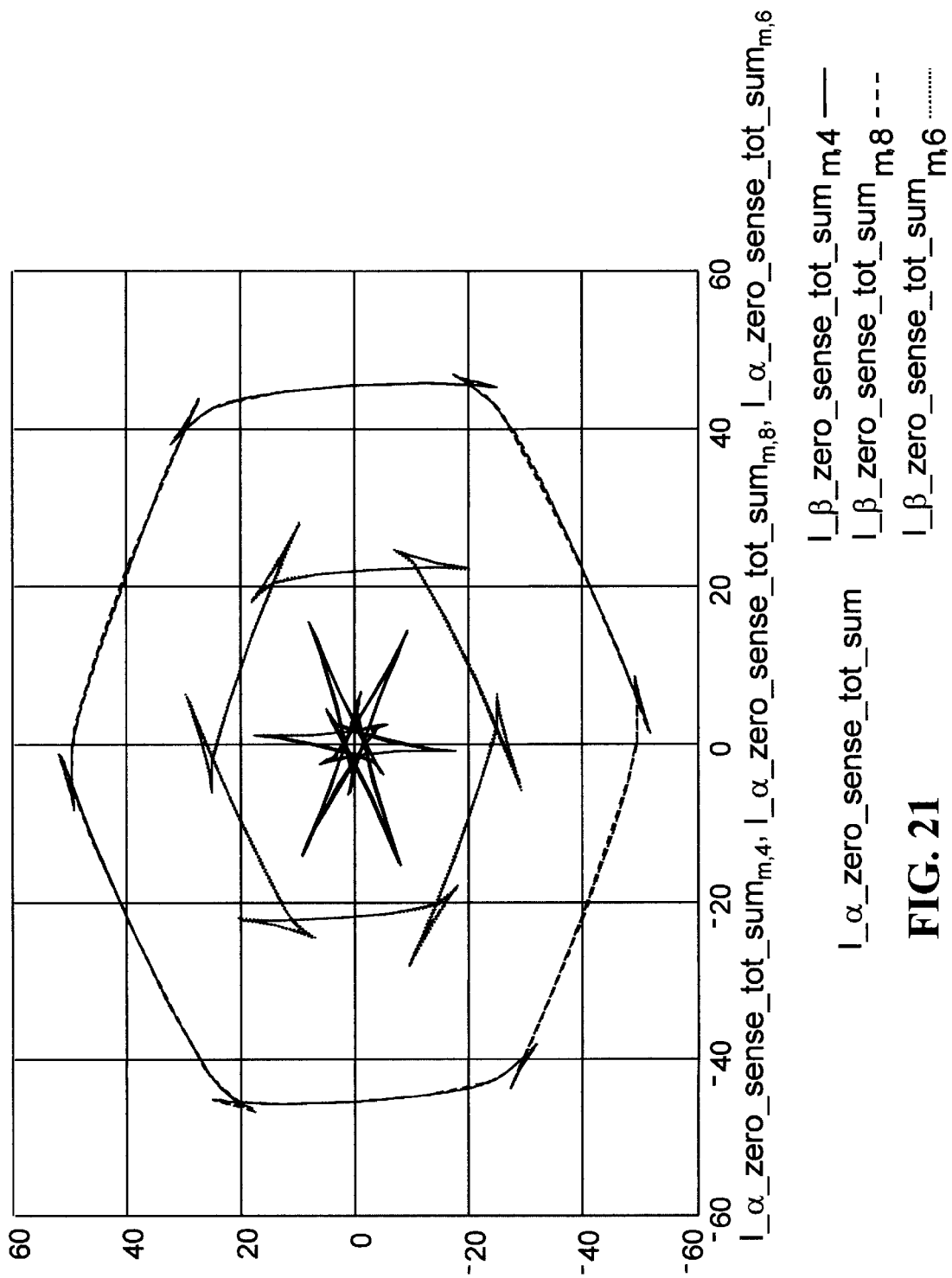
FIG. 21 illustrates a $\alpha$, $\beta$, plane plot ignoring the 0 sequence currents for various current solutions in a rotating reference frame.

FIG. 20 illustrates an α, β, and 0 plane plot for a −4 N*m torque output. Because the 0 current will always have a value of 0, the 0 currents may be ignored. FIG. 21 illustrates an α, β plane plot ignoring the 0 currents for various torque outputs. As may be noted, for certain ranges of torque, there is a ready relationship between the a currents and the , currents that may be easily calculated and controlled. If it is known that a motor will be operating with a torque range corresponding to one of these more straightforward relationships, then an α, β, and 0 reference-based controller may be desirable because of the reduced computational complexity that would be required to implement such a controller over an ABC based controller.

Figure 22:
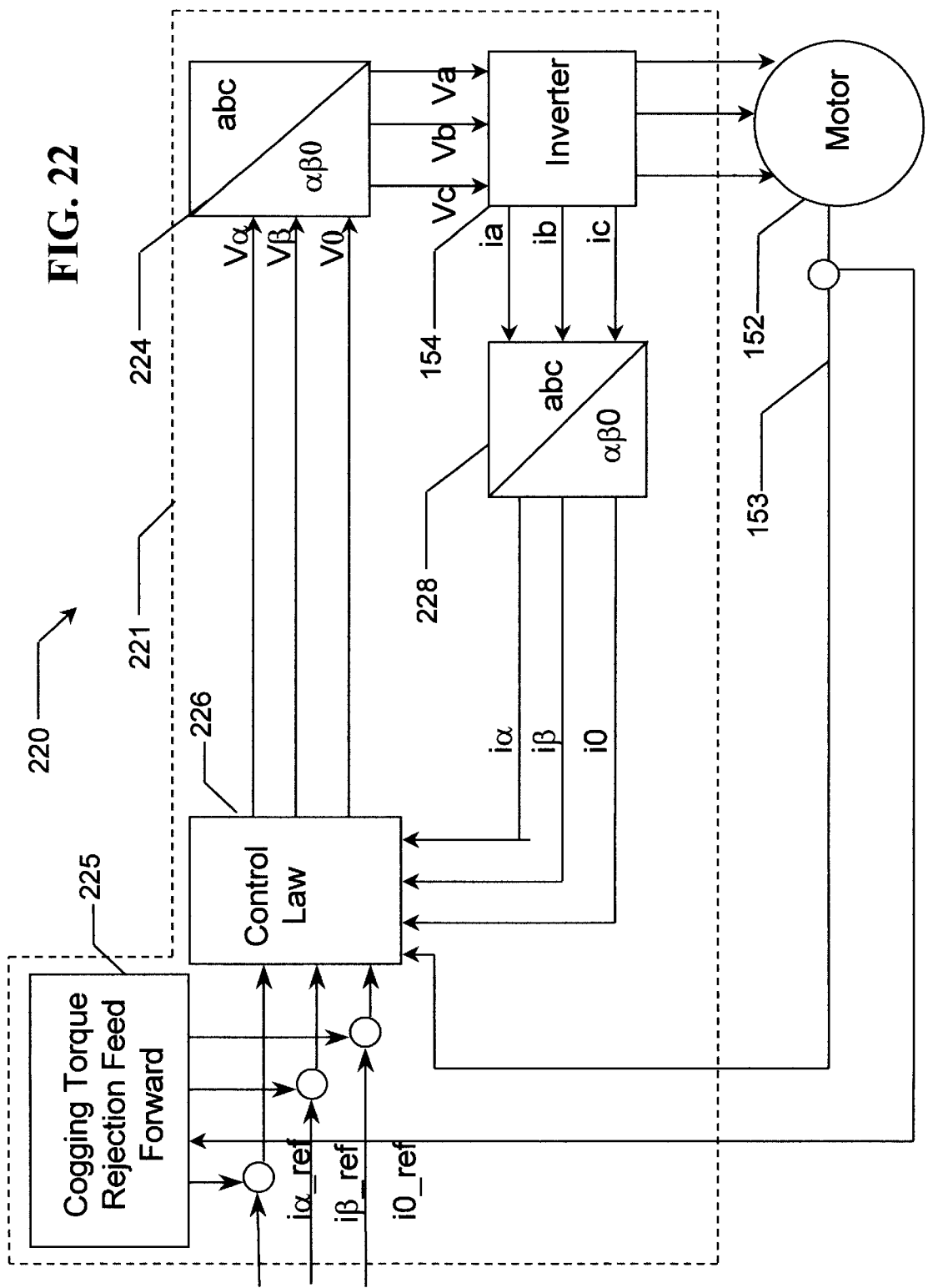
FIG. 22 illustrates an exemplary $\alpha$, $\beta$, 0 based control system for providing active torque irregularity reduction that is constructed in accordance with certain teachings contained in this disclosure.

One exemplary α, β, and 0 based control system 220 for providing active torque irregularity reduction is provided in FIG. 22. Outside of the use of a differing reference frame, the operation of system 220 is similar to the operation of system 150 discussed above in connection with FIGS. 15A and 15B.

Referring to FIG. 22, an α, β, and 0 based control system 220 is illustrated that includes an α, β, and 0 based controller 221 that provides controlled power to a motor 152. The controller 221 receives as inputs rotor position and speed information on input lines 153 and command current information in terms of an I α and I β from the I_ref calculation means of which will operate in a similar fashion to that shown in FIG. 15A and described earlier. The difference will be the torque producing component references will be Ia_ref, Ipref, IO_ref where the 0 component is always zero and is not needed. Iα_ref and Iβ_ref can be calculated by means described previously by simply applying the transformation "C" to Ia_ref, Ib_ref, Ic_ref signals, for example, those shown in FIG. 18. Iα_ref, Iβ_ref, could also be calculated directly from the motor torque equation which has been transformed into the α, β, 0 frame using methods described previously. Because the 0 current will always have a zero value, no 0 current command is required.

A torque rejection component 225 also receives the rotor position and speed signals 153 and provides torque rejection feeds in terms of Iα and Iβ. Again, no 0 current component is required. The outputs from the torque rejection component 225 are summed with the command currents to produce composite signals that are provided to the control law element 226 that implements appropriate control in the α, β, and 0 reference frame to produce command voltages in terms of α, β, and 0. Because the physical motor operates in accordance with three phases A, B and C and because the inverter 154 will provide such currents in terms of Ia, Ib and Ic, converter circuitry/algorithms 224 is provided to convert the command voltages, which are in terms of α, β, and 0 into commands in terms of ABC. The inverter then operates as described above in connection with FIG. 15B to appropriately energize motor 152. Additionally, inverter 154 provides the current feedback signals that represent the actual current in the motor 152. Again, because the motor currents will be sensed in terms of ABC, a converter component 228 is provided to covert the sensed (or calculated) currents in the ABC reference frame to currents in the α, β, and 0 frame. The feedback currents in terms of α, β, and 0 are then provided to the control law element 226 for processing.

The controller 221 of FIG. 22 can be implemented through hardware, software, or a combination of the two, and can be modified as described in connection with FIG. 15B above.

In addition to being able to be implemented in the ABC and α, β, and 0 reference, the active torque irregularity rejection approach of this disclosure may be implemented through a controller operating in a reference frame that rotates at a given frequency. For a motor controller in accordance with the teachings provided herein, the most likely candidate for a reference frame is a frame that rotates in synchronism with the Bemf signature of the motor to be controlled; or a reference that takes into account the cogging signature of the machine.

First, an exemplary controller using a rotating reference frame that rotates in synchronism with the Bemf will be discussed. The use of this particular rotating frame will insure the torque producing components of the current command are quasi-static in nature. The cogging rejection component of the current commands will not, however, be quasi-static. The desired current command will be represented as a complex exponential.

First the current commands must be expressed in the rotating reference frame. This may be converting the current command representation from an ABC frame to the α, β, 0 frame as follows:

$$\begin{bmatrix} I\alpha(Ia, Ib, Ic) \\ I\beta(Ia, Ib, Ic) \\ I0(Ia, Ib, Ic) \end{bmatrix} = \frac{2}{3} \cdot \begin{bmatrix} 1 & \frac{-1}{2} & \frac{-1}{2} \\ 0 & \frac{-\sqrt{3}}{2} & \frac{\sqrt{3}}{2} \\ \frac{1}{2} & \frac{1}{2} & \frac{1}{2} \end{bmatrix} \cdot \begin{bmatrix} Ia \\ Ib \\ Ic \end{bmatrix}$$

$$I\alpha(Ia, Ib, Ic) := \frac{2}{3} \cdot Ia - \frac{1}{3} \cdot Ib - \frac{1}{3} \cdot Ic$$

$$I\beta(Ia, Ib, Ic) := \frac{-1}{3}\sqrt{3} \cdot Ib + \frac{1}{3}\sqrt{3} \cdot Ic$$

-continued $$I0(Ia, Ib, Ic) := \frac{1}{3} \cdot Ia + \frac{1}{3} \cdot Ib + \frac{1}{3} \cdot Ic$$

Iα(Ia,Ib,Ic):=⅔·Ia−⅓·Ib−⅓·Ic

Iβ(Ia,Ib,Ic):=−⅓√3·Ib +⅓√3·Ic

I0(Ia,Ib,Ic):=⅓·Ia+⅓·Ib+⅓·Ic and then (2) deriving a complex polar representation of the command currents by calculating the "angle and radius" of the polar representation of the current references in accordance with the following equations:

σ_sv(Ia,Ib,Ic):=angle(Iα(Ia,Ib,Ic),Iβ(Ia,Ib,Ic))

R_sv(Ia,Ib,Ic):=√(Iα(Ia,Ib,Ic)²+Iβ(Ia,Ib,Ic)²)

Calculating the complex exponential form of the control currents may thus be accomplished as follows:

I_sv(Ia,Ib,Ic):=R_sv(Ia,Ib,Ic)·e^(j·σ_sv(Ia,Ib,Ic))

A transformation that insures the torque producing components of the current feeds are quasi-static can be calculated from, for example, the 1Nm torque producing components of the command currents through the use of the following equation:

$$K\_QD0\_ABC(Ia\_ref, Ib\_ref, Ic\_ref) :=$$

$$\frac{1}{R\_sv(Ia\_ref, Ib\_ref, Ic\_ref)} \cdot e^{-j(\sigma\_sv(Ia\_ref, Ib\_ref, Ic\_ref))}$$

One can then define a function to calculate the rotating components of the current feed in terms of a rotating frame (or quadrature, direct, and 0 "QD0" components) as follows:

I_QD0(Ia_ref,Ib_ref,Ic_ref,Ia,Ib,Ic):=K_QD0_ABC(Ia_ref,Ib_ref,Ic_ref,)·Ia_sv(Ia,Ib,Ic)

Examples of the QD0 may then be calculated using the following equation:

I_QD0_Bemf_{m,p}:=I_QD0(I_a_zero_sense_Te_m,I_b_zero_sense_Te_m,I_c_zero_sense_

Te_m,I_a_zero_sense_tot_{m,p},I_b_zero_sense_tot_{m,p},I_c_zero_sense_tot_{m,p})

Figure 23:
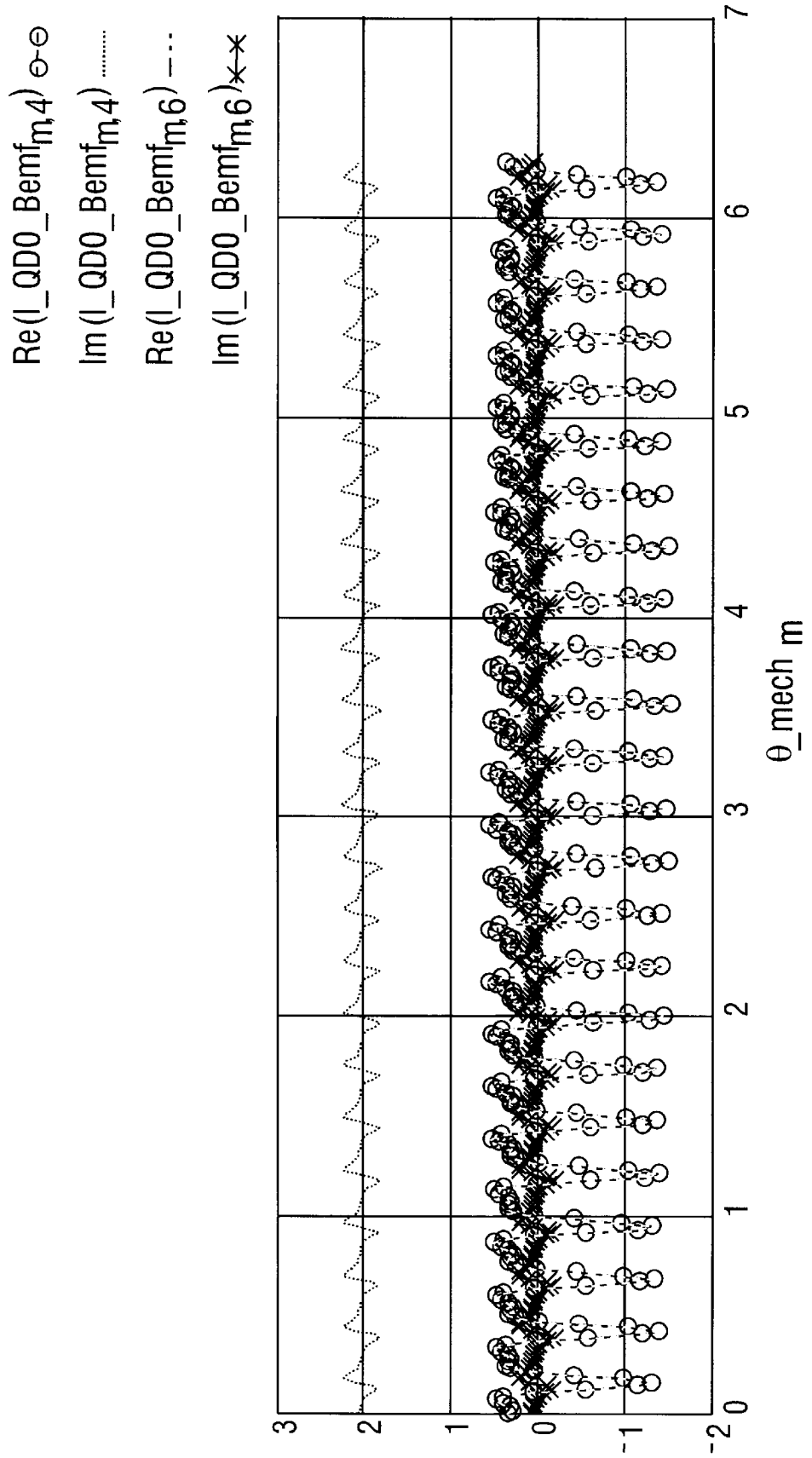
FIG. 23 represents a plotting of the Q (real part) and D (imaginary part) waveforms (the 0 sequence component is zero) for two exemplary output torques (0 N*m and 2 N*m) for a motor operated by a controller operating in one particular Q, D, 0 rotating reference frame.

FIG. 23 represents a plotting of the Q (real part) and D (imaginary part) waveforms (the 0 sequence component is zero) for two exemplary output torques (0 N*m and 2 N*m). The ripple on the waveforms is due to the cogging rejection component of the feeds. It may be noted that the D (imaginary) axis current is the same for both the 0Nm and 2Nm torque outputs.

As may be noted from an inspection of FIG. 23 the Q and D axis currents contain significant ripple which means a reasonably high bandwidth control law is necessary to track the current references (although no where near as high bandwidth as in the ABC or ac, β, and 0 frames). To alleviate this requirement a new transformation can be derived that transforms away the varying nature of the cogging rejection portion of the control currents. The transformation will be performed in several steps.

First, the phase control current command in terms of complex exponentials can be thought of as a sum of two terms, a torque producing term and a cogging rejection term:

$$I\_sv\_tot = Te\_com \cdot R\_Te\_ref \cdot e^{j \cdot \sigma\_Te\_ref} + R\_k\_cog\_rej \cdot e^{j \cdot \sigma\_cog\_rej}$$

The cogging rejection term is load invariant in the case of a linear machine and the torque production terms varies linearly with the commanded torque. The goal is to generate a transformed complex exponential representation of the current references that varies only with the amplitude of the currents. The first step in achieving the goal is to transform away the varying nature of the cogging rejection portion of the feed. Several variables may be "zeroed" to free up memory for calculations as follows:

$$Te\_min\_rms\_3Nm := 0$$

$$KQD0\_ABC\_cogging = \frac{1}{R\_cog\_rej} \cdot e^{-j \cdot \sigma\_cog\_rej}$$

$$Te\_min\_sense := 0$$

$$Te\_sense\_\theta\_3Nm := 0$$

$$Te\_sense\_I\_3Nm := 0$$

The complex exponential representation of the total phase current command may then be transformed into a rotating frame that is synchronous with the cogging signature of the motor to be controlled as follows:

$$\frac{1}{R\_cog\_rej} \cdot e^{-j \cdot \sigma\_cog\_rej} \cdot I\_sv\_tot =$$
$$(Te\_com \cdot R\_Te\_ref \cdot e^{j \cdot \sigma\_Te\_ref} + R\_cog\_rej \cdot e^{j \cdot \sigma\_cog\_rej}) \cdot$$
$$\left(\frac{1}{R\_cog\_rej} \cdot e^{-j \cdot \sigma\_cog\_rej}\right)$$

Where:
(1) R_cog_rej is the "radius" of the cogging rejection component reference. (2) σ_cog_rej is the polar angle of the cogging rejection component reference. (3) R_Te_ref is the "radius" of the torque producing component reference. (4) σ_Te_ref is the polar angle of the torque producing component reference. (5) Te_com is the desired torque output of the machine.

Simplifying $$\frac{1}{R\_cog\_rej} \cdot e^{-j \cdot \sigma\_cog\_rej} \cdot I\_sv\_tot =$$
$$Te\_com \cdot (R\_Te\_ref \cdot e^{j \cdot \sigma\_Te\_ref}) \cdot \left(\frac{1}{R\_cog\_rej} \cdot e^{-j \cdot \sigma\_cog\_rej}\right) + 1$$

The next step is to subtract one from both sides of the equation.

$$-1 + \frac{1}{R\_cog\_rej} \cdot e^{-j \cdot \sigma\_cog\_rej} \cdot I\_sv\_tot =$$
$$Te\_com \cdot (R\_Te\_ref \cdot e^{j \cdot \sigma\_Te\_ref}) \cdot \left(\frac{1}{R\_cog\_rej} \cdot e^{-j \cdot \sigma\_cog\_rej}\right)$$

The last step in the derivation is to multiply both sides of the equation by the expression that will isolate Te_com on the right hand side of the equation.

$$\left[\frac{1}{\left[(R\_Te\_ref \cdot e^{j \cdot \sigma\_Te\_ref}) \cdot \left(\frac{1}{R\_cog\_rej} \cdot e^{-j \cdot \sigma\_cog\_rej}\right)\right]}\right] \cdot$$
$$\left(-1 + \frac{1}{R\_cog\_rej} \cdot e^{-j \cdot \sigma\_cog\_rej} \cdot I\_sv\_tot\right) =$$
$$Te\_com \cdot (R\_Te\_ref \cdot e^{j \cdot \sigma\_Te\_ref}) \cdot \left(\frac{1}{R\_cog\_rej} \cdot e^{-j \cdot \sigma\_cog\_rej}\right) \cdot$$
$$\left[\frac{1}{\left[(R\_Te\_ref \cdot e^{j \cdot \sigma\_Te\_ref}) \cdot \left(\frac{1}{R\_cog\_rej} \cdot e^{-j \cdot \sigma\_cog\_rej}\right)\right]}\right]$$

Simplifying.

$$\frac{1}{R\_Te\_rej} \cdot \exp(-i \cdot \sigma\_Te\_ref) \cdot I\_sv\_tot -$$
$$\frac{1}{R\_Te\_ref} \cdot R\_cog\_rej \cdot \exp(-i \cdot (\sigma\_Te\_ref - \sigma\_cog\_rej)) = Te\_com$$

Thus, in summary, the transformation from the ABC frame to the QD0 rotating frame that includes cogging can be written as:

$$X\_QD0\_cog = KQD0\_ABC\_cog \cdot (X\_ABC\_cog) =$$
$$\frac{1}{R\_Te\_ref} \cdot \exp(-j \cdot \sigma\_Te\_ref) \cdot X\_ABC\_cog -$$
$$\frac{1}{R\_Te\_ref} \cdot R\_cog\_rej \cdot \exp(-j \cdot (\sigma\_Te\_ref - \sigma\_cog\_rej))$$

Where X_ABC_cog represents the polar representation of the ABC frame total references as described previously (I_sv_tot).

The Q axis current will be proportional to the shaft output torque using this transformation. The inverse transformation can also be derived.

$$KQD0\_ABC\_cog^{-1}(X\_QD0\_cog) = R\_Te\_ref \cdot e^{j \cdot \sigma\_Te\_ref} X\_QD0\_cog + R\_cog\_rej \cdot e^{j \cdot \sigma\_cog\_rej}$$

A numerical example can now be calculated.
Defining a function that calculates the first term of the ABC to QD0 transformation.

$$KQD0\_ABC\_cog\_T1(IaTe, IbTe, IcTe, XABCcog) :=$$
$$\frac{1}{R\_sv(IaTe, IbTe, IcTe)} \cdot e^{(-j \cdot \sigma\_sv(IaTe, IbTe, IcTe))} \cdot XABCcog$$

Defining a function that calculates the second term of the ABC to QD0 transformation.

$$KQD0\_ABC\_cog\_T2(IaTe, IbTe, IcTe, Iacog, Ibcog, Iccog) :=$$
$$\frac{-R\_sv(Iacog, Ibcog, Iccog)}{R\_sv(IaTe, IbTe, IcTe)} \cdot e^{(-j \cdot (\sigma\_sv(IaTe, IbTe, IcTe) - \sigma\_sv(Iacog, Ibcog, Iccog)))}$$

Defining the total transformation as the sum of the two functions.

KQD0_ABC_cog(IaTe,IbTe,IcTe,Iacog,Ibcog,Iccog,XABCcog):=
KQD0_ABC_cog_T1(IaTe,IbTe,IcTe,XABCcog)+KQD0_ABC_cog_T2(IaTe,IbTe,IcTe,Iacog,Ibcog,Iccog)

Calculating the complex exponential representation of the ABC minimum sensitivity current feeds.

I_sv_zero_sense_tot$_{m,p}$:=1_sv(I_a_zero_sense_tot$_{m,p}$,I_b_zero_sense_tot$_{m,p}$,I_c_zero_sense_tot$_{m,p}$)

Calculating the QD0 currents where the real part is the Q axis current and the imaginary part is the D axis current (the zero sequence component is zero since the feed is balanced). IQD0_zero_sense$_{m,p}$:=KQD0_ABC_cog(I_a_zero_sense_Te$_m$,I_b_zero_sense_Te$_m$,I_c_zero_sense_Te$_m$, I_a_zero_sense_cog_rej$_m$,I_b_zero_sense_cog_rej$_m$,I_c_zero_sense_cog_rej$_m$,I_sv_zero_sense_tot$_{m,p}$)

Figure 24:
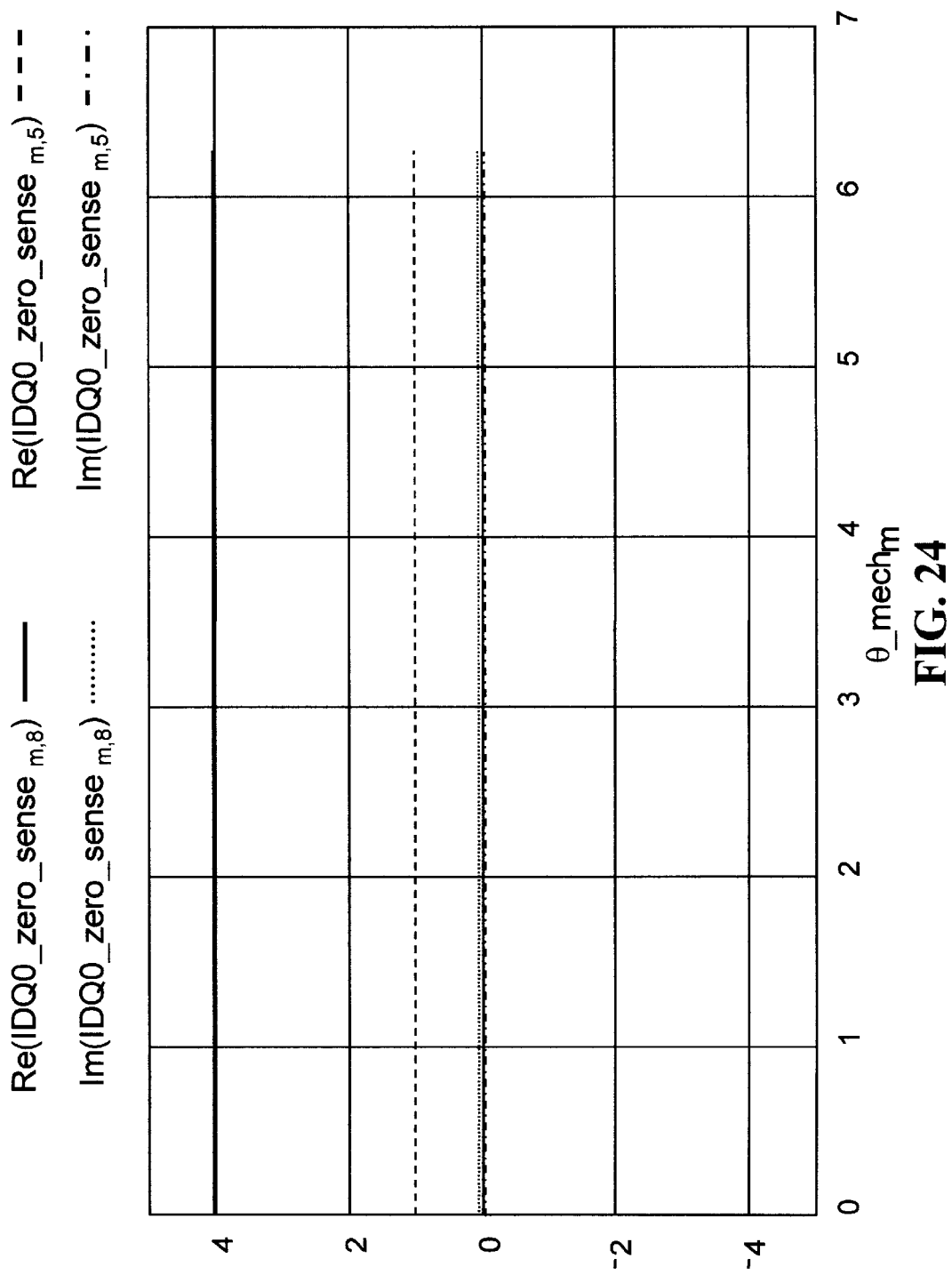
FIG. 24 illustrates various torque outputs that may be obtained through use of the control system of FIG. 22.

Using this frame that incorporates the cogging signature data, Q and D currents for various desired torque outputs may be derived as reflected in FIG. 24. As may be noted from a review of FIG. 24, the control outputs in this reference frame using the described conversions establish quasi-static control references that allow for more effective and fine control at lower bandwidth that those in which the control variables are constantly changing.

Figure 25:
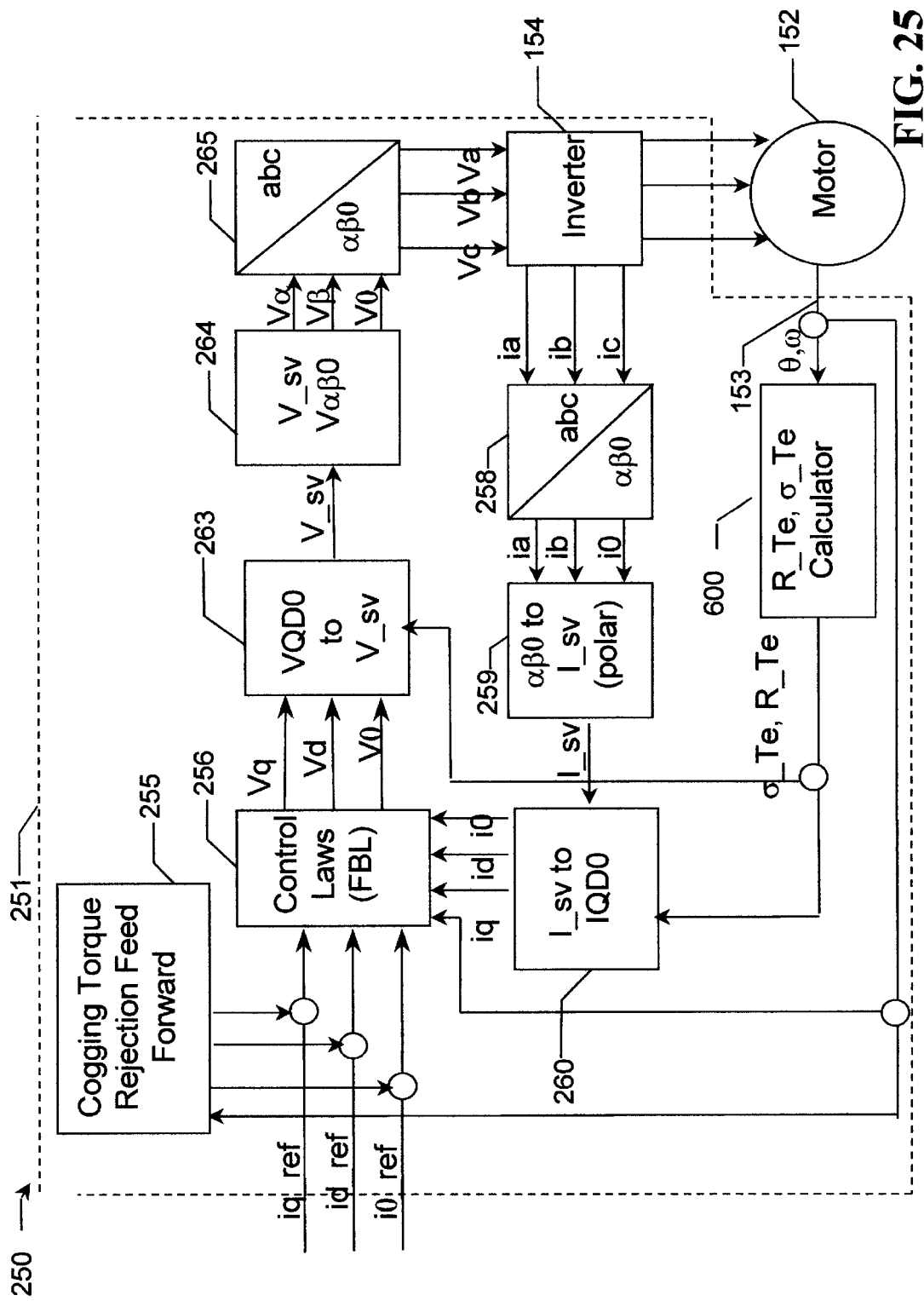
FIGS. 25 and 26 provides a general illustration of a control system utilize a rotating QD0 reference frame that is constructed in accordance with certain teachings found in this disclosure.
Figure 26:
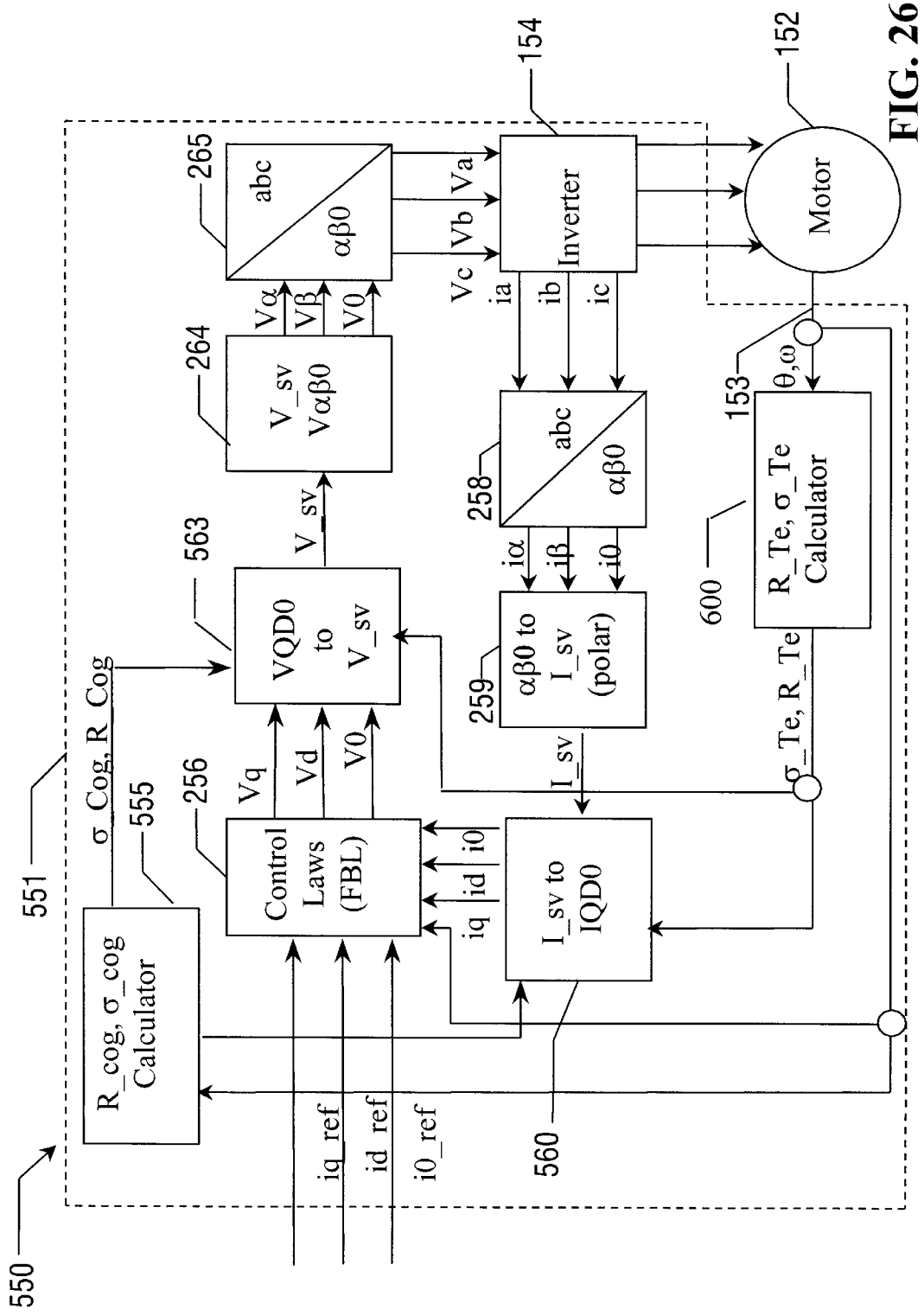

FIGS. 25 and 26 provide a general illustration of a control system 250 that may utilize a rotating (QD) reference. The particular methods used to calculate the transformations to the QD0 reference frame will depend on which of the described transformation approaches are utilized. Those of ordinary skill in the art having the benefit of this disclosure, however, will be able to construct such a system.

Referring first to FIG. 25, a motor control system 250 including a motor 152 and a motor controller 251 is illustrated. The controller 251 utilizes a rotating reference frame in which the cogging rejection component of current is not included in the rotating frame is illustrated. The rotating reference frame that may be used for the controller 251 of FIG. 25 may be any rotating reference frame not including the cogging rejection component and could be, for example, the frame described above that insures the torque producing components of current in the this rotating frame are quasi-static meaning constant in steady state. The rotating frame could also be the classic synchronous "Park's" frame.

The system of FIG. 25 receives as input torque producing current reference commands iq_ref, id_ref and ic_ref that are in the QD0 reference frame. Such torque producing reference current commands, because they are in the QD0 reference frame, will not vary with rotor position. The QD0 torque producing current reference commands may be provided by circuitry such as that illustrated in FIG. 15A that has been adapted to provide output reference currents in the QD0reference frame. The "0" reference will typically be zero. As reflected by FIG. 25, in addition to receiving the QD0 torque producing current references, the controller 251 also receives as inputs rotor position feedback information from line 153. The rotor feedback information is provided to a torque rejection component 255 that generates in response a torque rejection reference signal that includes current references in terms of QD0 that are summed with the QD0 torque producing current references to produce a composite current command reference. The QD0 cogging rejection component references in this reference frame may be stored as a function of rotor position and speed, calculated in real-time and the block/element 255 may operate and be constructed in accordance with the previous description of element 155 in FIG. 15B, 162 in FIG. 16, 191 in FIG. 19, and 225 in FIG. 22.

Because the torque rejection signal will vary with rotor position, the composite current command references will also vary with rotor position. The composite current command "0" reference will typically always be zero. A plot of exemplary composite (total) current command references is given in FIG. 23.

As reflected in FIG. 25, the composite current command references are provided to the control law element 256 that implements the appropriate QD0 control and outputs control voltages in terms of Vq, Vd and V0. The other inputs to the control law element 256 are current feedback commands that represent the current in the motor in terms of QD0 and feedback signals representing the angular position (and speed if not derived from the position signal) of the rotor.

The outputs of the control law element 256 are QD0 voltage commands that are transformed to provide ABC voltage commands that are applied to inverter 154. In the illustrated example, the transformation is accomplished by a first transformation implemented by VQD0 to V_vs block 263 that converts the QD0 voltages from 256 to polar representation of the voltages in a stationary frame (V_sv). In the case of the rotating frame described by FIG. 25, the operation could be (Vq+1j*Vd)*R_Te*exp(1j*σ_Te) transformation as described previously. Another example of the transformation could be a slightly different operation be (Vq+1j*Vd)*RV_Te*exp(1j*σV_Te), where RV_Te and σV_Te are the polar representation of the voltage that would be required to insure the torque producing component of current would flow in the motor 152. In other words the impedance of the motor phases and Bemf would be accounted for primarily in the transformation rather than through control law action.

Block 263 also receives as inputs the polar representation of the shape of the torque producing current component (radius and polar angle) R_Te and σ_Te from Block 600. R_Te and σ_Te may be calculated, for example, by using the formulae previously provided for the polar complex representation of the currents of FIG. 18 and the rotor position/speed signal 153. R_Te and σ_Te A may be provided in 1-per-unit output terms (e.g., 1 Nm). For the linear case R_Te and σ_Te will be only a function of angle.

The output of transformation element 263 is the polar representation of the phase voltages in a stationary frame. Block 264 receives as an input the polar representation output from block 263 (V_sv) and converts it to voltages in the αβ0 reference frame by, for example, assigning the real part to Vα and the imaginary part to Vβ. V0 is zero in this case. The αβ0 voltages from block or element 264 are then transformed into ABC frame voltages by block 265 that operates in the manner previously described in connection with block 224 of FIG. 22. The ABC outputs form block/element 265 are then provided as inputs to inverter 154 that operates to energize motor 152 as previously described.

As reflected in FIG. 25 the control law element 265 receives as inputs both the rotor position(speed) information from line 153 current feedback information in the QD0 reference frame. The QD0 current feedback signals are obtained by first obtaining the current feedback signals at inverter 154 as previously described in terms of Ia, Ib and Ic. The ABC currents are then converted to the α, β, and 0 reference frame by element 258. The current feedback in terms of α, β, and 0 is then processed by element 259 which converts the αβ0 feedback currents to a complex polar representation of the feedback currents. Block 259 functions as described previously in the calculation example of I_sv except that Iα, Iβ and I0 have already been calculated by element 258. In the case of the rotating frame utilized in the exemplary system of FIG. 25, block 260 would perform the operation (I_sv)*(I/R_Te)*exp(-1j*σ_Te) as described previously (I_sv is a complex number). The real part of the calculation may be defined as Iq, the imaginary part may be defined as Id. I0 is zero. Iq, Id and I0 are then output by block 260 and provided as inputs to control law block 256.

Block 260 also receives as inputs the polar representation of the shape of the torque producing current component (radius and polar angle) R_Te and σ_Te from Block 600, calculated as described above.

Figure 17:
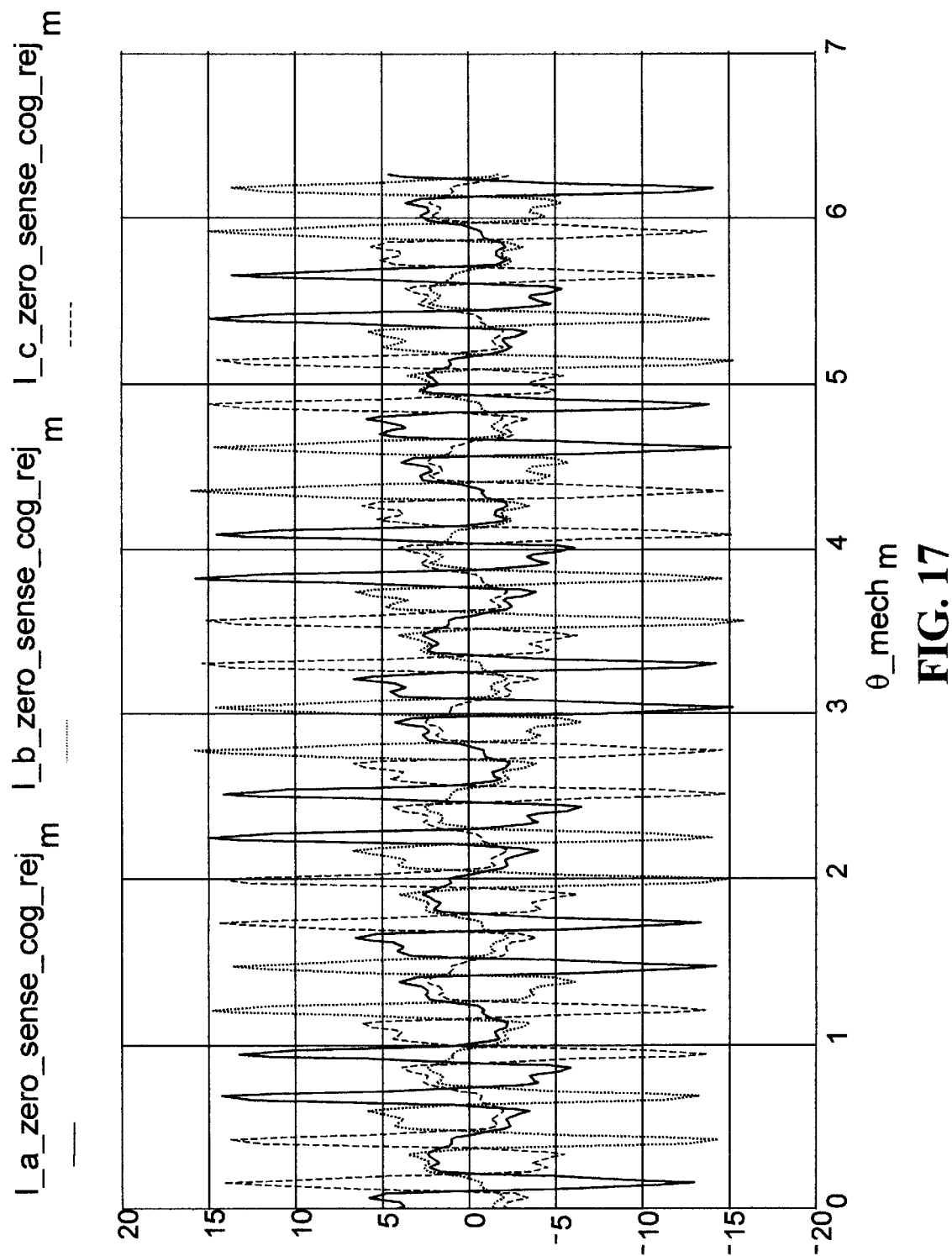
FIG. 17 provides an illustration of representative torque rejection (or anti-cogging) currents that may be produced by the controllers of FIGS. 15 and 16.

The remainder of the circuitry operates as described above wherein, R_Te and σ_Te are the polar representation of the shape of the torque producing current component (radius and polar angle) of, for example FIG. 18 and wherein R_cog and σ_cog are the polar representation of the cogging rejection current component (radius and polar angle) of, for example, FIG. 17.

FIG. 26 illustrates an exemplary control system operating in a rotating reference frame in which the cogging rejection component of current is included in the rotating frame.

Referring to the figure a control system 550 is illustrated that includes a controller 551 that energizes a motor 152. Controller 551 receives as inputs torque producing current references in terms of QD0 that may be generated using the circuitry of FIG. 15A as described in connection with the torque producing references of FIG. 25. Like the system of FIG. 25, the QD0 torque producing component references in this rotating frame will not vary with rotor position. Exemplary torque producing current references of the type suitable for provision to the controller of FIG. 26 are illustrated in FIG. 24. In the specific example of FIG. 26, the "0" current reference is always zero.

In the exemplary circuit of FIG. 26 torque producing current references are applied as inputs to the control law component 256 that operates as described above in connection with element 256 of FIG. 25 to provide appropriate output voltages Vq, Vd and V0 which are in the QD0 frame. The QD0 voltages from element 256 are provided as inputs to transformation element 563 which converts the QD0 voltages from element 256 to a stationary frame polar representation of the voltages (V_sv). The transformation performed by element 563 is performed in response to the output of a cogging rejection component 555 and torque producing component element 600 which receives as an input the rotor position/speed signal 153 and generates in response thereto the polar representation of the cogging rejection component (radius and polar angle) R_cog and σ_cog. R_cog and σ_cog may be calculated by using the formulae previously provided for the polar complex representation of currents with the cogging rejection component currents of FIG. 17. Element 555 may be implemented as described in connection with element 255 of FIG. 25 as may be element 600.

Transformation element 563 transforms the QD0 voltages from the control law element 256 to the stationary frame polar voltage representation V_sv in such a manner that the stationary frame polar voltage representation V_sv when provided as an input to the circuitry 264, 265 and 154 (previously described) will produce an output torque at the motor that tends to produce the desired output torque and to reduce torque irregularities. The transformation may, for example, perform the following operation V_sv=(R_Te)*exp(1j*σ_Te)*(Vq+1j*Vd)+R_cog*exp(1j*σ_cog) or, for example, the transformation may perform V_sv=(RV_Te)*exp(1j*σV_Te)*(Vq+1j*Vd)+RV_cog*exp(1j*σV_cog) where RV_Te and σV_Te are the polar representation of the voltage that would be required to insure the torque producing component of current would flow in the motor 152) and RV_cog and σV_cog are the radius and angle of the polar representation of the voltage that would be required to insure the cogging rejection component of current would flow in the motor. The polar representation of the phase voltage commands, V_sv, is the output of 563.

The output of element 563 is provided to elements 264, 265 and 154 which operate as described above in connection with FIG. 25 to energize motor 152.

As reflected in FIG. 26, current feedback signals iq, id and i0 are applied as inputs to control law block 256. The generation of these feedback signals occurs through the use of signals ia, ib and ic obtained from inverter 154 as described above and through the use of transformation elements 258 and 259 that operate as described in connection with FIG. 25. Block 560 transforms the output of block 259 through a transformation that takes into account the cogging rejection parameters provided by element 555 and torque producing component reference R_Te, σ_Te from block 600. The transformation preformed by element 560 may be accomplished by performing the following operation on the input I_sv: IQD0_sv=(1/R_Te)*exp(-1j*σ_Te)*I_sv-(1/R_Te)*R_cog*exp(-1j*(σ_Te-σ_cog)) where IQD0_sv is a complex representation of the QD0 frame feedback currents. Iq is then defined as the real part of IQD0_sv, Id is defined as the imaginary part of IQD0_sv and I0 is zero in this particular example. Block 600 calculates R_Te and σ_Te is the same manner described above in reference to FIG. 25.

The motor control systems described above were in connection with motors or regions of motor operation where the motors are operating in the linear range (i.e., in ranges where back-iron saturation and other non-linear producing effects are not significant). Those of ordinary skill in the art will appreciate that, in certain instances, motors operate in non-linear regions where the characteristics of the motor change non-linearly. The control systems and controllers previously discussed above may be modified to account for such non-linear motor operation.

The modification required to convert the controller reflected by FIGS. 15A and 15B will be discussed below, but those of ordinary skill in the art having the benefit of this disclosure will appreciate that the exemplary modifications may be made to the other exemplary controllers discussed herein.

One modification that may be made to allow the controllers previously described to operate in the non-linear region is to adjust the relationship between the inputs and the outputs of the circuitry of FIG. 15A that generates torque producing current references such that the relationship is non-linear. In other words the torque producing component references would no longer be linearly proportional to the commanded torque.

Figure 27:
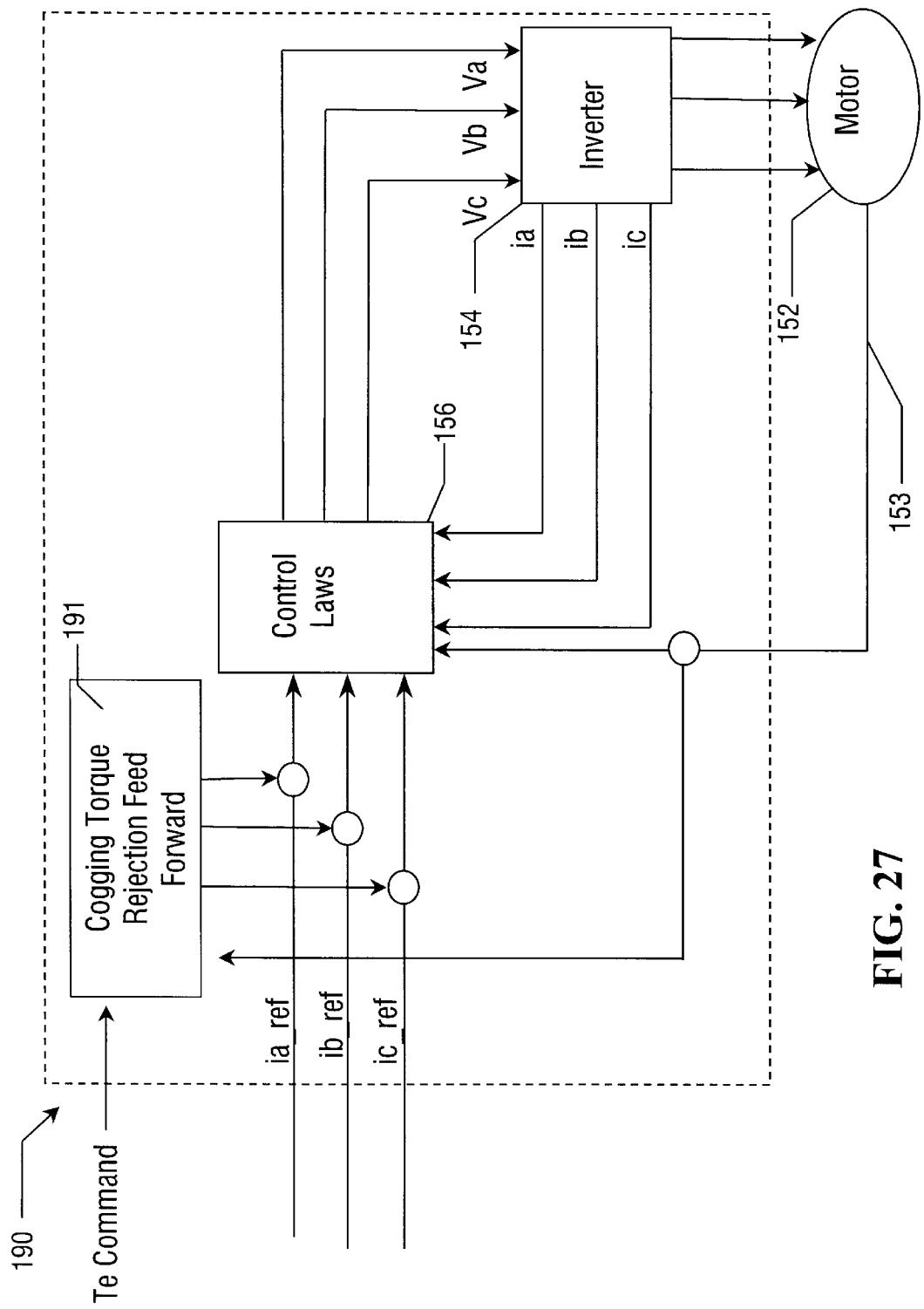
FIG. 27 illustrates an exemplary controller constructed in accordance with certain teachings of this disclosure for controllers motors operating on non-linear regions.

A second modification that may be made to the previously-described controllers to allow them to more readily operate motors in their non-linear region is modify the components that generate the cogging rejection current references (or the cogging rejection parameters) such that the cogging rejection current references/parameters vary not only with rotor position and possibly rotor speed but also with commanded torque. FIG. 27 illustrates such a modification as may be made to the control circuitry of FIG. 15B. As illustrated the component 191' receives as inputs, not only the current position and possibly speed information form line 153 but also a representation of the commanded torque Te command. The element 191' of FIG. 27 then generates cogging rejection current references that change with changes in the commanded torque. The remainder of the circuitry of FIG. 27 operates as described above in connection with FIG. 15B.

Those of ordinary skill in the art will appreciate that the use of the torque command signal Te command for non-linear control purposes is exemplary. Other commanded or sensed parameters (such as the current in the motor) could be used for such purposes. Those of ordinary skill in the art will also appreciate that the control circuits described herein may be implemented through programmed processors in which the various elements and components described above would be implemented through software routines. Such software implementations are equivalent to the hardware implements discussed and described herein. The use of such software approaches allows for the establishment of a controller that can be optimized for various torque/speed conditions.

For example, FIG. 21 illustrates that, for the illustrated example, at certain torque output ranges, the relationship between the control parameters is such that there is no clear, easily describable relationship between the $\alpha$ and $\beta$ currents (for an ap) reference frame for relatively low output torque magnitudes. For higher torque outputs, the relationship between the $\alpha$ and the $\beta$ currents is more straightforward. For such an application, it may be possible to provide a controller that operates in an ABC-based mode at low torque ranges and that converts to a $\alpha$, $\beta$, and 0-based controller once the output torque exceeds a certain cutoff point. Given the ready availability of programmable processors and DSPs, one can provide a controller that operates as an ABC based controller within certain torque ranges and that converts to an $\alpha$, $\beta$, and 0 controller at higher torque ranges.

Along the same lines, one may provide a controller that operates in accordance with different control schemes under differing circumstances. For example, at low rotor speeds the potential for a rotor position detector error is high. As such, at low speeds it may be desirable to have a controller that operates at a very low sensitivity to rotor position error. At high speeds,—where rotor position errors are less significant and less likely—the high RMS currents generated by such a controller may produce undesirable losses. In such an application it may be desirable to have a controller that operates according to a minimum sensitivity control scheme at low rotor speeds and that converts to a minimum RMS current control scheme at high speeds. The conversion between the two operating modes may, in fact, be a gradual transition from on mode to the other as a function of rotor speed resulting in a "sliding mode" controller. For example, a set of Cogging rejection and torque producing references that vary in sensitivity to rotor position error may be calculated for different rotor speeds and interpolated between as the rotor speed changes, or the calculation could be carried out in real-time. Another example could be a transition from the zero sensitivity references at low speed to the minimum voltage required feeds at high speed. The zero sensitivity references would be used until a speed at which the controller not longer had adequate voltage and or bandwidth to track the zero sensitivity references. A set of references would be calculated via optimization methods that gradually allow the "sensitivity cost" to go up as the "voltage cost" goes down. The change could be gradual as in a sliding mode controller or abrupt as in a mode changing controller. As is evident, an infinite number of reference combinations can be envisioned that vary with rotor speed and with the benefit of this disclosure those skilled in the art.

Because of the general similarity of many of the elements of the controllers illustrated in FIGS. 15B, 16, 19, 22 and 25, 26, 27 and the increasing speed and decreasing costs of various programmable controllers, the use a multi-control, sliding mode/multi-frame controllers as described above may be possible and desirable.

The above description of several exemplary embodiments is made by way of example and not for purposes of limitation. Many variations may be made to the embodiments and methods disclosed herein without departing from the scope and spirit of the present invention. For example, the present invention was discussed in the context of a rotating machine having a specific number of stator and rotor poles and three phase windings. Alternate stator pole/rotor pole combinations and various combinations of phase coil connections, placement and sequence of each phase winding to provide the differing EMF patterns, are envisioned, as are alternate phase combinations (two phase, four phase, etc.). The use of such alternate configurations will not depart from the scope of the present invention.

Additionally, the present invention may be used in many applications including industrial applications, specialty applications, appliance applications, aerospace applications, and automotive applications. The present invention may also be used in power generation applications including stand-alone generators and/or grid-connected generators. The use of the present invention in the above described or other applications shall not depart from the scope and spirit of the present invention. The present invention is intended to be limited only by the scope and spirit of the following claims.

What is claimed is:

1. A control system for providing smooth output torque comprising:
   a rotating electromagnetic machine, the machine including a stator, a plurality of stator windings positioned within the stator, and a rotor that tends to prefer certain angular positions with respect to the stator over other positions;
   a rotor position detector that provides a rotor position signal indicative of the angular position of the rotor with respect to the stator; and
   a controller coupled to the stator windings, the controller operating in a rotating reference frame and receiving as inputs an input command signal and the rotor position signal and providing in response to the inputs electric power to energize the stator windings, the controller comprising:
      a torque control circuit that receives the input command signal and generates a machine energization signal corresponding to the input command signal;
      a torque rejection signal that receives as an input the rotor position signal and generates a torque rejection signal corresponding to the tendency of the rotor to prefer the angular position corresponding to the received rotor position signal; and
      energization circuitry for energizing the stator windings in response to the torque command signal and the torque rejection signal to provide smooth output torque.

2. The system of claim 1 wherein the rotating electromagnetic machine is a permanent magnet motor.

3. The system of claim 1 wherein the torque control circuit comprises a look-up table that receives as an input the rotor position signal.

4. The system of claim 3 wherein the look-up table receives as an input the commanded torque signal.

5. The system of claim 1 wherein the torque rejection signal corresponds to the current required to produce a torque from the rotating electromagnetic machine that will counter any tendency of the rotor to prefer the angular position of the rotor.

6. The system of claim 5 in which the input command signal corresponds to currents required to produce a desired output torque from the rotating electromagnetic machine and in which the controller further comprises a summing circuit for summing the input command signal and the torque rejection signal to provide a composite current command signal and in which the energization circuitry receives as an input the composite current command.

7. The system of claim 1 in which the controller comprises a programmed digital processor.

8. A torque rejection circuit for adjusting current feedback signals from a rotating electromagnetic machine to produce adjusted feedback signals for use by a conventional motor control circuit utilizing current feedback currents, the machine including a stator, a plurality of stator windings positioned within the stator, and a rotor that tends to prefer certain angular positions with respect to the stator over other positions, the torque rejection circuit comprising:

a compensation circuit that receives as an input a representation of the angular position of the rotor with respect to the stator and generates at an output compensation current signals corresponding to the current required to cancel the tendency of the rotor to prefer to the received angular position; and summing circuitry that receive as inputs the current feedback signals from the machine and the compensation current signals and sum these input signals to produce compensated current values for provision to the conventional motor control circuit.

9. The torque rejection circuit of claim 8 wherein the output compensation current signals provide a positive indication of the current that should flow to actively cancel the tendency of the rotor to prefer the received angular position and wherein the summing circuit sums the current feedback signals with the negative of the compensation current signals.

10. The torque rejection circuit of claim 8 wherein the compensation circuit receives as an input a signal corresponding to the desired output torque of the machine.

11. A system for controlling a motor that includes a rotor that prefers certain angular positions over others, the system comprising:

rotor position detection means for generating a rotor position signal representing the angular position of the rotor;

torque rejection means responsive to the rotor position signal for generating an energization signal that varies with the degree to which the rotor prefers the received rotor position over other rotor positions;

energization means responsive to the energization signal for energizing the motor such to produce an output torque that counteracts any preference of the rotor for certain angular positions, the energization means including a control law element that implements machine control in a rotating reference frame.

12. The system of claim 11 wherein the energization signal corresponds to a controllable parameter of the machine represented in the $\alpha$, $\beta$, 0 reference frame and wherein the energization means includes a control law element that implements machine control in the $\alpha$, $\beta$, 0 reference frame.

13. The system of claim 11 wherein the energization signal corresponds to a controllable parameter of the machine represented in a rotating reference frame that rotates in synchronism with the back emf of the machine.

14. The system of claim 11 wherein the control law element that implements machine control in a rotating reference frame rotates in synchronism with the physical rotation of the rotor with respect to the stator.

15. The system of claim 11 wherein the control law element that implements machine control in a rotating reference frame rotates in synchronism with the phase currents that would produce smooth torque if the rotor of the machine had no tendencies to favor certain angular positions over others.

16. The system of claim 11 wherein the control law element that implements machine control in a rotating reference frame rotates in synchronism with a combination of the back emf and tendency of the rotor of the machine to favor certain angular positions over others.

17. The system of claim 11 wherein the control law element that implements machine control in a rotating reference frame rotates in synchronism with torque producing components of the current.

18. The system of claim 11 wherein the control law element that implements machine control in a rotating reference frame rotates in synchronism with the energization signal.

19. The system of claim 11 wherein the energization means includes a control law element that implements machine control by using feeds that result in minimum ripple sensitivity to shaft sensor error.

20. The system of claim 11 wherein the energization means includes a control law element that implements machine control by using feeds that produce the maximum torque per sum of rms phase currents.

21. The system of claim 11 wherein the energization means includes a control law element that implements machine control by using feeds that require the minimum line to line voltage while maintaining smooth torque.

22. The system of claim 11 wherein the control law element that implements machine control in a rotating reference frame rotates in synchronization with smooth torque current feeds which include a cogging rejection component and torque producing components.

23. A system for controlling a motor that includes a rotor that prefers certain angular positions over others, the system comprising:

rotor position detection means for generating a rotor position signal representing the angular position of the rotor;

torque rejection means responsive to the rotor position signal for generating an energization signal that varies with the degree to which the rotor prefers the received rotor position over other rotor positions; and energization means responsive to the energization signal for energizing the motor such to produce an output torque that counteracts any preference of the rotor for certain angular positions;

wherein the energization means includes a control law element that implements machine control by using feeds that produce the maximum torque per sum of rms phase currents.

24. A system for controlling a motor that includes a rotor that prefers certain angular positions over others, the system comprising:

rotor position detection means for generating a rotor position signal representing the angular position of the rotor;

torque rejection means responsive to the rotor position signal for generating an energization signal that varies with the degree to which the rotor prefers the received rotor position over other rotor positions; and energization means responsive to the energization signal for energizing the motor such to produce an output torque that counteracts any preference of the rotor for certain angular positions;

wherein the energization means includes a control law element that implements machine control by using feeds that require the minimum line to line voltage while maintaining smooth torque.

* * * * *